United States Patent [19]

Noda et al.

[11] Patent Number: 5,689,346
[45] Date of Patent: Nov. 18, 1997

[54] IMAGE DATA PROCESSING SYSTEM

[75] Inventors: Tsugio Noda; Masahiro Fukuda, both of Isehara; Kimitaka Murashita, Atsugi, all of Japan

[73] Assignee: Fujitsu Limited, Kawasaki, Japan

[21] Appl. No.: 343,973

[22] Filed: Nov. 18, 1994

Related U.S. Application Data

[63] Continuation of Ser. No. 671,208, Mar. 18, 1991, abandoned.

[30] Foreign Application Priority Data

| Mar. 16, 1990 | [JP] | Japan | 2-066302 |
| Mar. 19, 1990 | [JP] | Japan | 2-069451 |
| Mar. 20, 1990 | [JP] | Japan | 2-071601 |
| Mar. 20, 1990 | [JP] | Japan | 2-071602 |
| Jul. 10, 1990 | [JP] | Japan | 2-180471 |
| Jul. 10, 1990 | [JP] | Japan | 2-180473 |

[51] Int. Cl.$^6$ .............. H04N 1/41; H04N 1/415
[52] U.S. Cl. .............. 358/426; 358/432; 358/433; 348/248; 348/250; 348/251
[58] Field of Search .............. 358/426, 261.3, 358/261.4, 432, 431, 433, 470; 382/232, 248, 250, 251

[56] References Cited

U.S. PATENT DOCUMENTS

| 4,704,628 | 11/1987 | Chen et al. | 358/136 |
| 5,045,938 | 9/1991 | Sugiyama | 358/433 |
| 5,107,345 | 4/1992 | Lee | 358/261.4 |
| 5,142,380 | 8/1992 | Sakagami et al. | 358/432 |

FOREIGN PATENT DOCUMENTS

| 0 228 028 | 7/1987 | European Pat. Off. |
| 0 323 363 | 7/1989 | European Pat. Off. |
| 0 376 683 | 7/1990 | European Pat. Off. |
| 0 469 855 | 2/1992 | European Pat. Off. |
| 0 482 864 | 4/1992 | European Pat. Off. |

OTHER PUBLICATIONS

Hamilton, B., "Programmable architecture for matrix and signal processing", IEEE Region 5 Conference 1988, Mar. 21, 1988, pp. 116–120.

European Search Report, The Hague, Apr. 8, 1993.

Primary Examiner—Edward L. Coles, Sr.
Assistant Examiner—Thomas D. Lee
Attorney, Agent, or Firm—Staas & Halsey

[57] ABSTRACT

An Adaptive Discrete Cosine Transformation is widely used for orthogonally transforming image data. The number of adders necessary for sum-of-product operations in a matrix multiplication is reduced. A high speed matrix multiplication and a progressive image build-up are realized by minimizing the number of operations by skipping those for insignificant data. This invention speeds up the operations for restoring image data, minimizes the necessary circuit size, and enables a progressive image build-up to be performed efficiently.

21 Claims, 60 Drawing Sheets

FIG. 5

| 10 | 15 | 13 | 14 | 14 | 14 | 14 | 14 |
|----|----|----|----|----|----|----|----|
| 13 | 16 | 19 | 18 | 20 | 24 | 22 | 22 |
| 13 | 15 | 16 | 20 | 18 | 21 | 22 | 22 |
| 14 | 14 | 17 | 21 | 21 | 22 | 23 | 19 |
| 14 | 16 | 17 | 21 | 21 | 22 | 24 | 23 |
| 14 | 15 | 22 | 22 | 22 | 25 | 26 | 24 |
| 15 | 17 | 25 | 29 | 29 | 46 | 33 | 35 |
| 27 | 34 | 39 | 43 | 50 | 62 | 45 | 54 |

FIG. 6A

| 91 | -17 | -6 | 1 | -2 | 0 | 3 | -2 |
|---|---|---|---|---|---|---|---|
| -28 | 8 | 3 | -2 | 1 | 1 | -4 | 2 |
| 14 | -3 | -1 | 1 | 0 | -3 | 3 | -1 |
| -14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | -1 |

FIG. 6B

| 368  | -65 | -22 | 2  | -9 | -1  | 11  | -11 |
|------|-----|-----|----|----|-----|-----|-----|
| -111 | 37  | 15  | -6 | 5  | 5   | -15 | 9   |
| 59   | -12 | -5  | 4  | -5 | -12 | 12  | -7  |
| -58  | 14  | 4   | -4 | -1 | 5   | -4  | 6   |
| 18   | 5   | -1  | 2  | 4  | -6  | -4  | 0   |
| -25  | 1   | -2  | 3  | -1 | 6   | 2   | -3  |
| -1   | 7   | 2   | -5 | -1 | -1  | -4  | 2   |
| -7   | -3  | 2   | 0  | 0  | -1  | -1  | -5  |

FIG. 7

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 8A

| 5 | -1 | 0 | 0 | 0 | 0 | 0 | 0 |
|---|---|---|---|---|---|---|---|
| -2 | 0 | 0 | 0 | 0 | 0 | 0 | 0 |
| 1 | 0 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 8B

| 64 | -16 | -8 | 0 | 0 | 0 | 0 | 0 |
|---|---|---|---|---|---|---|---|
| -24 | 8 | 0 | 0 | 0 | 0 | 0 | 0 |
| 8 | 0 | 0 | 0 | 0 | 0 | 0 | 0 |
| -8 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 9

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 13

| -64 | -16 | -8 | 0 | 0 | 0 | 0 | 0 |
|---|---|---|---|---|---|---|---|
| -24 | 8 | 0 | 0 | 0 | 0 | 0 | 0 |
| 8 | 0 | 0 | 0 | 0 | 0 | 0 | 0 |
| -8 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 14

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 17

| Dm | R0 | I2 | R0 | I3 | R0 | I4 | R0 | I5 | R0 | I6 | R3 | I7 | Reob |
|----|----|----|----|----|----|----|----|----|----|----|----|----|------|

FIG. 18

| 1 | 2 | 3 | 4 | 5 | 6 | 7 | 8 | ... | 64 |
|---|---|---|---|---|---|---|---|-----|----|
| ⌈1⌋ | ⌈2⌋ | ⌈3⌋ | ⌈4⌋ | ⌈5⌋ | ⌈6⌋ | ⌈10⌋ | | | |

FIG. 24
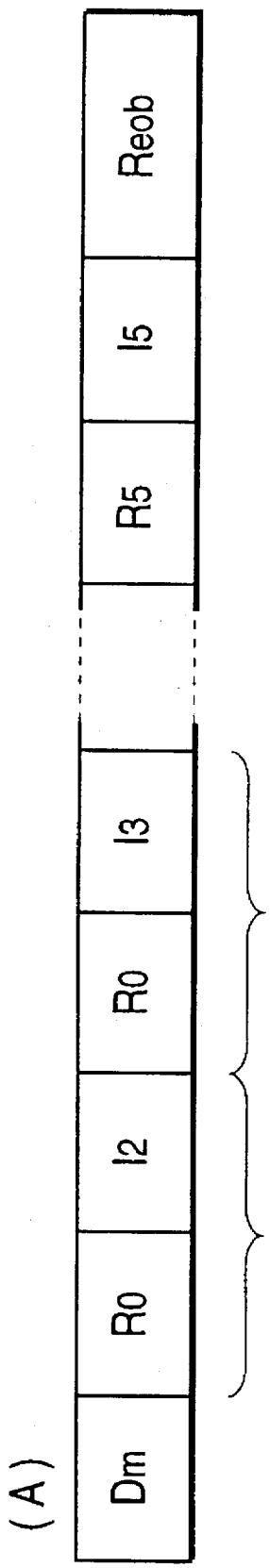
(A)
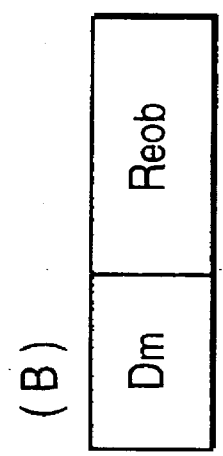
(B)

FIG. 27B

| TIMING OF PROCESS | LATCH INPUT TO LATCH CIRCUIT 20 | LATCH CONSTANT TO LATCH CIRCUIT 21-1, 21-2 21-3, 21-4 | LATCH ADDING MEANS 22-1, 22-2,22-3,AND 22-4 TO LATCH CIRCUIT 23-1,23-2,23-3, AND 23-4 | LATCH OUTPUT OF ADDING MEANS 24-1,24-2,24-3 AND 24-4 TO LATCH CIRCUIT 25a-1,25a-2,25a-3,25a-4, OR 25b-1,25b-2,25b-3 AND 25b-4 | LATCH OUTPUT OF ADDING MEANS 24-1,24-2,24-3 AND 24-4 TO LATCH CIRCUIT 27a-1,27a-2,27a-3,27a-4, OR 27b-1,27b-2,27b-3 AND 27b-4 | OUTPUT OF MULTIPLEXER 28 |
|---|---|---|---|---|---|---|
| SP 1 | X11 | A11 A21 A31 A41 | | | | |
| SP 2 | | A51 A61 A71 A81 | X | | | |
| SP 3 | X12 | A12 A22 A32 A42 | X | + 25a-1 25a-2 25a-3 25a-4 | | |
| SP 4 | | A52 A62 A72 A82 | X | + 25b-1 25b-2 25b-3 25b-4 | | |
| SP 5 | X13 | A13 A23 A33 A43 | X | + 25a-1 25a-2 25a-3 25a-4 | | |
| SP 6 | | A53 A63 A73 A83 | X | + 25b-1 25b-2 25b-3 25b-4 | | |
| ⋮ | ⋮ | ⋮ | ⋮ | | | |
| SP 15 | X18 | A18 A28 A38 A48 | X | + 25a-1 25a-2 25a-3 25a-4 | | |
| SP 16 | | A58 A68 A78 A88 | X | + 25b-1 25b-2 25b-3 25b-4 | | |
| SP 17 | X21 | A11 A21 A31 A41 | X | + 25a-1 25a-2 25a-3 25a-4 | 27a-1 27a-2 27a-3 27a-4 | |
| SP 18 | | A51 A61 A71 A81 | X | + 25b-1 25b-2 25b-3 25b-4 | 27b-1 27b-2 27b-3 27b-4 | (1-1) |
| SP 19 | X22 | A12 A22 A32 A42 | X | + 25a-1 25a-2 25a-3 25a-4 | | (1-2) |
| SP 20 | | A52 A62 A72 A82 | X | + 25b-1 25b-2 25b-3 25b-4 | | (1-3) |
| SP 21 | X23 | A13 A23 A33 A43 | X | + 25a-1 25a-2 25a-3 25a-4 | | (1-4) |
| SP 22 | | A53 A63 A73 A83 | X | + 25b-1 25b-2 25b-3 25b-4 | | (1-5) |
| SP 23 | X24 | A14 A24 A34 A44 | X | + 25a-1 25a-2 25a-3 25a-4 | | (1-6) |
| SP 24 | | A54 A64 A74 A84 | X | + 25b-1 25b-2 25b-3 25b-4 | | (1-7) |
| SP 25 | X25 | A15 A25 A35 A45 | X | + 25a-1 25a-2 25a-3 25a-4 | | (1-8) |
| SP 26 | | A55 A65 A75 A85 | X | + 25b-1 25b-2 25b-3 25b-4 | | |
| SP 27 | X26 | A16 A26 A36 A46 | X | + 25a-1 25a-2 25a-3 25a-4 | | |
| SP 28 | | A56 A66 A76 A86 | X | + 25b-1 25b-2 25b-3 25b-4 | | |
| ⋮ | ⋮ | ⋮ | ⋮ | | | |
| SP 127 | X88 | A18 A28 A38 A48 | X | + 25a-1 25a-2 25a-3 25a-4 | | |
| SP 128 | | A58 A68 A78 A88 | X | + 25b-1 25b-2 25b-3 25b-4 | | |
| SP 129 | | | X | + 25a-1 25a-2 25a-3 25a-4 | | |
| SP 130 | | | | + 25b-1 25b-2 25b-3 25b-4 | 27a-1 27a-2 27a-3 27a-4 | |
| SP 131 | | | | | 27b-1 27b-2 27b-3 27b-4 | (8-1) |
| SP 132 | | | | | | (8-2) |
| SP 133 | | | | | | (8-3) |
| SP 134 | | | | | | (8-4) |
| SP 135 | | | | | | (8-5) |
| SP 136 | | | | | | (8-6) |
| SP 137 | | | | | | (8-7) |
| | | | | | | (8-8) |

FIG. 29B

| TIMING OF PROCESS | LATCH INPUT TO LATCH CIRCUITS 322-1 AND 322-2 | | OUTPUT OF MULTIPLEXERS 321-1 AND 321-2 | | MULTIPLICATION BY MULTIPLIERS 323-1, 323-2 AND LATCH TO CIRCUITS 324-1, 324-2 | | | | ADDITION BY ADDER 325 AND LATCH TO CIRCUIT 326 | | ADDITION, ACCUMULATION BY ADDER 327 AND LATCH CIRCUIT 327 | | OUTPUT TO MULTIPLEXER 329 |
|---|---|---|---|---|---|---|---|---|---|---|---|---|---|
| 1  | X11 | X21 | A11 | A12 |         |         |       |       |      |     |      |     |     |
| 2  | X31 | X41 | A13 | A14 | X323-1  | X323-2  | 324-1 | 324-2 |      |     |      |     |     |
| 3  | X11 | X21 | A21 | A22 | X323-1  | X323-2  | 324-1 | 324-2 | +325 | 326 |      |     |     |
| 4  | X31 | X41 | A23 | A24 | X323-1  | X323-2  | 324-1 | 324-2 | +325 | 326 | +327 | 328 |     |
| 5  | X11 | X21 | A31 | A32 | X323-1  | X323-2  | 324-1 | 324-2 | +325 | 326 | +327 | 328 |     |
| 6  | X31 | X41 | A33 | A34 | X323-1  | X323-2  | 324-1 | 324-2 | +325 | 326 | +327 | 328 | Y11 |
| 7  | X11 | X21 | A41 | A42 | X323-1  | X323-2  | 324-1 | 324-2 | +325 | 326 | +327 | 328 |     |
| 8  | X31 | X41 | A43 | A44 | X323-1  | X323-2  | 324-1 | 324-2 | +325 | 326 | +327 | 328 | Y21 |
| 9  | X11 | X21 | A51 | A52 | X323-1  | X323-2  | 324-1 | 324-2 | +325 | 326 | +327 | 328 |     |
| 10 | X31 | X41 | A53 | A54 | X323-1  | X323-2  | 324-1 | 324-2 | +325 | 326 | +327 | 328 | Y31 |
| 11 | X11 | X21 | A61 | A62 | X323-1  | X323-2  | 324-1 | 324-2 | +325 | 326 | +327 | 328 |     |
| 12 | X31 | X41 | A63 | A64 | X323-1  | X323-2  | 324-1 | 324-2 | +325 | 326 | +327 | 328 | Y41 |
| 13 | X11 | X21 | A71 | A72 | X323-1  | X323-2  | 324-1 | 324-2 | +325 | 326 | +327 | 328 |     |
| 14 | X31 | X41 | A73 | A74 | X323-1  | X323-2  | 324-1 | 324-2 | +325 | 326 | +327 | 328 | Y51 |
| 15 | X11 | X21 | A81 | A82 | X323-1  | X323-2  | 324-1 | 324-2 | +325 | 326 | +327 | 328 |     |
| 16 | X31 | X41 | A83 | A84 | X323-1  | X323-2  | 324-1 | 324-2 | +325 | 326 | +327 | 328 | Y61 |
| 17 |     |     |     |     | X323-1  | X323-2  | 324-1 | 324-2 | +325 | 326 | +327 | 328 |     |
| 18 |     |     |     |     |         |         |       |       | +325 | 326 | +327 | 328 | Y71 |
| 19 |     |     |     |     |         |         |       |       |      |     | +327 | 328 |     |
| 20 |     |     |     |     |         |         |       |       |      |     |      |     | Y81 |

FIG. 29C

| TIMING OF PROCESS | LATCH INPUT TO LATCH CIRCUITS 322-1 1ND 322-2 | | OUTPUT OF MULTIPLEXERS 321-1 AND 321-2 | | MULTIPLICATION BY MULTIPLIERS 323-1, 323-2 AND LATCH TO CIRCUITS 324-1, 324-2 | | | | ADDITION BY ADDER 325 AND LATCH TO CIRCUIT 326 | | ADDITION, ACCUMULATION BY ADDER 327 AND LATCH CIRCUIT 327 | | OUTPUT TO MULTIPLEXER 329 |
|---|---|---|---|---|---|---|---|---|---|---|---|---|---|
| 1 | X11 | X21 | A11 | A12 | | | | | | | | | |
| 2 | X11 | X21 | A21 | A22 | X323-1 | X323-2 | 324-1 | 324-2 | | | | | |
| 3 | X11 | X21 | A31 | A32 | X323-1 | X323-2 | 324-1 | 324-2 | +325 | 326 | | | |
| 4 | X11 | X21 | A41 | A42 | X323-1 | X323-2 | 324-1 | 324-2 | +325 | 326 | +327 | 328 | |
| 5 | X11 | X21 | A51 | A52 | X323-1 | X323-2 | 324-1 | 324-2 | +325 | 326 | +327 | 328 | Y13 |
| 6 | X11 | X21 | A61 | A62 | X323-1 | X323-2 | 324-1 | 324-2 | +325 | 326 | +327 | 328 | Y23 |
| 7 | X11 | X21 | A71 | A72 | X323-1 | X323-2 | 324-1 | 324-2 | +325 | 326 | +327 | 328 | Y33 |
| 8 | X11 | X21 | A81 | A82 | X323-1 | X323-2 | 324-1 | 324-2 | +325 | 326 | +327 | 328 | Y43 |
| 9 | | | | | X323-1 | X323-2 | 324-1 | 324-2 | +325 | 326 | +327 | 328 | Y53 |
| 10 | | | | | | | | | +325 | 326 | +327 | 328 | Y63 |
| 11 | | | | | | | | | | | +327 | 328 | Y73 |
| 12 | | | | | | | | | | | | | Y83 |

FIG. 34

| 3 | 7 | 11 | 15 | 19 | 23 | 27 | 31 |
|---|---|---|---|---|---|---|---|
| 7 | 15 | 23 | 31 | 39 | 47 | 55 | 63 |
| 11 | 23 | 35 | 47 | 59 | 71 | 83 | 95 |
| 15 | 31 | 47 | 63 | 79 | 95 | 111 | 127 |
| 19 | 39 | 59 | 79 | 99 | 119 | 139 | 159 |
| 23 | 47 | 71 | 95 | 119 | 143 | 167 | 191 |
| 27 | 55 | 83 | 111 | 139 | 167 | 195 | 223 |
| 31 | 63 | 95 | 127 | 159 | 191 | 223 | 255 |

FIG. 35

| -384 | -328 | 0 | -34 | 0 | -10 | 0 | -3 |
|------|------|---|-----|---|-----|---|----|
| -328 | 166  | 0 | 17  | 0 | 5   | 0 | 1  |
| 0    | 0    | 0 | 0   | 0 | 0   | 0 | 0  |
| -34  | 17   | 0 | 2   | 0 | 1   | 0 | 0  |
| 0    | 0    | 0 | 0   | 0 | 0   | 0 | 0  |
| -10  | 5    | 0 | 1   | 0 | 0   | 0 | 0  |
| 0    | 0    | 0 | 0   | 0 | 0   | 0 | 0  |
| -3   | 1    | 0 | 0   | 0 | 0   | 0 | 0  |

FIG. 36

| -384 | -328 | 0 | 0 | 0 | 0 | 0 | 0 |
|------|------|---|---|---|---|---|---|
| -328 | 0    | 0 | 0 | 0 | 0 | 0 | 0 |
| 0    | 0    | 0 | 0 | 0 | 0 | 0 | 0 |
| 0    | 0    | 0 | 0 | 0 | 0 | 0 | 0 |
| 0    | 0    | 0 | 0 | 0 | 0 | 0 | 0 |
| 0    | 0    | 0 | 0 | 0 | 0 | 0 | 0 |
| 0    | 0    | 0 | 0 | 0 | 0 | 0 | 0 |
| 0    | 0    | 0 | 0 | 0 | 0 | 0 | 0 |

FIG. 37

| 0 | 0 | 0 | -34 | 0 | -10 | 0 | -3 |
|---|---|---|---|---|---|---|---|
| 0 | 166 | 0 | 17 | 0 | 5 | 0 | 1 |
| 0 | 0 | 0 | 0 | 0 | 0 | 0 | 0 |
| -34 | 17 | 0 | 2 | 0 | 1 | 0 | 0 |
| 0 | 0 | 0 | 0 | 0 | 0 | 0 | 0 |
| -10 | 5 | 0 | 1 | 0 | 0 | 0 | 0 |
| 0 | 0 | 0 | 0 | 0 | 0 | 0 | 0 |
| -3 | 1 | 0 | 0 | 0 | 0 | 0 | 0 |

FIG. 38

UNDER FLOW PORTION

| -34 | -25 | -9 | 12 | 34 | 55 | 71 | 80 |
|---|---|---|---|---|---|---|---|
| -25 | -16 | -1 | 21 | 43 | 64 | 80 | 89 |
| -9 | -1 | 16 | 37 | 59 | 80 | 96 | 105 |
| 12 | 21 | 37 | 58 | 80 | 101 | 117 | 126 |
| 34 | 43 | 59 | 80 | 103 | 124 | 140 | 148 |
| 55 | 64 | 80 | 101 | 124 | 145 | 161 | 169 |
| 71 | 80 | 96 | 117 | 140 | 161 | 177 | 185 |
| 80 | 89 | 105 | 126 | 148 | 169 | 185 | 194 |

FIG. 39

UNDER FLOW PORTION

| 38 | 32 | 22 | 5 | -16 | -33 | -43 | -49 |
|---|---|---|---|---|---|---|---|
| 32 | 30 | 23 | 10 | -5 | -18 | -24 | -27 |
| 22 | 23 | 20 | 11 | 0 | -9 | -12 | -11 |
| 5 | 10 | 11 | 5 | -1 | -7 | -6 | -1 |
| -16 | -5 | 0 | -1 | -3 | -4 | 1 | 12 |
| -33 | -18 | -9 | -7 | -4 | -2 | 7 | 22 |
| -43 | -24 | -12 | -6 | 1 | 7 | 20 | 38 |
| -49 | -27 | -11 | -1 | 12 | 22 | 38 | 60 |

FIG. 44

| 94  | 103 | 119 | 140 | 162 | 183 | 199 | 208 |
|-----|-----|-----|-----|-----|-----|-----|-----|
| 103 | 112 | 127 | 149 | 171 | 192 | 208 | 217 |
| 119 | 127 | 134 | 165 | 187 | 208 | 224 | 233 |
| 140 | 149 | 165 | 187 | 208 | 229 | 248 | 254 |
| 162 | 171 | 187 | 208 | 231 | 252 | 268 | 276 |
| 183 | 192 | 208 | 229 | 252 | 273 | 289 | 297 |
| 199 | 208 | 224 | 245 | 268 | 289 | 305 | 313 |
| 208 | 217 | 233 | 254 | 276 | 297 | 313 | 322 |

FIG. 45

| 166 | 160 | 150 | 133 | 112 | 94  | 85  | 79  |
|-----|-----|-----|-----|-----|-----|-----|-----|
| 160 | 158 | 151 | 138 | 123 | 110 | 104 | 101 |
| 150 | 151 | 208 | 139 | 128 | 119 | 116 | 117 |
| 133 | 138 | 139 | 133 | 127 | 121 | 122 | 127 |
| 112 | 123 | 128 | 127 | 125 | 124 | 129 | 140 |
| 95  | 110 | 119 | 121 | 124 | 126 | 135 | 150 |
| 85  | 104 | 116 | 122 | 129 | 135 | 148 | 166 |
| 79  | 101 | 117 | 127 | 140 | 150 | 166 | 188 |

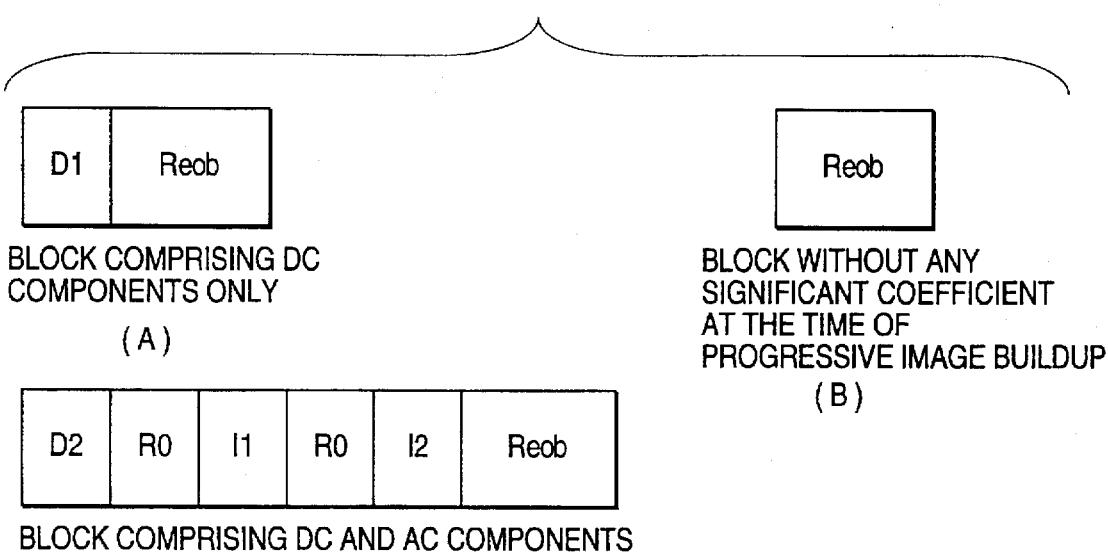

FIG. 49

BLOCK COMPRISING DC COMPONENTS ONLY
(A)

BLOCK WITHOUT ANY SIGNIFICANT COEFFICIENT AT THE TIME OF PROGRESSIVE IMAGE BUILDUP
(B)

BLOCK COMPRISING DC AND AC COMPONENTS

Dm: DECODED DATA OF DC COMPONENTS (THE mTH BLOCK)
In: DECODED DATA OF AC COMPONENTS WITH SIGNIFICANT INDEX (THE mTH BLOCK)
Rk: DECODED DATA WITH THE LENGTH (k) OF RUN OF INVALID INDEX COMPRISING AC COMPONENTS
Reob: DATA INDICATING THE TERMINATION OF A BLOCK BY RUNNING WITH AN INVALID INDEX

IMAGE DATA PROCESSING SYSTEM

This application is a continuation of application Ser. No. 07/671,208, filed Mar. 18, 1991, now abandoned.

BACKGROUND OF THE INVENTION

This invention pertains to a method of restoring image data of continuous-tone images, such as grayscale images and color images, more particularly to the method of restoring image data encoded after splitting a continuous-tone image into blocks comprising a plurality of picture elements and then performing orthogonal transformations for the picture elements in each block.

When the volumes of image data representing continuous-tone images, such as grayscale images and color images, are too large, it is necessary to appropriately compress the total volume of image data when stored or transmitted.

Under such conditions the Adaptive Discrete Cosine Transformation (hereafter abbreviated as ADCT), an orthogonal transformation, is widely used for compressing and encoding image data without altering the characteristics of continuous-tone image data.

DESCRIPTION OF THE PRIOR ART

The related art method described is the ADCT method used widely as an orthogonal transformation method.

According to the ADCT method, images are divided into blocks comprising e.g. 8*8 picture elements. DCT coefficients expressing the distribution of space frequencies are determined by performing the two-dimensional discrete cosine transformations (hereafter abbreviated as DCTs) for the image signals from respective divided blocks. The image signals are encoded by quantizing the DCT coefficients using thresholds corresponding to visions, according to a Huffman table obtained statistically from the quantized coefficients.

FIGS. 1 and 2 are the functional block diagrams illustrating the ADCT encoding processes. FIG. 1 shows the basic configuration of an ADCT encoding circuit, and FIG. 2 shows in detail the configuration of a two-dimensional DCT unit composing the ADCT encoding circuit.

FIGS. 3 and 4 are functional block diagrams illustrating the ADCT decoding processes. FIG. 3 shows the basic configuration of an ADCT decoding circuit and FIG. 4 shows in detail the configuration of a two-dimensional inverse DCT unit of the ADCT decoding circuit.

FIG. 5 shows exemplary data for an original image received by the two-dimensional DCT unit.

FIG. 6 shows exemplary DCT coefficients representing a space frequency distribution.

First, the ADCT encoding processes are outlined by referring to the functional block diagrams of the ADCT encoding processes shown in FIGS. 1 and 2.

Second, the ADCT decoding processes are outlined by referring to the functional block diagrams of the ADCT decoding processes shown in FIGS. 3 and 4.

A two-dimensional DCT unit 40 receives sixty-four (64) image signals, such as those shown in FIG. 5, for a block comprising 8*8 picture elements. By processing the two-dimensional DCTs for the received image signals, the two-dimensional DCT unit 40 calculates the DCT coefficients representing a space frequency distribution, such as those shown in FIG. 6, and outputs them to a linear quantizer 41 in the next stage.

FIG. 2 shows more concretely the processes of calculating the DCT coefficients executed by the two-dimensional DCT unit 40. A one-dimensional DCT unit 400 multiplies the matrix representing the received image signals by the matrix representing the DCT coefficients (constants having 8*8 matrix data format) stored in a DCT constant storage unit 401, and a transposer 402 transposes the product matrix obtained as a result of the matrix multiplication at the one-dimensional DCT unit 400. Then, a one-dimensional DCT unit 403 multiplies the transposed matrix obtained from matrix transposition in the transposer 402 by the matrix representing the DCT constants stored in the DCT constant storage unit 401. Finally, the transposer 404 transposes the product matrix obtained from the matrix multiplication in the one-dimensional DCT unit 403 and outputs, as the matrix representing the DCT coefficients calculated from the received image signals by the two-dimensional DCT unit 40, the transposed matrix obtained from the matrix transposition at the transposer 404.

On receiving the DCT coefficients calculated by the two-dimensional DCT unit 40, the linear quantizer 41 quantizes those less than the corresponding thresholds to "0" and quantizes those not less than the corresponding thresholds to the integer quotient obtained by dividing the respective DCT coefficients by the quantization thresholds stored at the corresponding matrix positions in a quantization threshold storage unit 42.

FIG. 7 shows exemplary quantization thresholds (in the 8*8 matrix data format) stored in the quantization threshold storage unit 42 and used for the respective divisions.

FIG. 8 shows exemplary quantized coefficients (in the 8*8 matrix data format). In this case, only the D.C. (direct current) element (the matrix value of the first row and the first column) and a few A.C. (alternate current) elements (the matrix values of other than the first row and the first column) of the quantized coefficients are positive.

FIG. 9 shows the order of scanning the generated quantized coefficients (from the lower frequency elements to the higher frequency elements of the space frequencies). The linear quantizer 41 outputs the generated quantized coefficients to a variable length encoder 43 in the next stage according to the zigzag scanning order shown in FIG. 9.

Upon receipt of these quantized coefficients, the variable length encoder 43 encodes generated quantized coefficients by referring to a code table 44 composed of a Huffman table created by statistical values for the respective images. As for their D.C. component, the difference between the D.C. elements of the present and preceding blocks is encoded by using a variable length. As for their A.C. components, the run length between quantized coefficients other than 0 (hereafter referred to as index values) is encoded by using variable lengths. The variable length encoder 43 sequentially outputs the code data to the external units.

Second, a variable length decoder 50 receives the code data encoded by the above ADCT processes. The variable length decoder 50 decodes the received code data to fixed length data of the index values and the run lengths and outputs the decoded data to a dequantizer 52, according to a decoding table 51 composed of a table inverse of the Huffman table composing the code table 44.

On receiving the decoded data (the decoded quantized coefficients), the dequantizer 52 restores the DCT coefficients through a dequantization by multiplying the respective decoded data by the thresholds stored at the corresponding positions in a quantization threshold storage unit 53 (for controlling the same quantization thresholds as those stored in the quantization threshold storage 42). The dequantizer 52 outputs the restored DCT coefficients to a two-dimensional inverse DCT unit 54 in the next stage.

Upon receipt of the restored DCT coefficients, the two-dimensional inverse DCT unit 54 restores the image signals from the restored DCT coefficients indicating the distribution of the space frequencies by applying inverse DCT processes to the restored DCT coefficients.

FIG. 4 shows more concretely the processes of restoring the image signals executed at the two-dimensional inverse DCT unit 54. A one-dimensional inverse DCT unit 540 multiplies the matrix representing the restored DCT coefficients by the matrix representing the inverse DCT constants stored in the inverse DCT constant storage 541 (the transposed matrix of the matrix representing the DCT constants stored in the DCT constant storage 401). A transposer 542 transposes the product matrix obtained from the matrix multiplication at the one-dimensional inverse DCT unit 540. Then, a one-dimensional inverse DCT unit 543 multiplies the transposed matrix obtained from the matrix transposition at the transposer 542 by the matrix representing the inverse DCT constants stored in the inverse DCT constant storage 541. Finally, the transposer 544 transposes the product matrix obtained from the matrix multiplication in the one-dimensional inverse DCT unit 543 and outputs, as the matrix representing the image signals restored from the DCT coefficients by the two-dimensional inverse DCT unit 54, the transposed matrix obtained from matrix transposition at the transposer 544.

Next, the prior art circuit configuration of the one-dimensional DCT unit 400 in the two-dimensional DCT unit 40 is explained. The one-dimensional DCT unit 403 in the two-dimensional DCT unit 40 and the one-dimensional inverse DCT unit 540, and 543 in the two-dimensional inverse DCT unit 54 have exactly the same circuit configuration.

Assume here that the received image signals for 8*8 picture elements are expressed by an 8*8 matrix X, that the DCT constants stored in the DCT constant storage 401 are expressed by an 8*8 matrix A, and that the product matrix A*X obtained by the one-dimensional DCT unit 400 is expressed by an 8*8 matrix Y.

Matrix multiplication is performed by multiplying the rows of the first matrix by the columns of the second matrix. More specifically, the one-dimensional DCT unit 400 obtains a element value $Y_{ab}$ of matrix Y at row a and column b by the sum of the products between the respective elements of a row matrix $A_{aj}$ of the first matrix, i.e. matrix A, and the corresponding elements of a column matrix $X_{jb}$ of the second matrix, i.e. matrix X, for all integers j 1 through 8. That is, $Y_{ab}$=SIGMA(j=1 through 8) $A_{aj}$ * $X_{jb}$ By defining $F_{ajb}$=$A_{aj}$ * $X_{jb}$, for convenience, the above equation is rewritten:

$$Y_{ab}=\text{SIGMA}(j=1 \text{ through } 8) F_{ajb} \qquad [1]$$

To realize the above sum-of-product operations for all combinations of integers a and b 1 through 8, a device comprising latch circuits, multipliers, adders and a multiplexer, such as that shown in FIG. 10, is conventionally used to embody the one-dimensional DCT unit 400.

A latch circuit 410 sequentially sets one of the eight (8) received image signals $X_{jb}$(where j is an integer 1 through 8) representing the eight (8) picture elements in column b of an 8*8 picture element block.

The following is a description of the j-th step in processing the j-th image signal $X_{jb}$.

The one-dimensional DCT unit 400 has the DCT constant storage 401 simultaneously output to eight (8) latch circuits 411-1 through 411-8, eight (8) corresponding DCT constants $A_{ij}$(where i is an integer 1 through 8) representing eight (8) DCT constants for weighting the eight (8) picture elements in a particular column of an 8*8 picture element block.

Eight (8) multipliers 412-1 through 412-8 provided in correspondence with eight (8) latch circuits 411-1 through 411-8 respectively multiply the DCT constants $A_{1j}$ through $A_{8j}$ set in and received from latch circuits 411-1 through 411-8 by the image signal $X_{jb}$ set in and received from latch circuit 410, and set the products in latch circuits 413-1 through 413-8.

Thus, parallelly calculated are eight (8) j-th terms $F_{1jb}$ through $F_{8jb}$ of eight (8) equations, having the same format as equation [1], for obtaining eight (8) element values $Y_{1b}$ through $Y_{8b}$ in column b of product matrix Y.

Eight (8) adders 414-1 through 414-8, provided in correspondence with eight (8) latch circuits 413-1 through 413-8, add the obtained products $F_{1jb}$ through $F_{8jb}$ appearing as respective j-th terms on the right side of eight (8) equations for obtaining eight (8) element values $Y_{1b}$ through $Y_{8b}$ in column b of product matrix Y to the values retained in latch circuits 415-1 through 415-8, having initial values 0, respectively connected to the output terminals of adders 414-1 through 414-8. Latch circuits 415-1 through 415-8 now store the the above sums in lieu of the hitherto retained values.

The values hitherto retained in latch circuits 415-1 through 415-8 are the eight (8) sums of $F_{i1b}$ representing the first term through $F_{i(j-1)b}$ representing the (j-1)-th term on the right side of the equation for obtaining eight (8) element values $Y_{ib}$, where i is each integer 1 through 8. Thus, the values newly stored in latch circuits 415-1 through 415-8 are the eight (8) sums of $F_{i1b}$ representing the first term through $F_{ijb}$ representing the j-th term on the right side of the equation for obtaining eight (8) element values $Y_{ib}$.

That is, after the one-dimensional DCT unit 400 has the DCT constant storage 401 output the j-th image signal $X_{jb}$, latch circuits 415-1 through 415-8 parallelly store the respective eight (8) accumulations from the first terms $F_{i1b}$ to the j-th terms $F_{ijb}$ for each integer i 1 through 8.

When j reaches 8, i.e. when the calculations for the right side of the eight (8) equations for obtaining eight (8) element values $Y_{1b}$ through $Y_{8b}$ in column b of product matrix Y are consummated, latch circuits 416-1 through 416-8 latch eight (8) element values $Y_{1b}$ through $Y_{8b}$ for eight (8) picture elements in column b of product matrix Y.

A multiplexer 417 outputs element values $Y_{1b}$ through $Y_{8b}$ latched by latch circuits 416-1 through 416-8 by sequentially selecting them.

The one-dimensional DCT unit 400 thus transforms all image signals in an 8*8 picture element block by repeating the above procedures for each column b from 1 to 8. It transforms all image data of one image screen comprising a plurality of such picture element blocks through repetitions of the transformation processes.

FIG. 12 shows in detail the configuration of a conventional decoder.

A quantization threshold storage 53 stores the quantization matrix. The decoding data from the variable length decoder 50 are supplied to a demultiplexer 521 in the dequantizer 52.

An address counter 527 performs counting actions per image revising signal supplied from a timing controller 522, and supplies the image revising signals to a quantized coefficient retainer 528 by using the counting values as addresses.

The demultiplexer 521 separates the supplied decoding data per selection signal supplied from the timing controller 522, index data are supplied to a multiplexer 523 and run data are supplied to a run length judging unit 524.

The run length judging unit 524 retains the number of insignificant coefficients shown by the supplied run data, and supplies to the multiplexer 523 per selection signal that remain logical "0" until the insignificant coefficient number of the pulses of the picture element revision signals are supplied. The multiplexer 523 outputs the index data per the inputted index value, and inserts the insignificant coefficients omitted during encoding processes by outputting "0" from a zero generator 525 per the above described selection signal, thereby restoring the one-dimensional data transformed from the quantized coefficients.

By storing the output from the multiplexer 523 in the quantized coefficient retainer 528 in correspondence with the output from the above described address counter 527, the quantized coefficients in the 8*8 matrix format are restored.

Then, the timing controller 522 switches the quantized coefficient retainer 528 and the quantization threshold storage 53 to the read-out mode. The respective elements of the quantization matrix are multiplied by the corresponding quantized coefficients in correspondence with the read-out addresses outputted from the address counter 527, and DCT coefficients D are thereby restored.

A two-dimensional inverse DCT unit 54 orthogonally transforms DCT coefficients D by inverse discrete cosine transformation for DCT coefficients D, and the image data of respective blocks are thereby restored.

Image signals encoded by the encoding circuit shown in FIG. 1 are decoded by the decoding circuit shown in FIG. 3. They are then processed and transmitted in units of 8*8 picture element blocks divided from the image data of a display screen.

Moving images seldom change significantly, and the changes are mainly in detail, especially in the high range when they are transformed orthogonally. Therefore, a rough image is transmitted in the first stage and a fine image in the second stage, thereby restoring the image data progressively.

FIG. 11 is a block diagram of a conventional decoding circuit (progressive image buildup).

The conventional progressive restoring method is explained by referring to FIG. 11. The variable length decoder 50 receives code data through its input terminal 55. X01 through X64 represent the scanning order of the DCT coefficients (corresponding to 1 through 64 shown in FIG. 9). The variable length decoder 50 decodes code data corresponding to the DCT coefficients from the first terms to the n1-th term (where n1<64) into quantized DCT coefficients by using the decoding table 51.

The dequantizer 52 receives the decoded quantized coefficients, which are transformed (restored) to image data by the two-dimensional inverse DCT unit 54. The restored image here refers to the rough image data transmitted in the first stage. The image memory 58 retains the rough image data obtained by the two-dimensional inverse DCT unit 54 and transmitted from its output terminal 59.

Next, the variable length decoder 50 decodes the code data corresponding to the DCT coefficients from the n1-th term to the n2-th term (where n1<n2≦64) into quantized DCT coefficients. The decoded quantized coefficients. The decoded quantized coefficients are outputted to the dequantizer 52 to be dequantized to the DCT coefficients, which are transformed into image data by the two-dimensional DCT inverse DCT unit 54.

An adder 57 adds the obtained image data to the image data retained in the image memory 58, stores the added image data in the image memory 58 in lieu of the hitherto retained image data, and outputs the added image data from the output terminal 59.

These processes are repeated until finally the variable length decoder 50 decodes the DCT coefficients from the first term to the sixty-fourth term into image data and the image memory 58 retains the restored image data.

Thus, by sequentially adding the code data until finally all data are transmitted, the progressive image buildup of the 8*8 picture element block is completed.

As stated earlier, in the prior art, when the one-dimensional inverse DCT unit 540 restores DCT coefficients to images, the DCT coefficients of all picture elements in all blocks need to undergo inverse DCTs. This is represented by matrix A. Thus, when a block comprises 8*8 picture elements, the inverse DCTs must be performed for the respective 8*8 matrix elements of matrix X. Since each set of operations for a picture element comprises eight (8) multiplications between corresponding matrix elements and seven (7) additions of the eight (8) products, the calculations of product matrix Y(=A*X) take a total of 512 multiplications and 448 additions for all 8*8 picture elements.

Thus, there is a problem that the image restoration cannot be expedited if all picture elements in all blocks of a screen undergo inverse DCTs. In particular, if the image data (or their difference data) are restored progressively for respective groups of DCT coefficients divided into a predetermined number, as shown in FIGS. 13 and 14, since the higher-order DCT coefficients have many zero (0) values, it is quite common for all DCT coefficients in the blocks newly restored to have zero (0) values. In this case many unnecessary processings are performed, because the restored image data are all zero anyway.

To reiterate, the multiplier 529 in the dequantizer 52 multiplies all elements of the restored quantized coefficients by the corresponding elements of the quantization matrix. Thus, to dequantize the quantized coefficients corresponding to a block, a total of 8*8 sum-of-product operations need to be performed for the picture elements to be restored to their images. Accordingly, since a large number of sum-of-product operations need to be performed, restoration processings take too much time.

Although the prior art for matrix calculation shown in FIG. 10 expedites the transformation processes, the numbers of the multipliers 412 and adders 414 must necessarily match that of the picture elements in a column of a block. In this case, since there are eight (8) picture elements in a block, eight (8) multipliers 412-1 through 412-8 and eight adders 414-1 through 414-8 are required.

As is widely known, a large number of gates are required to configure multipliers 412-1 through 412-8. Thus, the conventional one-dimensional DCT units 400 and 403 and one-dimensional inverse DCT units 540 and 543 have the problems of their circuit sizes being too large.

Thus, the inventor previously applied for a patent for and made a disclosure of "an orthogonal transformation device". This application was filed on Nov. 14, 1989 as the Japanese Patent Application 1989-295643, and was designed to enable a small circuit to operate matrix calculations.

However, in a conventional ADCT grayscale restoration, e.g. when eight-bit (256 levels) image data are used, an eleven-bit DCT coefficient buffer for retaining DCT coefficients after dequantization must be provided for the output of the dequantization part 52 and an eight-bit restoration image memory must be provided for the output of the two-dimensional DCT unit 54. Consequently, a 19-bit image memory is needed, causing the device sizes to be large and the processing efficiency of progressive image buildup to be lowered, since much processing time is required for memory accesses.

SUMMARY OF THE INVENTION

An object of this invention is to realize a high speed image data processing device by reducing the number of operations.

Another object is to minimize the scale of a matrix operation circuit with a high speed matrix operation capability.

A further object is to minimize the scale of a matrix operation circuit provided for a image data orthogonal transformer, etc.

A still further object is to perform progress image buildup effectively with a smaller scale of the circuit.

A feature of this invention resides in an image data processor using an image data restoration method for generating image data by normalizing the transformation coefficients generated by a dequantizer for dequantizing the quantized coefficients obtained by causing a decoding means to decode inputted code data generated by coding the quantized coefficients generated through a quantization of the respective transformation coefficients obtained by normalizing image data in one of the blocks comprising a plurality of picture elements divided from an image said dequantizer comprising a selecting means for selecting non-zero significant elements in the quantized coefficients supplied by said decoding means a storing means for storing quantization thresholds corresponding to the respective elements of said transformation coefficients and for outputting the quantization thresholds corresponding to the significant elements selected by said selecting means; and a multiplying means for multiplying the significant elements selected by said selecting means by the quantization thresholds corresponding to said significant elements outputted from said storing means and for outputting the resultant products as the elements of the transformation coefficients corresponding to said significant elements.

Further object of this invention resides in an image data processor wherein an image decoder comprises a decoding means for restoring coded quantized coefficients in block units, a dequantization means for restoring transformation coefficients by multiplying the quantized coefficients restored by said decoding means by the corresponding quantization thresholds, and an inverse normalization means for restoring image data through matrix operations for the product matrix obtained by matrix operations from a matrix representing transformation coefficients restored by said dequantization means and a matrix representing predetermined inverse normalization constants said dequantization means restores only the transformation coefficients corresponding only to non-zero quantized coefficients, specifies the address information for said transformation coefficients, and notifies said inverse normalization means of said transformation coefficients and said address information; and said inverse normalization means specifies the column matrix of the inverse normalization constants corresponding to the notified transformation coefficients per the notified address information, and restores image data by calculating said product matrix by multiplying said transformation coefficients by said column matrix.

Further object of this invention resides in an image data processor using an image data restoration method for restoring image data from the code data generated by coding the quantized coefficients generated by quantizing, with the corresponding quantization thresholds, the respective transformation coefficients obtained by performing two-dimensional discrete cosine transformations to the image data in a plurality of blocks each comprising a plurality of picture elements divided from an image: said dequantizer comprising: a decoding means for outputting quantized coefficients by decoding received code data; a dequantization means for restoring said transformation coefficients through a dequantization executed by multiplying the respective elements of said quantized coefficients outputted from said decoding means by the corresponding quantization thresholds; a direct current transformation means for generating image data based on the resultant product obtained by multiplying the D.C. element of said transformation coefficients by predetermined constants; a block detecting means for detecting a block with no significant A.C. element based on the transformation coefficients corresponding to the respective blocks or the quantized coefficients corresponding to respective blocks inputted from said dequantization means; and a selecting means for outputting either an output from said normalization means or an output from said direct current transformation means, per the detecting result by said block detecting means.

Further object of this invention resides in an image data processor being a matrix operating circuit for multiplying a matrix representing data to be processed by a matrix representing transformation constants in an image data normalizer for normalizing image data or inverse normalizing coded image data, said image data comprising: a first latching means for sequentially latching all data to be processed in a selected column of said matrix representing data to be processed; a second latching means for sequentially latching the transformation constants in the row matrix corresponding to the data to be processed being latched by said first latching means; a multiplying means, provided in correspondence with said second latching means, for multiplying the transformation constants latched by said second latching means by the data to be processed being latched by said first latching means; an adding means, provided in correspondence with said multiplying means, for accumulating the products obtained by said multiplying means; and a third latching means, provided in correspondence with said adding means, for latching the sum accumulated by said adding means; wherein: a latching means provided in correspondence with the respective divisions in said second latching means in said third latching means supplies the hitherto accumulated sum to said adding means and receives the newly updated accumulated sum from said adding means.

Further object of this invention resides in an image data processor being a matrix operating circuit for multiplying a matrix representing data to be processed by a matrix representing transformation constants in an image data normalizer for normalizing image data or inverse normalizing coded image data, said image data comprising: a first latching means for sequentially latching all data to be processed in a selected column of said matrix representing data to be processed per data divisions each having equal number of data to be processed; selecting means of a number equal to that of said divisions for outputting sequentially selected one of the latched data to be processed from said respective divisions; second latching means of said number equal to that of said divisions for sequentially latching the transformation constants in the row matrix corresponding to the data to be processed being latched by said first latching means; multiplying means, provided in correspondence with said second latching means, for multiplying the transformation constants latched by said second latching means by the data to be processed outputted from said selecting means; an adding means for calculating the sum total of the products obtained by said multiplying means; and an accumulating means for accumulating the sum total outputted from said adding means; wherein: when all data to be processed being latched by said first latching means are all zero (0), zero (0) is outputted to said accumulating means without performing the matrix calculations; and when said selecting means outputs data to be processed entirely being zero, said data to be processed are not outputted and the next data to be processed are outputted.

Further object of this invention resides in an image data processor, being an image data restorer for restoring an image from code data generated by coding the quantization DCT coefficients obtained by quantizing DCT coefficients obtained by performing a two-dimensional discrete cosine transformation to the gradations of the picture elements in respective blocks divided from an original image comprising a plurality of picture elements with N-bit gradations; said image data processor comprising: a decoding means for decoding divided code data divided from a block into DCT coefficients; a dequantization means for obtaining DCT coefficients by dequantizing the quantization DCT coefficients decoded by said decoding means; an inverse DCT means for obtaining image data through an inverse DCT by multiplying matrix representing the DCT coefficients inputted from said dequantization means; an image data retaining means, having a memory of at least N bits in depth, for retaining image data from said inverse DCT means; and an adding means for adding the image data from said inverse DCT means to the already retained image data read from said image data retaining means and for retaining the image data obtained by the addition: said image data processor for progressively building-up an image by retaining the accumulation of the divided image data sequentially restored from the divided code data.

Further object of this invention resides in an image data processor, being an image data restorer for restoring an image from code data generated by coding the quantization DCT coefficients obtained by quantizing DCT coefficients obtained by performing a two-dimensional discrete cosine transformation to the gradations of the picture elements in respective blocks divided from an original image comprising a plurality of picture elements with N-bit gradations; said image data processor comprising: a decoding means for decoding divided code data divided from a block into DCT coefficients a dequantization means for obtaining DCT coefficients by dequantizing the quantization DCT coefficients decoded by said decoding means; an inverse DCT means for obtaining image data through an inverse DCT by multiplying matrix representing the DCT coefficients inputted from said dequantization means; a level shifting means for eliminating an underflow by adding $2^{N-1}$ to the image data obtained by said inverse DCT means; an image data retaining means, having a memory of (N+1) bits in depth, for retaining image data from said inverse DCT means; and an accumulating means for accumulating the image data from said level shifting means and the already retained image data read from said image data retaining means and for storing the accumulated image data in said image data retaining means, when image data from said level shifting means are inputted to said image data retaining means: said image data processor for progressively building-up an image by retaining the accumulation of the divided image data sequentially restored from the divided code data.

Further object of this invention resides in an image data processor, being an image data restorer for restoring an image from code data generated by coding the quantization DCT coefficients obtained by quantizing DCT coefficients obtained by performing a two-dimensional discrete cosine transformation to the gradations of the N*N picture elements in respective blocks divided from an original image; said image data processor comprising: a decoding means for decoding said inputted code data; a dequantization means for obtaining DCT coefficients by dequantizing the quantization DCT coefficients decoded by said decoding means; an inverse DCT means for performing an inverse DCT for the DCT coefficients dequantized by said dequantization means; and a significant coefficient detecting means for making a control such that zero is outputted as the restored image data without performing an inverse DCT by said inverse DCT means or dequantization by said dequantization means, when there is no significant coefficients among the quantized coefficients, decoded by said decoding means, in the block.

Further object of this invention resides in an image data processor, being an image data restorer for restoring an image from code data generated by coding the quantization DCT coefficients obtained by quantizing DCT coefficients obtained by performing a two-dimensional discrete cosine transformation to the gradations of the N*N picture elements in respective blocks divided from an original image; said image data processor comprising: a decoding means for decoding said inputted code data; a dequantization means for obtaining DCT coefficients by dequantizing the quantization DCT coefficients decoded by said decoding means; an inverse DCT means for performing an inverse DCT for DCT coefficients; an image data retaining means for retaining image data; an adding means for adding image data memorized in said image memorizing means to image data undergone an inverse DCT by said inverse DCT means; an address generating means for generating addresses used for storing the image data obtained by said adding means; and an insignificant-block judging means for revising an address generated by said address generating means to the next block address, without storing an output from said adding means in said image data retaining means, when image data in said blocks undergone inverse DCT are all zero.

BRIEF DESCRIPTION OF THE DRAWINGS

FIG. 5 is an explanatory diagram of an inputted original image;

FIGS. 6A and 6B are explanatory diagrams of a calculated DCT coefficient;

FIG. 7 is an explanatory diagram of a threshold applied with quantization;

FIGS. 8A and 8B are explanatory diagrams of a generated quantized coefficient;

FIG. 9 is an explanatory diagram of a scanning sequence of quantized coefficients;

FIG. 13 is an example of splitting a DCT coefficient (the first stage);

FIG. 14 is an example of splitting a DCT coefficient (the second stage);

FIG. 17 is a diagram of an example of encoded data;

FIG. 18 is an explanatory diagram of an address storage;

FIG. 24 is a diagram of an example of encoded data;

FIG. 27B is a timing chart;

FIGS. 29B and 29C if a timing chart related with FIG. 29A;

FIG. 34 is an explanatory diagram of image data to be restored;

FIG. 35 is an explanatory diagram of a DCT coefficient to be restored;

FIG. 36 is an explanatory diagram of a split DCT coefficient of the first stage in the case the coefficient is split into two at the third level;

FIG. 37 is an explanatory diagram of a split DCT coefficient of the second stage in the case the coefficient is split into two at the third level;

FIG. 38 is an explanatory diagram of a split image data in the case the DCT coefficient in FIG. 36 is processed by inverse DCT;

FIG. 39 is a split image data in the case a DCT coefficient is processed by inverse DCT;

FIG. 44 is an explanatory diagram of FIG. 38 added with 128;

FIG. 45 is an explanatory diagram of FIG. 39 added with 128;

FIG. 49 is an example diagram of decoded data strings;

DESCRIPTION OF THE PREFERRED EMBODIMENTS

Figure 15:
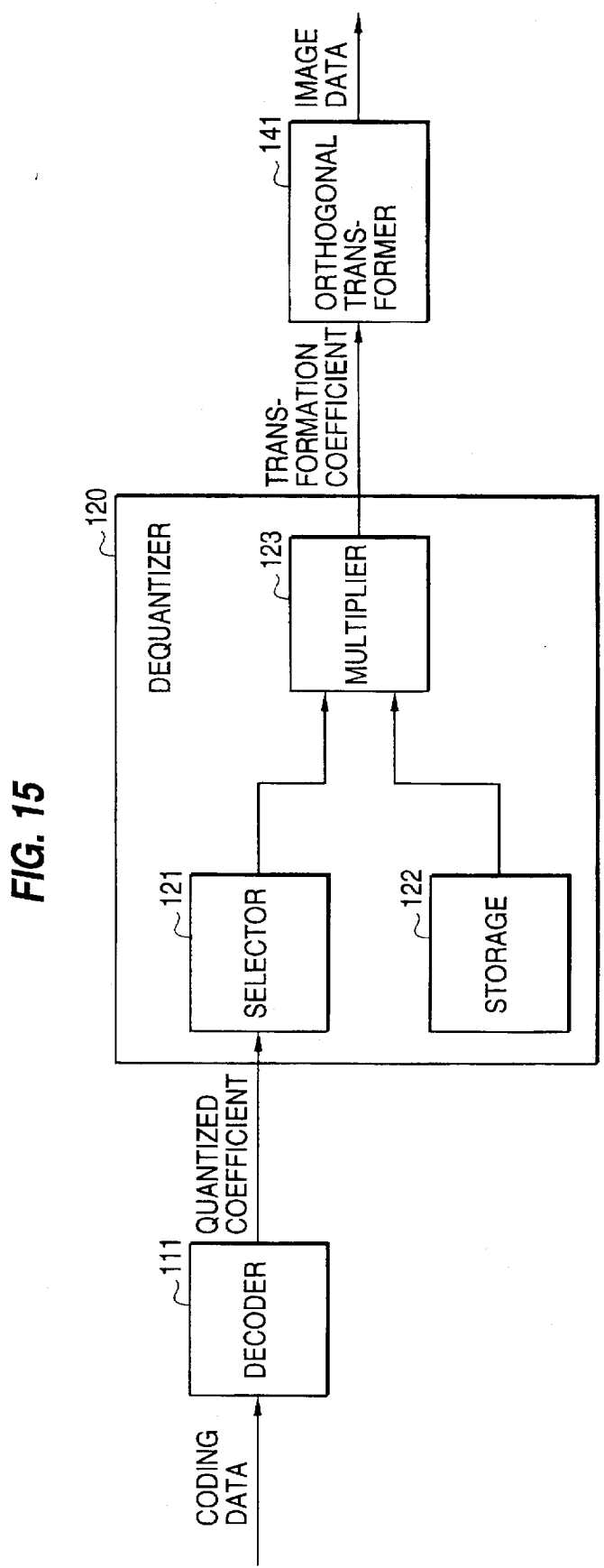
FIG. 15 is a block diagram of the principle of the first embodiment.

FIG. 15 shows a block diagram of the image data restoration method according to the first embodiment of this invention.

In FIG. 15, images are divided into a plurality of blocks each comprising a plurality of picture elements. The respective elements of DCT coefficients obtained by orthogonal transformation of image data in those blocks are quantized, and the quantized coefficients generated in the quantization processings are encoded to generate code data. These code data are decoded by a decoder 111 into quantized coefficients, which in turn are dequantized by a dequantizer 120. An orthogonal transformer 141 orthogonally transforms the DCT coefficients generated by the dequantizer 120 to restore image data. The dequantizer 120 in the image data restoration method comprises a selector 121 for selecting non-zero significant elements of quantized coefficients supplied form the decoder 111, a storage unit 122 for outputting the quantization thresholds corresponding to the significant elements selected by the selector 121, and a multiplier 123 for outputting as the elements of DCT coefficients corresponding to the significant elements the results of multiplying the significant elements selected by the selector 121 by the quantization thresholds corresponding to the significant elements and outputted from the storage unit 122.

The decoder 111 supplies the quantized coefficients generated through the processes of decoding the introduced code data to the selector 121 in the dequantizer 120.

When the selector 121 outputs to the multiplier 123 non-zero significant elements of the quantized coefficients supplied from the decoder 111, the storage unit 122 outputs the quantization thresholds corresponding to the significant elements selected by the selector 121.

Thus, the multiplier 123 selectively dequantizes the significant elements of the quantized coefficients by multiplying only significant elements of the supplied quantized coefficients as the corresponding quantization thresholds.

Therefore, the first embodiment of this invention enables quantization processings to be expedited by omitting the dequantization processings for the insignificant elements of quantized coefficients, i.e. by reducing the number of multiplications.

Figure 16:
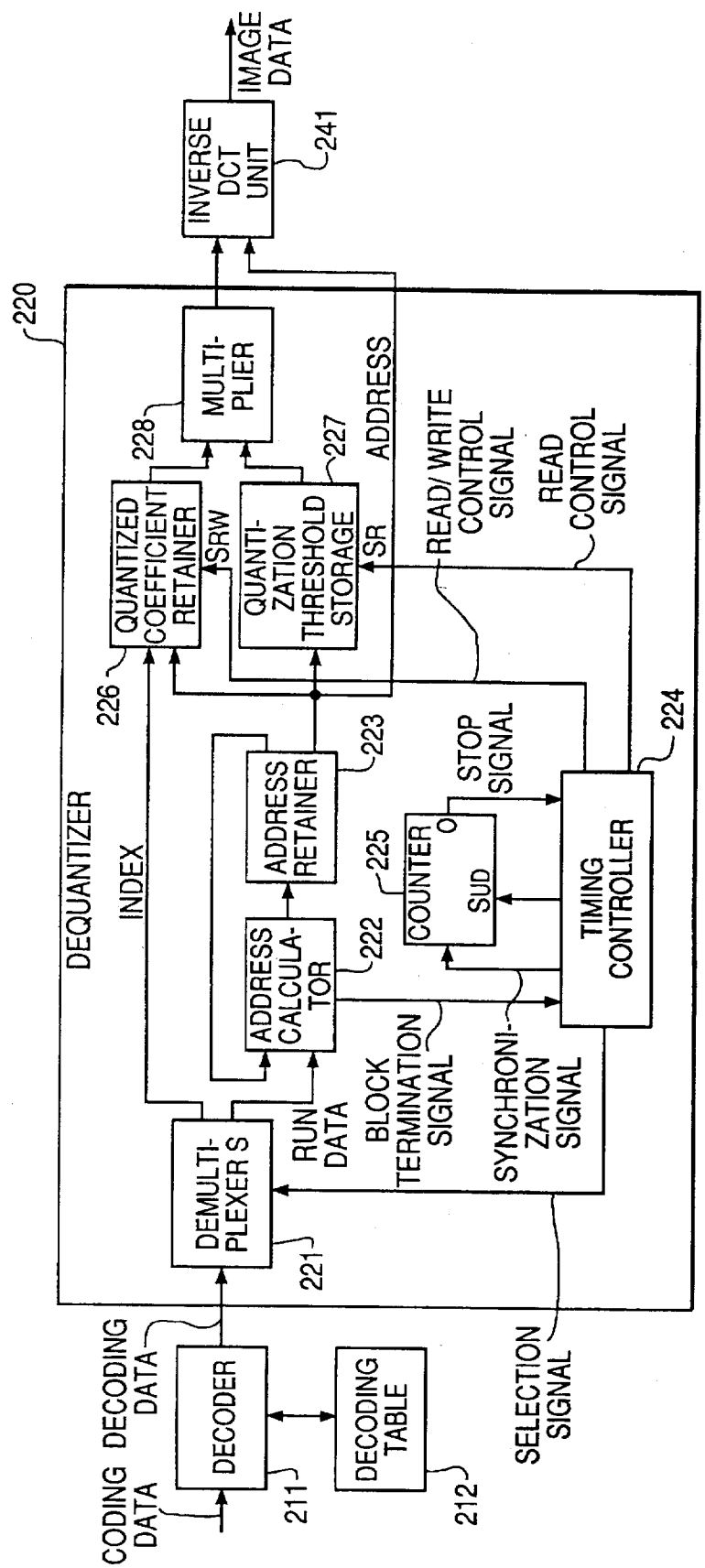
FIG. 16 is a configuration diagram of an embodiment of a restoring device.

FIG. 16 shows the configuration of a restoration device applied to the image data restoration method according to the first embodiment of this invention.

Here, the relations between the elements shown in FIG. 15 and those shown in FIG. 16 are explained.

The decoder 111 corresponds to a decoder 211 and a decoding table 212.

The dequantizer 120 corresponds to a dequantizer 220.

The selector 121 corresponds to an address calculator 222, an address retainer 223 and a quantized coefficient retainer 226.

The storage unit 122 corresponds to the address calculator 222, the address retainer 223 and a quantization threshold retainer 227.

The multiplier 123 corresponds to a multiplier 228.

The orthogonal transformer 141 corresponds to an inverse DCT unit 241.

The embodiment shown in FIG. 16 is described below based on these relations.

The decoding table 212 prestores, in a table, combined data of variable length codes and their corresponding indices and runs.

The code data supplied over a transmission path are inputted first to the decoder 211, which searches the decoding table 212 based on the inputted code data so that the combined data of the corresponding indices and runs are read from the decoding table 212. These data are supplied in turn to the dequantizer 220.

The dequantizer 220 restores DCT coefficients into matrix D by performing a dequantization processings to the quantized coefficients, based on the code data. The inverse DCT unit 241 performs an inverse DCT and an orthogonal transformation respectively on matrix D representing the DCT coefficients, so that image data are restored.

The following is a description of the configuration and operations of the dequantizer 220.

The dequantizer 220 comprises a demultiplexer 221 for separating decoding data into index data and run data, an address calculator 222 for calculating (later described) addresses, an address retainer 223 for accumulating addresses calculated by the address calculator 222, a counter 225 for counting the number of significant coefficients, a quantized coefficient retainer 226 for storing the index data supplied from the demultiplexer 221, a quantization threshold retainer 227 for storing the above described quantization matrix $V_{TM}$, a multiplier 228 for multiplying outputs from the quantized coefficient retainer 226 by outputs from the quantization threshold retainer 227, and a timing controller 224 for controlling the timing of operations at various units.

The decoding data supplied from the decoder 211 are inputted to the demultiplexer 221. When index data are supplied as decoding data, the timing controller 224 supplies a selection signal $C_{SL}$ of a logical "1" to control terminal S of the demultiplexer 221.

When the demultiplexer 221 receives a logical "1" as the selection signal $C_{SL}$ at its control terminal S, it supplies the index data of the inputted decoding data to the quantized coefficient retainer 226. When it receives a logical "0" as the selection signal $C_{SL}$ at its control terminal S, it supplies the run data of the inputted decoding data to the address calculator 222.

The counter 225 is an up-down counter and can choose the addition mode or the subtraction mode depending on the count control signal inputted to the control terminal $S_{UP}$. The counter 225 is configured to perform counting operations based on the chosen mode and synchronized with synchronization signals supplied to a clock terminal.

The quantized coefficient retainer 226 and the quantization threshold retainer 227 are formed as storage areas corresponding to the respective matrix elements of 8*8 matrices. The addresses of respective areas are specified by the zigzag scanning order shown in FIG. 9. The quantized coefficient retainer 226 can select a write-in mode and a read-out mode depending on the read-write control signal inputted to control terminal $S_{RW}$. For instance, when a logical "1" is inputted to control terminal $S_{RW}$, the quantized coefficient retainer 226 operates in the write mode, and when a logical "0" is inputted to control terminal $S_{RW}$, the quantized coefficient retainer 226 operates in the read mode.

The quantization threshold retainer 227 reads and outputs the quantization threshold stored in the addresses designated by an address input, when a logical "0" is supplied to control terminal $S_R$ as a read control signal.

As shown in FIG. 18, the address retainer 223 is formed by e.g. 64 storage areas assigned with numbers 1 through 64. Addresses supplied from the address calculator 222 are sequentially stored in these storage areas and the previously stored address is outputted back to the address calculator 222 as well as to the quantized coefficient retainer 226.

The dequantizer 220 shown in FIG. 16 first restores the quantized coefficients to a matrix format, based on the code data supplied from the decoder 211.

When the restoration processes for the decoding data corresponding to respective blocks begin, the contents of the above described address retainer 223 are cleared, and "1" is stored as the initial address value in storage area 1. The timing controller 224 sets the write mode to the quantized coefficient retainer 226 by inputting a logical "1", as the read/write control signal, to control terminal $S_{RW}$, and clears the contents in the storage areas corresponding to the respective addresses of the quantized coefficient retainer 226.

The timing controller 224 sets the counter 225 to the addition mode and the count value of the counter 225 is reset to the initial value 0.

Depending on the selection signal $C_{SL}$ supplied from the timing controller 224, the decoding data outputted from the decoder 211 (refer to FIG. 17) are separated into index data and run data. These data are respectively supplied to the quantized coefficient retainer 226 and the address calculator 222.

When the first index data are inputted, the quantized coefficient retainer 226 receives, as an address, the initial value 1 prestored in the address retainer 223. The index data are stored in correspondence with address "1".

Here, the run data refers to the number of insignificant coefficients succeeding significant coefficients shown by the corresponding index data. Hence, the result of accumulating the number indicated by the supplied run data plus 1 shows the total number of the elements of the quantized coefficients transformed in one dimension. This total corresponds to the address in the last element.

The address calculator 222 adds the run data supplied from the demultiplexer 221 to the outputs from the above described address retainer 223. By further adding 1 to the added result, the address calculator 222 performs the above described accumulation. The address calculator 222 supplies the accumulation result as the address, to the address retainer 223 and these addresses are stored in the address retainer 223.

However, in this case, the initial address value 1 stored in the address retainer 223 is further added. Accordingly, the addresses calculated by the address calculator 222 are addresses for significant coefficients corresponding to the index data supplied as the next decoding data. The inputted index data are stored in the quantized coefficient retainer 226 in correspondence with the addresses.

For instance, index data $D_m$ corresponding to the D.C. elements of the decoding data shown in FIG. 17 are stored in the storage area of the quantized coefficient retainer 226 corresponding to the initial address value 1 stored in the address retainer 223, i.e. the storage area corresponding to the element (1,1) of the quantized coefficients shown as number 1 in FIG. 9.

The address calculator 222 calculates address 2 corresponding to next index data $I_2$ according to run data $R_0$ corresponding to the index data $D_m$. By performing similar processes for succeedently supplied decoding data $(I_2, R_0, I_3, \ldots, I_6, R_3)$, the address calculator 222 sequentially outputs addresses 3, 4, 5, 6 and 10. In correspondence with these addresses, the quantized coefficient retainer 226 stores index data $I_2, I_3, I_4, I_5, I_6$ and $I_7$, and the address retainer 223 sequentially accumulates 1, 2, 3, 4, 5, 6 and 10 as the addresses of significant coefficients.

By repeating the above processes each time run data are supplied, the address calculator 222 sequentially calculates the addresses of significant coefficients, and the address retainer 223 sequentially stores the addresses of these significant coefficients. The quantized coefficient retainer 226 stores index data corresponding to the addresses supplied after the above described run data, which restores the quantized coefficients in the 8*8 matrix form.

The timing controller 224 supplies to the counter 225 synchronization signals synchronized with the actions of storing index data by the above described quantized coefficient retainer 226. The counter 225 counts the total of the significant coefficients included in the quantized coefficients for the respective blocks.

When the address calculator 222 receives $R_{eob}$ as run data, it judges that the receipt of decoding data corresponding to a block has ended, and outputs a block ending signal (BEN) to the timing controller 224.

On receiving the block ending signal (BEN), the timing controller 224 judges that the restoration processes for quantized coefficients for a block has ended, and the processes for dequantizing the quantized coefficients corresponding to the block are to begin.

The dequantization processes for the restored quantized coefficients are explained below.

The timing controller 224 supplies logical "0", as a read/write control signal (R/W), to control terminal $S_{RW}$ of the quantized coefficient retainer 226 and, as a read control signal (RED), to the quantization threshold retainer 227. Thereafter, in correspondence with the addresses supplied from the address retainer 223, the quantized coefficients and the corresponding elements of quantization matrix $V_{TM}$ are read respectively from the quantized coefficient retainer 226 and the quantization threshold retainer 227, to be supplied to the multiplier 228.

The timing controller 224 also supplies logical "0" to control terminal $S_{UD}$ in the counter 225, sets the counter to a subtraction mode, sequentially specifies the storage area of the address retainer 223, and supplies synchronization signals synchronized with the specifying actions to the counter 225.

Thus, addresses stored in the address retainer 223 are sequentially outputted to the quantized coefficient retainer 226 and the quantization threshold retainer 227. According to these addresses, the quantized coefficient retainer 226 outputs significant coefficients corresponding to the quantized coefficients and the quantization threshold retainer 227 outputs the elements of quantization matrix $V_{TM}$ corresponding to the significant coefficients.

When restoration processes of the quantized coefficients are performed for the decoding data shown in FIG. 17, for example, addresses 1, 2, 3, 4, 5, 6 and 10 corresponding to the significant elements of the quantized coefficients stored in the address retainer 223 are sequentially outputted. (Refer to FIG. 18.) The elements 64, -16, ..., -8, -8 of quantized coefficients stored in the quantized coefficient retainer 226 are sequentially read according to these addresses. (Refer to FIG. 8.) The quantization threshold retainer 227 reads out 16, 11, ..., 10, 14 of matrix $V_{TM}$ corresponding to these elements of the quantized coefficients, and supplies them to the multiplier 228.

The counter 225 subtracts the count value synchronized with the above described synchronization signal in parallel with the dequantization processes of the significant coefficients. When the count value falls to 0, the counter 225 outputs a stop signal from its output terminal 0 to the timing controller 224.

The timing controller 224 judges according to the stop signal that a dequantization process of quantized coefficients corresponding to a block have been completed, and terminates its actions of specifying the storage area for the address retainer 223.

Thus, by repeating the above described reading actions until the count value of the counter 225 falls to 0, the significant coefficients included in quantized coefficients and the corresponding elements in quantization matrix $V_{TM}$ are supplied sequentially to the multiplier 228, where they are multiplied, thereby enabling only significant coefficients included in quantized coefficients to be dequantized selectively.

By supplying the output from the multiplier 228 and corresponding addresses to an input buffer (not shown in the drawings) provided inside of the inverse DCT unit 241 and by storing the the outputs from the multiplier 228 corresponding to the above addresses, 8*8 DCT coefficient matrix D is restored. By performing a conventional inverse DCT for 8*8 DCT coefficient matrix D, image data of a block are obtained.

The multiplications by the multiplier 228 is the most time-consuming of the processes for dequantizations. Thus, by omitting multiplications for insignificant coefficients, dequantizations are considerably expedited.

Ordinarily, quantized coefficients contain many insignificant coefficients. For instance, as shown in FIG. 7, fifty-seven (57) elements are insignificant coefficients, whereas only seven (7) elements are significant coefficients. In this case, since only seven (7), instead of sixty-four (64), sum-of-product operations need to be performed, dequantizations are processed in about one-tenth of the time taken with the conventional method.

Thus, by selectively dequantizing only the significant coefficients included in quantized coefficients, the time required for the dequantizations is significantly shortened and the restoration processes are expedited.

The quantized coefficient retainer 226 in the dequantizer 220 shown in FIG. 16 can be configured by a FIFO, so that only significant coefficients in quantized coefficients corresponding to a block are stored. In this case, the significant coefficients are sequentially read from the quantized coefficient retainer 226. Furthermore, the elements of quantization matrix $V_{TM}$ corresponding to the significant coefficients are read from the quantization threshold retainer 227 according to the addresses sequentially outputted from the address retainer 223.

Figure 19:
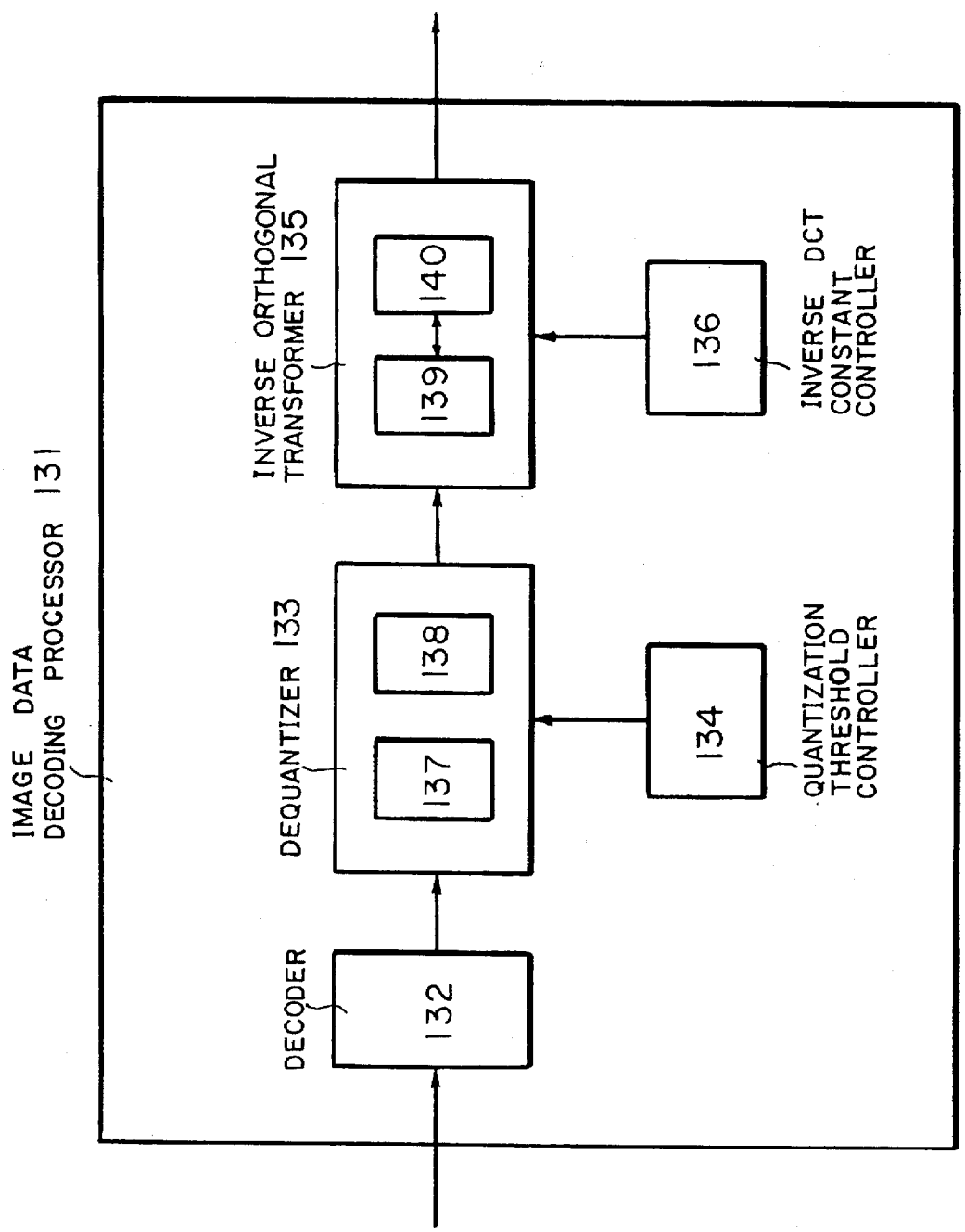
FIG. 19 is a block diagram of the principle of the second embodiment.

FIG. 19 is a block diagram of the second embodiment of this invention.

In FIG. 19, an image data decoding processor 131 quickly restores image data coded by an image data coding processor for coding the quantized coefficients obtained from the DCT coefficients calculated by orthogonally transforming image data in a block. To realize such processings, the image data decoding processor 131 comprises a decoder 132, a dequantizer 133, a quantization threshold controller 134, an inverse DCT unit 135 and an inverse DCT constant controller 136.

The decoder 132 performs a process to restore quantized coefficients for the respective blocks coded by an image data coding processor, not shown in FIG. 19.

The dequantizer 133 comprises an address information detector 137 for detecting addresses in a block of quantized coefficients having non-zero values of the quantized coefficients restored by the decoder 132 and a DCT coefficient restorer 138 for restoring DCT coefficients by multiplying the non-zero quantized coefficients by the corresponding quantization thresholds. The DCT coefficients restored by the DCT coefficient restorer 138 have non-zero values, because the corresponding quantization thresholds have zero value.

The quantization threshold controller 134 controls quantization thresholds used by the DCT coefficient restorer 138.

The inverse DCT unit 135 restores image data by performing matrix multiplications between the prepared matrix representing inverse DCT constants, the matrix representing the DCT coefficients restored by the dequantizer 133 and the transposed matrix of the prepared matrix representing inverse DCT constants. To expedite these processings, the inverse DCT unit 135 comprises a corresponding inverse DCT constant specifier 139 and a matrix multiplier 140. The inverse DCT constant specifier 139 is for specifying the column matrix of the inverse DCT constant corresponding to the DCT coefficients restored by the DCT coefficient restorer 138 according to the address information notified by the address information detector 137. The matrix multiplier 140 is for multiplying the prepared matrix representing inverse DCT constants by the matrix representing the DCT coefficients restored by the dequantizer 133 by multiplying the DCT coefficients restored by the DCT coefficient restorer 138 by the column matrix specified by the corresponding inverse DCT constant specifier 139.

The inverse DCT constant controller 136 controls the DCT constants required by the matrix multiplier 140.

The matrix multiplier 140 of the inverse DCT unit 135 first multiplies matrix $A^{-1}$ representing inverse DCT constants by matrix B representing DCT coefficients, in order to obtain matrix Z. That is, $$Z = A^{-1} * B$$

is calculated by multiplying the matrix representing the inverse DCT constants by the respective column matrices of the matrix representing DCT coefficients.

In multiplying the matrices, the matrix multiplier 140 specifies the significant coefficients in the column matrices of the selected DCT coefficients, on receiving the DCT coefficients with non-zero values from the DCT coefficient restorer 138.

Thus, in specifying the significant DCT coefficients to be processed in the column matrices of the matrix representing the DCT coefficients, according to the address information received from the address information detector 137, the corresponding inverse DCT constant specifier 139 specifies the column matrix of the matrix representing inverse DCT constants corresponding to the significant DCT coefficient.

Upon receiving the columns of the matrix representing inverse DCT constants, the matrix multiplier 140 calculates only the non-zero part of product matrix Z obtained by multiplying matrices $A^{-1}$ by B. It performs this calculation by multiplying only the specified elements in the rows of the matrix representing the inverse DCT constants by the selected significant elements in the column matrices of the matrix representing the DCT coefficients. Thus, only the non-zero value elements of product matrix Z is subjected to an arithmetic operation.

This invention causes only the necessary operations for the DCT coefficients having non-zero values to be performed and unnecessary operations for the DCT coefficients having the zero value to be omitted. Accordingly, the image data are restored faster in this method than in the conventional DCT image data restoration method.

Figure 20:
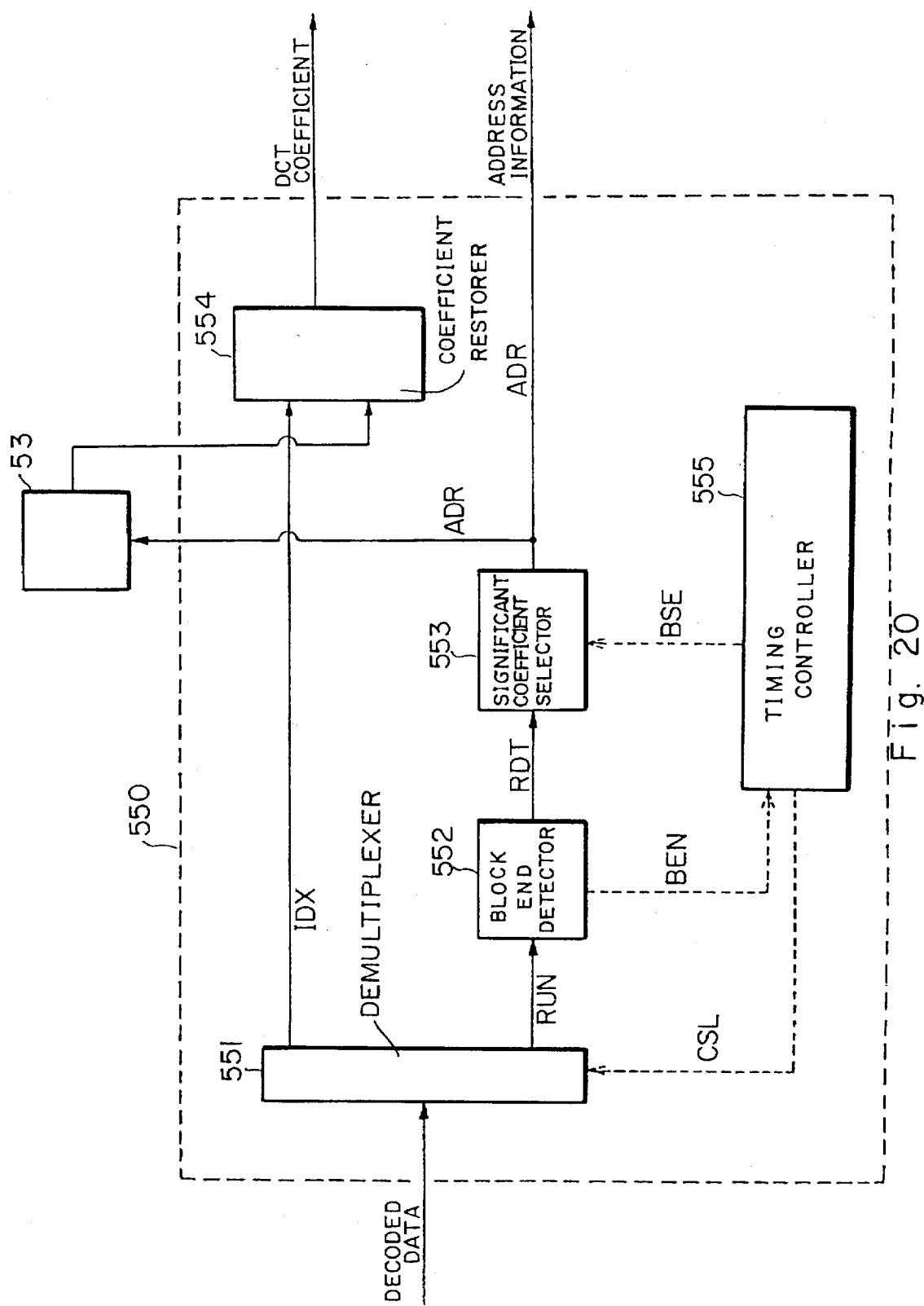
FIG. 20 is a configuration diagram of a quantizing section of the second embodiment.

FIG. 20 shows an embodiment of a dequantizer 550 configured by this invention.

Figure 21:
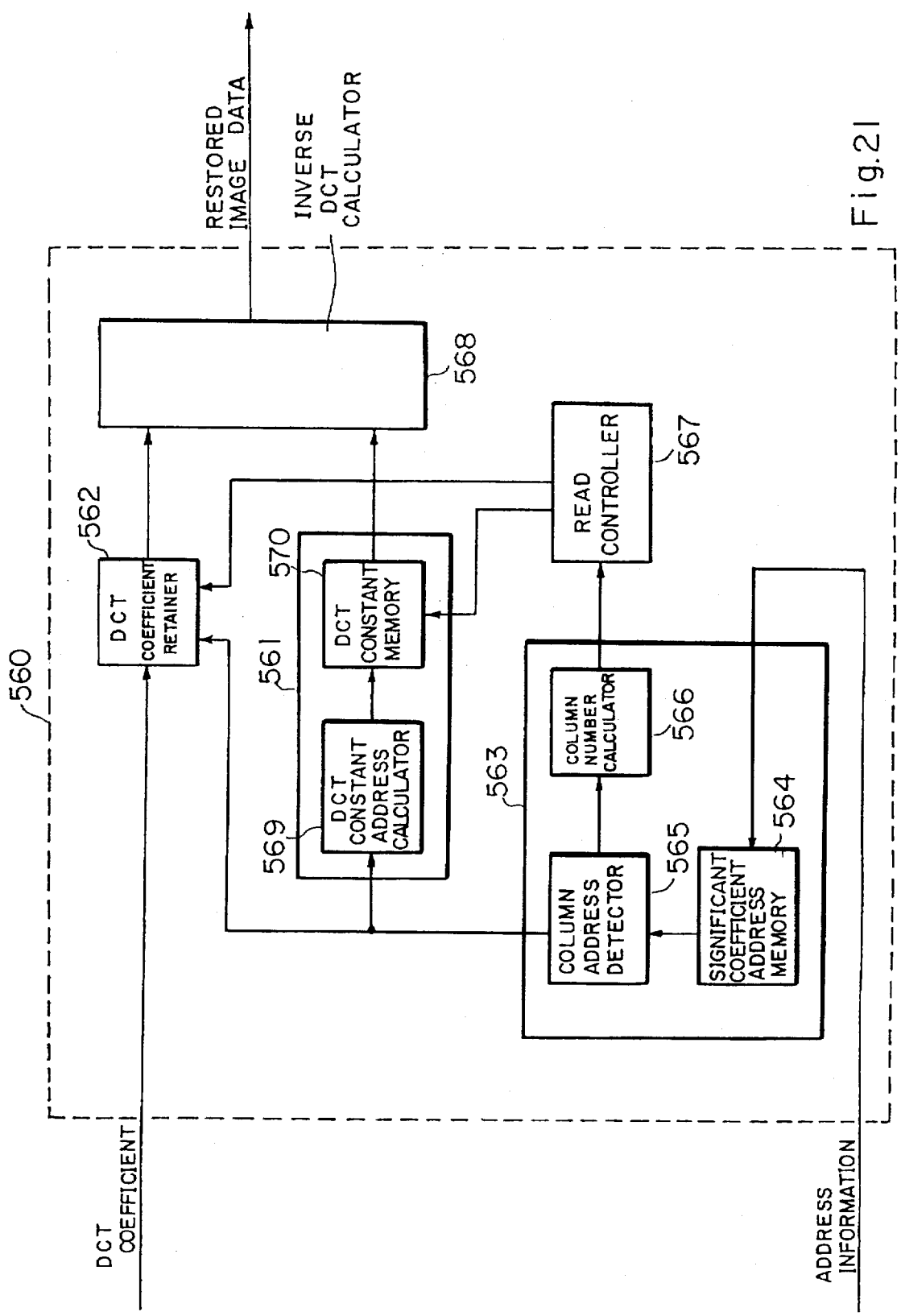
FIG. 21 is a configuration diagram of a two-dimensional inverse DCT unit of the second embodiment.

FIG. 21 shows an embodiment of a two-dimensional DCT unit 560 configured by this invention.

Figure 3:
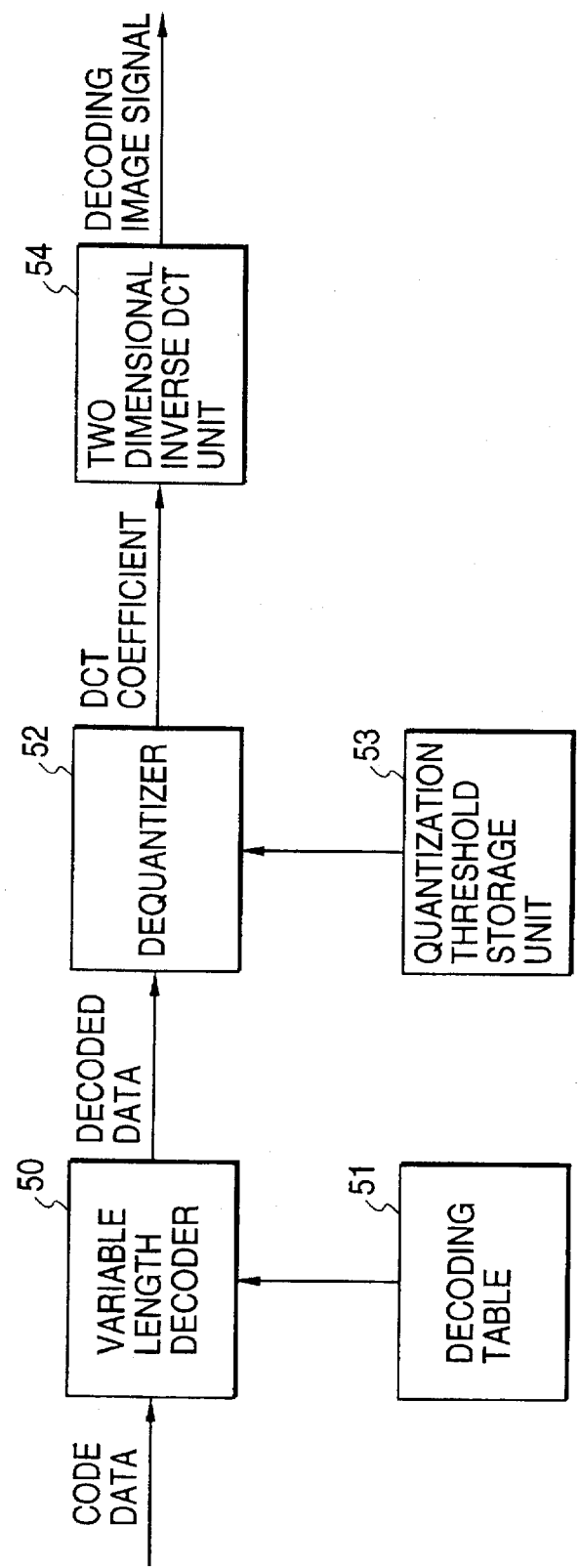
FIG. 3 is a basic configuration diagram of a decoding circuit of ADCT.

In FIG. 20, 53 is a quantization threshold storage unit shown in FIG. 3 for storing the downloaded quantization thresholds. 551 is a demultiplexer for separating the decoding data sent from the variable length decoder 50 into index data (IDX) and run data (RUN). 552 is a block end detector for detecting whether a block has reached the end. 553 is a significant coefficient selector for retaining the addresses within a block of the index data having non-zero values according to the run data distributed from the demultiplexer 551 and for outputting address information to the two-dimensional inverse DCT unit 560. 554 is a DCT coefficient restorer for retaining index data distributed from the demultiplexer 551, restoring the DCT coefficients by multiplying the index data by quantization thresholds in the quantization threshold storage 53 read from the address information specified by the significant coefficient selector 553, and outputting the restored DCT coefficients to a two-dimensional inverse DCT unit 560. 555 is a timing controller for controlling respective functional parts.

In FIG. 21, 561 is a DCT constant storage unit provided in the two-dimensional inverse DCT unit 560 shown in FIG. 3. It comprises a DCT constant address calculator 569 and a DCT constant memory 570, and stores inverse DCT constants. 562 is a DCT coefficient retainer for retaining the DCT coefficients notified by the DCT coefficient restorer 554 in the revere quantizer 550. 563 is a significant coefficient address retainer comprising a significant coefficient address memory 564 for retaining the address information notified from the significant coefficient selector 553 in the dequantizer 52, a column address detector 565 for detecting address information included in the column matrix to be processed in the address information stored in the significant coefficient address memory 564, and a column number calculator 566 for calculating the number of non-zero value DCT coefficients included in the column matrices to be processed. 567 is a read controller for controlling the read-out of the storage data from the inverse DCT constant storage 561 and the DCT coefficient retainer 562. 568 is an inverse DCT calculator for executing a two-dimensional inverse DCT for restoring image data from the inverse DCT constants read from the inverse DCT constant storage 561 and the DCT coefficients read from the DCT coefficient retainer 562.

Next, the operations of the second embodiment of this invention thus configured is explained in detail. First, the operation of the dequantizer 550 is explained.

The quantized coefficients composed of index data and run data decoded from code data by the variable length recoder 50 are inputted to the demultiplexer 551. The index data and run data are inputted alternately. That is, by taking the quantized coefficients (sent in the scanning order shown in FIG. 9) shown in FIG. 8A as an example, the first D.C. element index datum "5", the run datum "0" representing the number of the zero-value quantized coefficients until the next index datum "−1", the index datum "−1", the run datum "0" representing the number of the zero-value quantized coefficients until the next index datum "−2" the index datum "−2", the run datum "0" representing the number of the zero-value quantized coefficients until the next index datum "1", the index datum "1", the run datum "5" representing the number of the zero-value quantized coefficients until the next index datum "−1" the index datum "−1", and then "$R_{eob}$" representing that all the remaining quantized coefficients in the block are "0".

When the decoding data columns of the quantized coefficients comprising the index data and run data are inputted, the timing controller 555 separates inputted data into index data for the DCT coefficient restorer 554 by outputting the selection signal $C_{SL}$ to the demultiplexer 551 and run data to the block end detector 552. The above described input of quantized coefficients shown in FIG. 8A is explained below.

The timing controller 555 first transmits the inputted index datum "5" to the DCT coefficient restorer 554 by controlling the demultiplexer 551, when the significant coefficient retainer 553 retains address "0" and where index datum "5" exists in correspondence with the head end of a block.

Then, the timing controller 555 transmits the inputted run datum "0" to the block end detector 552 by controlling the demultiplexer 551. Upon receiving run datum "0", because it is different from "$R_{eob}$", the block end detector 552 judges that significant (i.e. non-zero value) quantized coefficients remain in a block and make a processing request to the significant coefficient selector 553.

In response to this processing request, the significant coefficient selector 553 calculates and retains address (specified by the number of from the head end quantized coefficient) position "1", i.e., the next significant quantized coefficients from the inputted run datum "0".

The timing controller 555 transmits index datum "−1" inputted in correspondence with address "1" to the DCT coefficient restorer 554 where it retains index datum "−1" by controlling the demultiplexer 551.

Then, the timing controller 555 transmits the inputted run datum "0" to the block end detector 552, which makes a processing request to the significant coefficient selector 553 upon receiving inputted run datum "0". The significant coefficient selector 553 in turn calculates the address position "2" where the significant quantized coefficient exists next to the inputted run datum "0". The timing controller 555 transmits the inputted index datum "−2" corresponding to address "2" to the DCT coefficient restorer 554.

The timing controller 555 also transmits inputted run datum "0" to the block end detector 552, which makes a processing request to the significant coefficient selector 553, upon receiving inputted run datum "0". The significant coefficient selector 553, in turn, calculates the address position where the significant quantized coefficient exists next to the inputted run datum "0". The timing controller 555 transmits inputted index datum "1" corresponding to address "3" to the DCT coefficient retainer 554 where it is retained.

The timing controller 555 also transmits inputted run datum "5" to the block end detector 552, which makes a processing request to the significant coefficient selector 553 upon receiving inputted run datum "5". The significant coefficient selector 553 in turn calculates the address position "9" where the significant quantized coefficient exists next to the inputted run datum "5". The timing controller 555 transmits inputted index datum "−1" corresponding to address "9" to the DCT coefficient retainer 554, where it is retained.

The timing controller 555 also transmits inputted run datum "$R_{eob}$" to the block end detector 552, which judges no significant quantized coefficient remains in the block and notifies the timing controller 555 of the signal (BEN) indicating the judgment. By transmitting a BSE signal to the significant coefficient selector 553, the timing controller 555 instructs the significant coefficient selector 553 to terminate the address calculations and to output the retained address information to the two-dimensional inverse DCT unit 560. The significant coefficient selector 553 retains addresses "0", "1", "2", "3" and "9" corresponding to index data "5", "−1", "−2", "1" and "−1". Therefore, the DCT coefficient restorer restores the DCT coefficients by multiplying the corresponding quantization thresholds in the quantization threshold storage 53 read according to the addresses of the significant coefficient selector 553 and the index data retained in itself and outputs the restored DCT coefficients to the two-dimensional inverse DCT unit 560 where it is retained.

Next, the actions of the two-dimensional inverse DCT unit 560 for receiving the DCT coefficients and the addresses appearing in the second embodiment of this invention are explained by using the above example.

A significant coefficient address memory 564 retains addresses "0", "1", "2", "3" and "9" notified by the significant coefficient selector 553. An inverse DCT calculator 568 restores image data according to the configuration shown in FIG. 4 comprising the one-dimensional inverse DCT unit 540, the transposer 542, the one-dimensional inverse DCT unit 543 and a transposer 544. The inverse DCT calculator 568 first multiplies the matrix representing the DCT coefficients read from the DCT coefficient retainer 562 and the matrix representing the inverse DCT constants read from the inverse DCT constant storage 561. More specifically, the matrix representing the inverse DCT constants are multiplied by the respective column matrices sequentially selected from the matrix representing the DCT coefficients.

When the column matrix to be processed is selected, the column address detector 565 detects address information stored in the selected column matrix of the DCT coefficients from the address information stored in the significant coefficient address memory 564. For instance, by selecting the column matrix representing the first column of the DCT coefficients, the column address detector 565 detects addresses "0", "2", "3" and "9" of addresses "0", "1", "2", "3" and "9" retained in the significant coefficient address memory 564. In response to this detection by the column address detector 565, a column number calculator 566 calculates that the selected column matrix to be processed has four (4) non-zero value DCT coefficients.

When the column address detector 565 detects the addresses included in the column matrix of the DCT coefficients to be processed, a read controller 567 reads the DCT coefficients specified by the addresses from the DCT coefficient retainer 562, reads the column matrix of the inverse DCT constants corresponding to the addresses from the inverse DCT constant storage 561, and sends the read data to the inverse DCT calculator 568. The read processings are synchronized with the number calculated by the column number calculator 566.

That is, in correspondence with the addresses "0", "2", "3" and "9" detected by the column address detector 565, the read controller 567 sequentially reads DCT coefficients "$B_{11}$", "$B_{21}$", "$B_{31}$" and "$B_{41}$," from the DCT coefficient retainer 562 and outputs them to the inverse DCT calculator 568, and also sequentially reads from the inverse DCT constant storage unit 561 the column matrix of the inverse DCT constants corresponding to DCT coefficient "$B_{11}$", i.e. $[A_{11}, A_{21}, A_{31}, A_{41}, A_{51}, A_{61}, A_{71}, A_{81}]^t$, the column matrix of the inverse DCT constants corresponding to DCT coefficient "$B_{21}$", i.e. $[A_{12}, A_{22}, A_{32}, A_{42}, A_{52}, A_{62}, A_{72}, A_{82}]^t$, the column matrix of the inverse DCT constants corresponding to DCT coefficient "$B_{31}$", i.e. $[A_{13}, A_{23}, A_{33}, A_{43}, A_{53}, A_{63}, A_{73}, A_{83}]^t$, and i.e. $[A_{14}, A_{24}, A_{34}, A_{44}, A_{54}, A_{64}, A_{74}, A_{84}]^t$, the column matrix of the inverse DCT constants corresponding to DCT coefficient "$B_{41}$", i.e. $[A_{14}, A_{24}, A_{34}, A_{44}, A_{54}, A_{64}, A_{74}, A_{84}]^9$, and outputs these column matrices to the inverse DCT calculator 568.

Upon receiving the non-zero value DCT coefficients in matrix B and the corresponding column matrices of matrix $A^T$ representing the inverse DCT constants, the inverse DCT calculator 568 sequentially multiplies them to calculate the non-zero value elements in product matrix Z. That is, instead of calculating all elements of product matrix Z, only the non-zero value elements are calculated, i.e., unnecessary calculations for the zero-value elements are omitted.

Thus, the two-dimensional inverse DCT unit 560 reduces the number of calculation steps by executing only the necessary operations for non-zero values.

Although the second embodiment of this invention has been explained by referring to FIGS. 19, 20 and 21, which explain the adaptive discrete cosine coding method, the application of this invention should by no means be construed as limited to this embodiment. It is in fact applicable to any process involving an orthogonal transformation.

Figure 22:
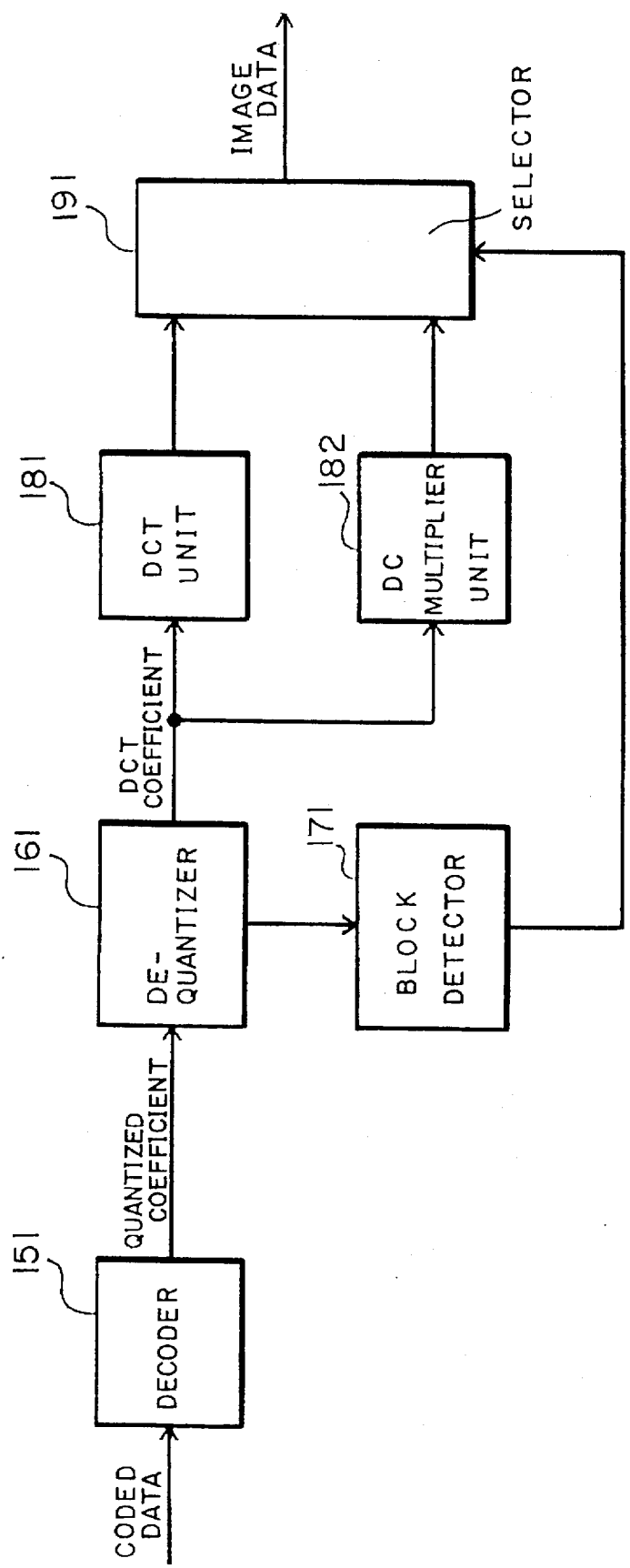
FIG. 22 is a block diagram of the principle of the third embodiment.

FIG. 22 is a block diagram of the third embodiment of this invention.

In FIG. 22, an image is divided into a plurality of blocks each comprising a plurality of picture elements. The respective elements of the DCT coefficients obtained by a two-dimensional DCT for the picture elements of these blocks are quantized by quantization thresholds, and the quantized coefficients obtained through the quantization processes are coded to generate code data. A decoder 151 decodes the inputted code data and outputs the quantized coefficients according to an image data restoration method for restoring image data from the generated code data.

A dequantizer 161 performs a dequantization by multiplying the respective elements outputted from the decoder 151 and the corresponding quantization thresholds and restores the DCT coefficients.

A DCT unit 181 generates image data by performing a two-dimensional DCT for the DCT coefficients supplied by the dequantizer 161.

A D.C. multiplier 182 multiplies the D.C. element of the DCT coefficients by a predetermined constant and generates an image datum based on the multiplications.

A block detector 171 detects blocks without any significant A.C. element based on the DCT coefficients corresponding to the respective blocks or the quantized coefficients corresponding to the respective blocks inputted from the dequantizer 161.

A selector 191 transmits, as an image datum, an output from either the DCT unit 181 or the D.C. multiplier 182, according to the detection result of the block detector.

Code data inputted to the decoder 151, which outputs quantized coefficients by decoding the code data. By multiplying the respective elements of the quantized coefficients by the corresponding quantization thresholds, the dequantizer 161 dequantizes the supplied quantized coefficients and outputs the corresponding DCT coefficients. The DCT unit 181 performs two-dimensional DCTs to the DCT coefficients and also generates and outputs image data of the blocks corresponding to the DCT coefficients.

The D.C. multiplier 182 multiplies the D.C. elements of the above described DCT coefficients by predetermined constants and generates image data based on the multiplications.

At this time, the block detector 171 detects blocks without any significant A.C. elements, based on the DCT coefficients or the quantized coefficients corresponding to the respective blocks inputted from the dequantizer 161. The selector 191 transmits an output from either the DCT unit 181 or the D.C. multiplier 182 according to the detection results.

Here, the values of the respective picture element data of the block obtained by performing DCTs for the DCT coefficients corresponding to the blocks without any significant A.C. elements by the above described DCT unit 181 are equal to the values obtained by multiplying the D.C. elements of the above described DCT coefficients by the predetermined constants.

Therefore, as to a block judged by the block detector 171 as not having any significant A.C. elements two-dimensional DCTs by the DCT unit 181 is replaced by the above described multiplications of the D.C. elements by the predetermined constants.

In the third embodiment of this invention, the block detector 171 detects blocks without any significant A.C. elements based on quantized coefficients. The DCT unit 181 does not perform two-dimensional DCT processes for such blocks. These processed are replaced by the multiplications, by the D.C. multiplier 182 of the D.C. elements of the DCT coefficients by the predetermined constants. Since the D.C. multiplier 182 performs multiplications faster than the two-dimensional DCTs processed by the DCT unit 181, image data are restored faster.

Figure 23:
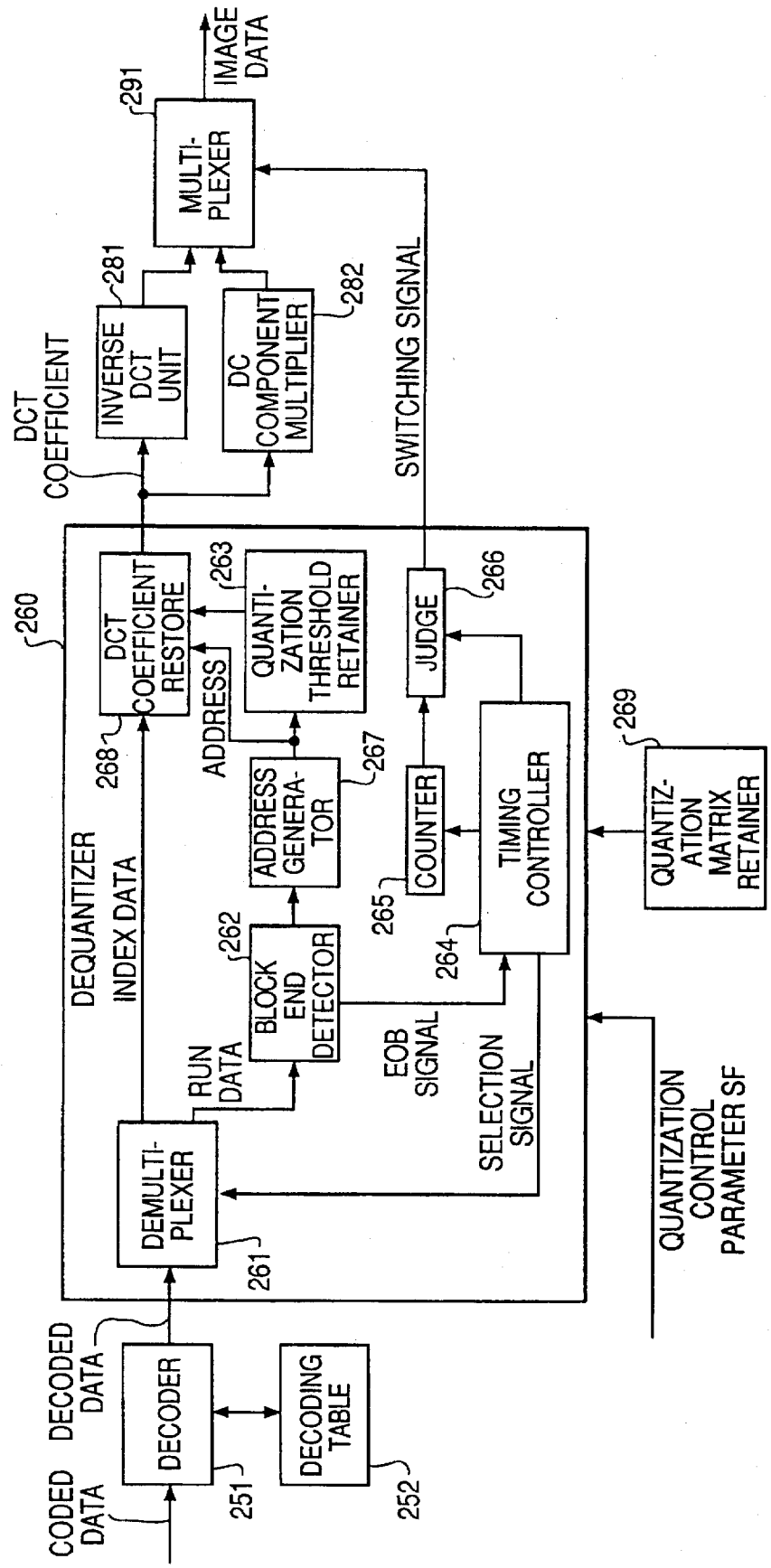
FIG. 23 is a configuration diagram of a restoring device of an embodiment.

FIG. 23 shows the configuration of the restorer to which the image data restoration method according to the third embodiment of this invention is supplied.

Here, the correspondence between the parts appearing in FIGS. 22 and 23 is as follows.

The decoder 151 corresponds to a decoder 251 and a decoding table 252.

The dequantizer 161 corresponds to a DCT coefficient restorer 268 and quantization threshold retainer 263 in a dequantizer 260.

The block detector 171 corresponds to a counter 265 and a judge 266 in the dequantizer 260.

The DCT unit 181 corresponds to an inverse DCT unit 281.

The D.C. multiplier 182 corresponds to a D.C. element multiplier 282.

The selector 191 corresponds to a multiplexer 291.

By assuming the above correspondences, the third embodiment of this invention is explained below.

The decoding table 252 prestores, in a table, the combination of variable length codes and the corresponding index and run data.

The quantization matrix retainer 269 stores quantization matrix $V_{TH}$ representing quantization thresholds. (Refer to FIG. 7.)

The code data supplied to the decoding unit over a transmission route, etc. are inputted first to the decoder 251, which searches the above described decoding table 252 based on the inputted code data and reads the combination of the corresponding index and run data from the decoding table 252.

Thus, the inputted codes are decoded to the combination of the corresponding index and run data, and the index data indicating the values of the significant coefficients and the run data indicating the length of the consecutive insignificant elements after the significant coefficients are successively supplied to the dequantizer 260.

Based on the index and run data, the dequantizer 260 dequantizes the quantized coefficients into the restored DCT coefficients, judges whether or not there are non-zero significant coefficients in the A.C. elements, and outputs a switching signal based on the judging result.

The restored DCT coefficients are supplied to the D.C. element multiplier 282.

The inverse DCT unit 281 performs inverse DCTs for the supplied restored DCT coefficients to restore image data.

Here, when there are no significant A.C. elements in the DCT coefficients, i.e. when there are only significant D.C. elements, the respective picture element data obtained by performing inverse DCTs for the DCT coefficients are equal to the results obtained by multiplying these D.C. elements by the corresponding constants (hereafter referred to as D.C. multiplication constants) obtained from the DCT constants.

Thus, when only the D.C. elements in the DCT coefficients compose significant coefficients, by multiplying such significant D.C. elements by the above described D.C. multiplication constants to obtain all picture element data in a block, the D.C. element multiplier 282 restores image data of the block.

The multiplication results, i.e. the restored image data of a block, together with the result of performing inverse DCTs by the inverse DCT unit 281, are supplied to the multiplexer 291.

The multiplexer 291 transmits as image data an output from either the inverse DCT unit 281 or the D.C. element multiplier 282, depending on the above described switching signal supplied from the dequantizer 260. The configuration and actions of the dequantizer 260 are described below.

Before restoring images of the blocks in a screen, a quantization control parameter SF specifying the accuracy of the image quantization is inputted to the dequantizer 260, and the quantization threshold retainer 263 stores, as a quantization threshold $Q_{TH}$, the result of multiplying the quantization control parameter SF by the quantization matrix $V_{TH}$ stored in the quantization matrix retainer 269.

When the images are restored, the decoder 251 alternately supplies the index data and the run data to the demultiplexer 261 in the dequantizer 260, e.g. as shown in FIG. 24A.

According to the selection signal $C_{SL}$ supplied by the timing controller 264, the demultiplexer 261 outputs the inputted data alternately from output terminals $O_1$ and $O_2$, so that the successively supplied index and run data are separated and supplied respectively to the DCT coefficient restorer 268 and a block end detector 262.

On receiving run datum $R_{eob}$, which indicates the block end of the supplied run data, the block end detector 262 judges that all quantized coefficients included in a block are inputted, and outputs an end-of-block (EOB) signal. The block end detector 262 passes all supplied run data other than $R_{eob}$ to an address generator 267.

The address generator 267 accumulates the values of the sequentially supplied run data to which 1 is added. The address generator 267 outputs, as addresses corresponding to the next index data, the matrix positions corresponding to the zigzag scanning order (refer to FIG. 9) indicated by the accumulation results, to the quantization threshold retainer 268 and the DCT coefficient restorer 263.

The accumulation values obtained by the address generator 267 are reset to the initial value "1" each time the block end detector 262 detects a block end.

For instance, when the decoding data, such as those shown in FIG. 24A, are supplied to the demultiplexer 261 in the dequantizer 260, the address generator 267 generates an address indicating the (1,1) element of the address corresponding to a first index datum $D_m$. Then, in response to a run datum $R_0$, 1 is added to the accumulation values in the address generator 267, and the address generator 267 generates, as the address of the next index datum $I_2$, an address indicating the (1,2) element of the matrix corresponding to the second position of the zigzag scanning.

The quantization threshold retainer 263 outputs the corresponding elements of the quantization thresholds $Q_{TH}$ to the $D_{CT}$ coefficient restorer 268 according to the addresses generated in correspondence with the index data.

The DCT coefficient restorer 268 dequantizes elements of the quantized DCT coefficients by multiplying the supplied elements of the quantization thresholds $Q_{TH}$ by the inputted index data values. The DCT coefficients generated by the dequantization are stored in correspondence with the addresses supplied from the address generator 267.

Thus, the timing controller 264 outputs an addition signal in synchronization with the input timings of the index data from the decoder 251. The counter 265 performs the counting actions synchronized with the addition signal, in parallel with the above described dequantization. Each time inputs of the index and run data corresponding to a block are finished, the count value of the counter 265 is reset to its initial value "0".

Thus, the counter 265 counts the total number of index data inputted as the quantized coefficients corresponding to the respective blocks.

Here, if the total of the index data counted by the counter 265 is "1" when the DCT coefficients corresponding to the respective blocks are restored, the A.C. element values of the DCT coefficients are all 0. Therefore, the image block corresponding to the DCT coefficients is judged to comprise only the D.C. elements without any significant A.C. elements.

The count value of the counter 265 is supplied to the judging unit 266, which judges according to an instruction from the timing controller 264, whether or not the supplied counting value is "1", and outputs a logical "1" when the counting value is "1" and a logical "0" otherwise. The timing controller 264 instructs the judging 266 to perform judging actions according to the EOB signal from the block end detector 262.

When the decoded data, such as those shown in FIG. 24A, are supplied to the dequantizer 260 as a result of decoding the code data corresponding to the m-th block, the total of the significant coefficients counted by the counter 265 is "5". In this case, the judging unit 266 judges that the block contains not only D.C. elements but also something else, and the multiplexer 291 receives a logical "0" as a switching signal. In response, the multiplexer 291 ordinarily transmits an output from the inverse DCT unit 281 as the m-th block image data.

When the decoded data, such as those shown in FIG. 24B, are supplied to the dequantizer 260 as a result of decoding the code data corresponding to the n-th block, the total of the significant coefficients counted by the counter 265 is "1". In this case, the judging unit 266 judges that the block contains only D.C. elements and the multiplexer 291 receives a logical "1" as a switching signal. In response, the multiplexer 291 transmits an output from the D.C. element multiplier 282 as the n-th block image data.

Since the D.C. element multiplier 282 multiplies the D.C. elements of the supplied DCT coefficients by the D.C. constants, the D.C. element multiplier 282 operates much faster than the inverse DCT unit 281 for inverse DCT processings.

Thus, by replacing the inverse DCT processing for the blocks comprising only D.C. elements with the multiplication of the D.C. elements in the block by the D.C. constants, the code data are restored considerably faster.

For instance, when a database performs a progressive image buildup, the image in the first stage with the least amount of information is sometimes configured solely by the blocks comprising only D.C. elements. In this case, only the D.C. elements of the respective blocks contained in the coding data accumulated in the database are supplied to the restoring unit shown in FIG. 23 to be restored.

In this case, the decoded data obtained by decoding the code data corresponding to all blocks comprise index data for indicating D.C. elements and run datum $R_{eob}$ for indicating the block end, and the judging unit 266 in the dequantizer 260 judges that all the blocks comprise only D.C. elements. Thus, the inverse DCT processings are not performed for all the blocks in a screen, and an output from the D.C. element multiplier 282 is transmitted as the restored image data.

When an image with a small amount of information is restored, the required restoration time is shortened significantly, e.g. to one-eighth that for conventional processes.

Thus, it becomes possible to expedite the searching images, e.g. stored in a database, by applying the progressive image buildup. Meanwhile, standard images have many blocks comprising only D.C. elements in the background, and such blocks account for about 40% of the blocks composing a screen.

Consequently, the restoring unit shown in FIG. 23 shortens the time required to restore the image of a screen, even when a detailed image is restored.

The third embodiment of this invention describes the case in which the counter 265 and the judge 266 provided in the dequantizer 260 judge whether or not the total of the significant coefficients is not greater than "1", to detect blocks with only D.C. elements. However, it is possible to detect blocks comprising only D.C. elements by the DCT coefficients restored by the DCT coefficient restorer 268.

Figure 25:
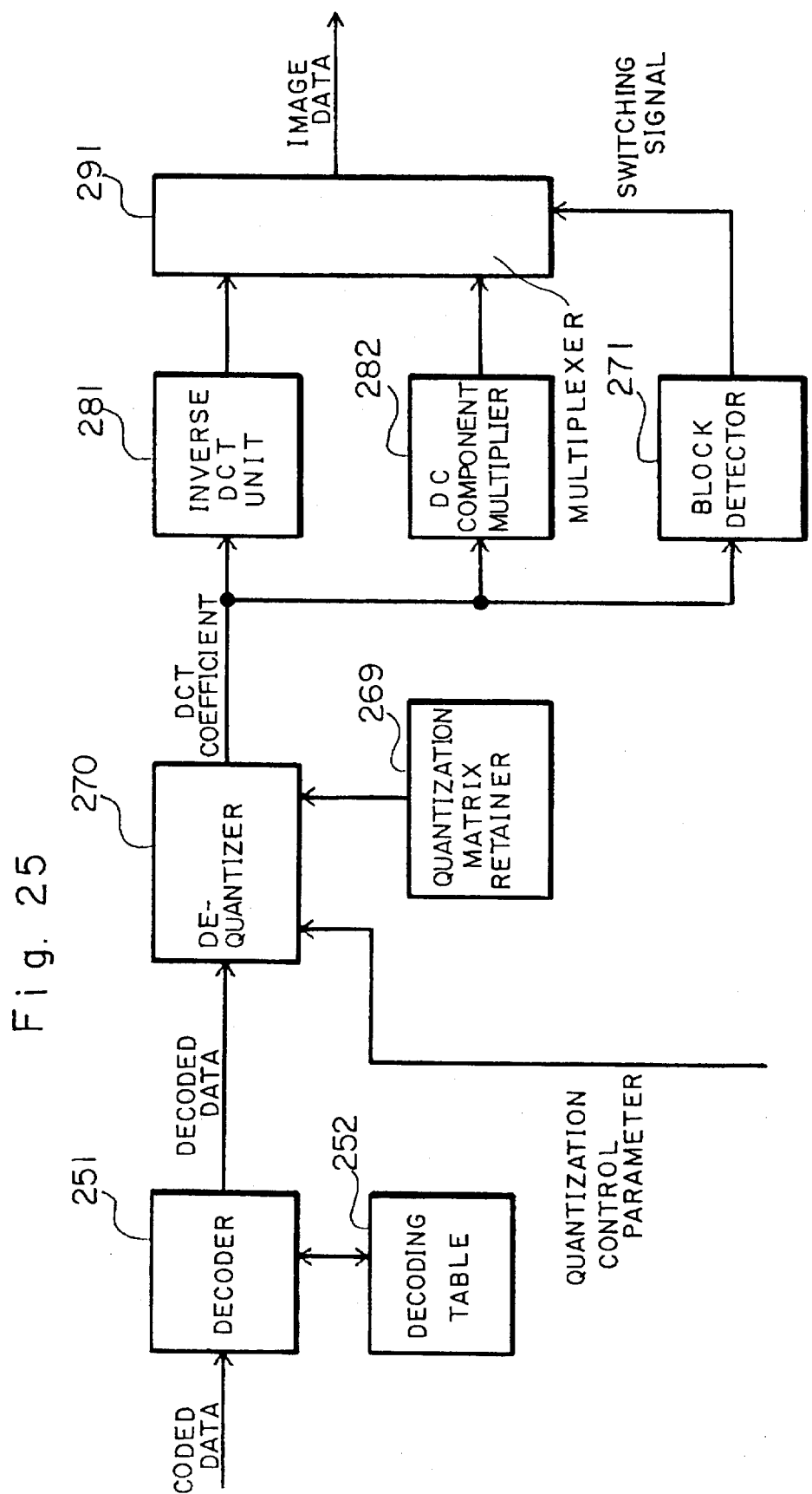
FIG. 25 is a configuration diagram of a restoring device of an embodiment.

In this case, as shown in FIG. 25, instead of the dequantizer 260 shown in FIG. 23, a dequantizer 270 excluding the counter 265 and the judging unit 266 of the dequantizer 260 is used together with a block detector 271 to configure the restoring unit.

The block detector 271 receives the DCT coefficients generated by the dequantizer 270 to detect the significant elements of the DCT coefficients. The block detector 271 judges that a block comprises only D.C. elements, and outputs a logical "1" as the switching signal to the multiplexer 291 when the number of significant numbers detected is not greater than "1".

Figure 26:
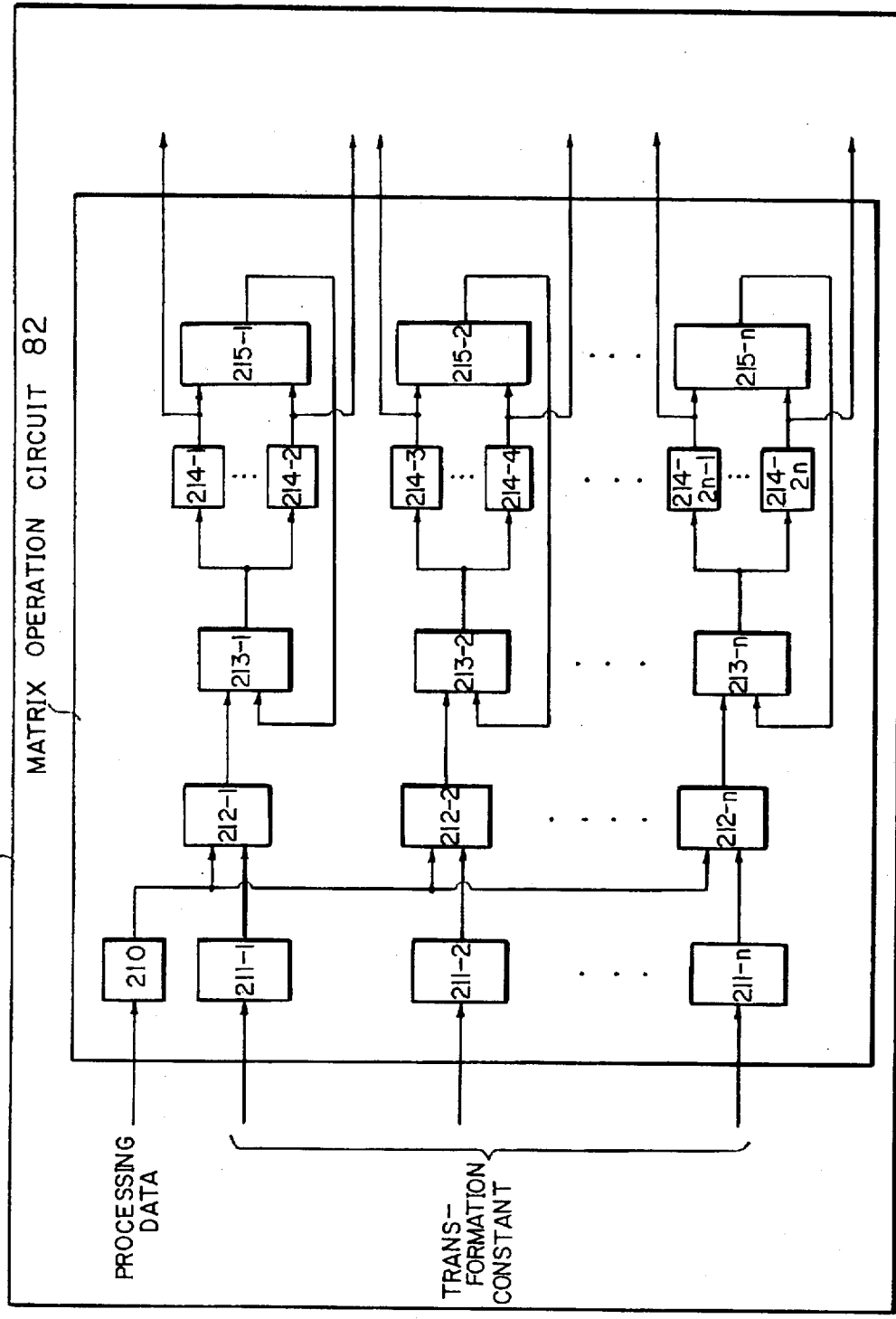
FIG. 26 is a configuration diagram of the principle of the fourth embodiment.

FIG. 26 is a block diagram of the fourth embodiment of this invention.

In FIG. 26, an image data orthogonal transformer 81 orthogonally transforms image data or transforms coded image data in inverse, and a matrix operation circuit 82 executes matrix operations between an N*N matrix representing transformation constants and an N*1 matrix representing data to be processed, requested during an orthogonal transformation by the image data orthogonal transformer 81. The matrix operation circuit 82 comprises a first latch 210, second latches 211-1 through 211-x, multipliers 212-1 through 212-x provided corresponding to the second latches 211-1 through 211-x, adders 213-1 through 213-x provided corresponding to the multipliers 212-1 through 212-x, third latches 214-1 through 214-N provided corresponding to the adders through 213-x, and selectors 215-1 through 215-x provided corresponding to the adders 213-1 through 213-x, where x is the number of columns in one of the N/x N*x matrices all having the same N*x matrix dimensions divided from the N*N matrix of the transformation constants.

An example, in which N=8 and x=4, is discussed below. That is, an 8*8 matrix of transformation constants is divided into two (2) 8*4 matrices, and an 8*1 column matrix represents the data to be processed.

Specifically, the matrix operation circuit 82 comprises the first latch 210, the four (4) second latches 211-1 through 211-4, the four (4) multipliers 212-1 through 212-4, the four (4) adders 213-1 through 213-4, the eight (8) third latches 214-11 through 214-41 and 214-12 through 214-42, and selectors 215-1 through 215-4. That is, the adders 213-1 through 213-4 are connected to respective pairs of two (2) third latches (214-11 and 214-12) through (214-41 and 214-42).

The first latch 210 sequentially latches eight (8) processing data in the 8*1 column matrix. The second latches 211-1 through 211-4 sequentially latch the transformation constants in the column matrices, corresponding to the data processed, latched by the first latch 210 for the respective two (2) 8*4 matrices. The multipliers 212-1 through 212-4 multiply the data to be processed, latched by the first latch 210, by the transformation constants latched by the second latches 211-1 through 211-4. The adders 213-1 through 213-4 accumulate the products obtained by the multipliers 212-1 through 212-4. The third latches 214-11 through 214-42 latch the accumulated sums obtained by the adders 213-1 through 213-4. The selectors 215-1 through 215-4 select pairs of the third latches (214-11 and 214-12) through (214-41 and 214-42) provided corresponding to the transformation constants lathed by the second latches 211-1 through 211-4 and supply the heretofore accumulated sums latched by the third latches 214-11 through 214-42 to the adders 213-1 through 213-4.

In the fourth embodiment of this invention, when the first latch 210 latches the same data to be processed, the second latches 211-1 through 211-4 latch the corresponding column matrices of the transformation constants for the respective two divisions of the original 8*8 matrix in a time series.

In response to the sequential latching actions by the second latches 211-1 through 211-4, the multipliers 212-1 through 212-4 sequentially multiply the same data to be processed that is latched by the first latch 210 by the corresponding column matrices' transformation constants sequentially latched by the second latches 211-1 through 211-4.

After this multiplication has been executed in a time series, the adders 213-1 through 213-4 sequentially add the data outputted from the multipliers 212-1 through 212-4 corresponding to the second latches 211-1 through 211-4 to the previously accumulated data outputted from the selectors 215-1 through 215-4, and output the updated accumulated data to respective pairs of the third latches (214-11 and 214-12) through (214-41 and 214-42). These pairs latch the accumulated values for the respective two divisions each of 8*4 matrices.

The selectors 215-1 through 215-4 select the accumulated data latched by the pairs of the third latches (214-11 and 214-12) through (214-41 and 214-42) and output them to the adders 213-1 through 213-4 to update the accumulated data.

The accumulations thus executed are continued until the first latch 210 terminates its latching actions. The multiplications of the original 8*8 matrix of the transformation constants by the 8*1 column matrix are completed when the third latches 214-11 through 214-42 latch the element values of the 8*1 product matrix.

Thus, according to the fourth embodiment of this invention, the number of multipliers 212-1 through 212-4 is reduced by half from what is required by the prior art, thus greatly reducing the circuit size.

Figure 1:
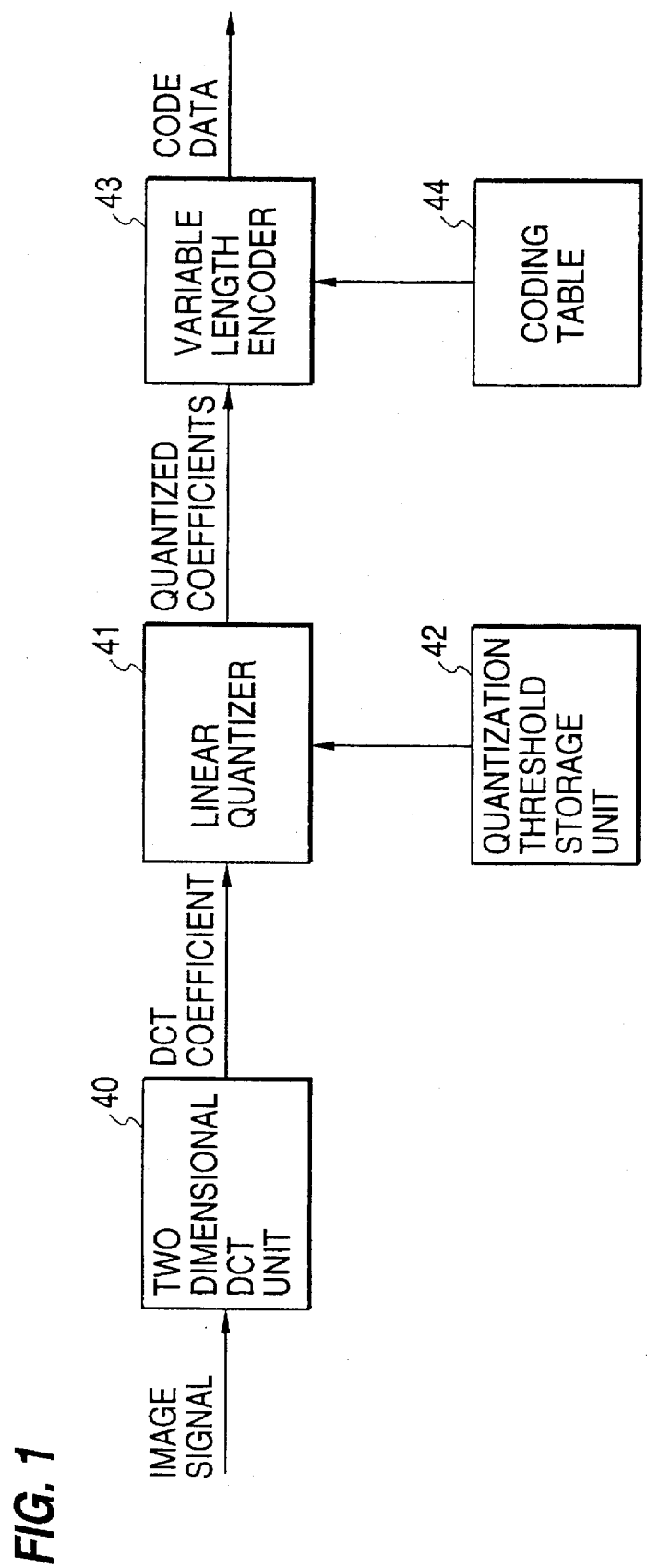
FIG. 1 is a basic configuration diagram of an encoding circuit of ADCT.
Figure 2:
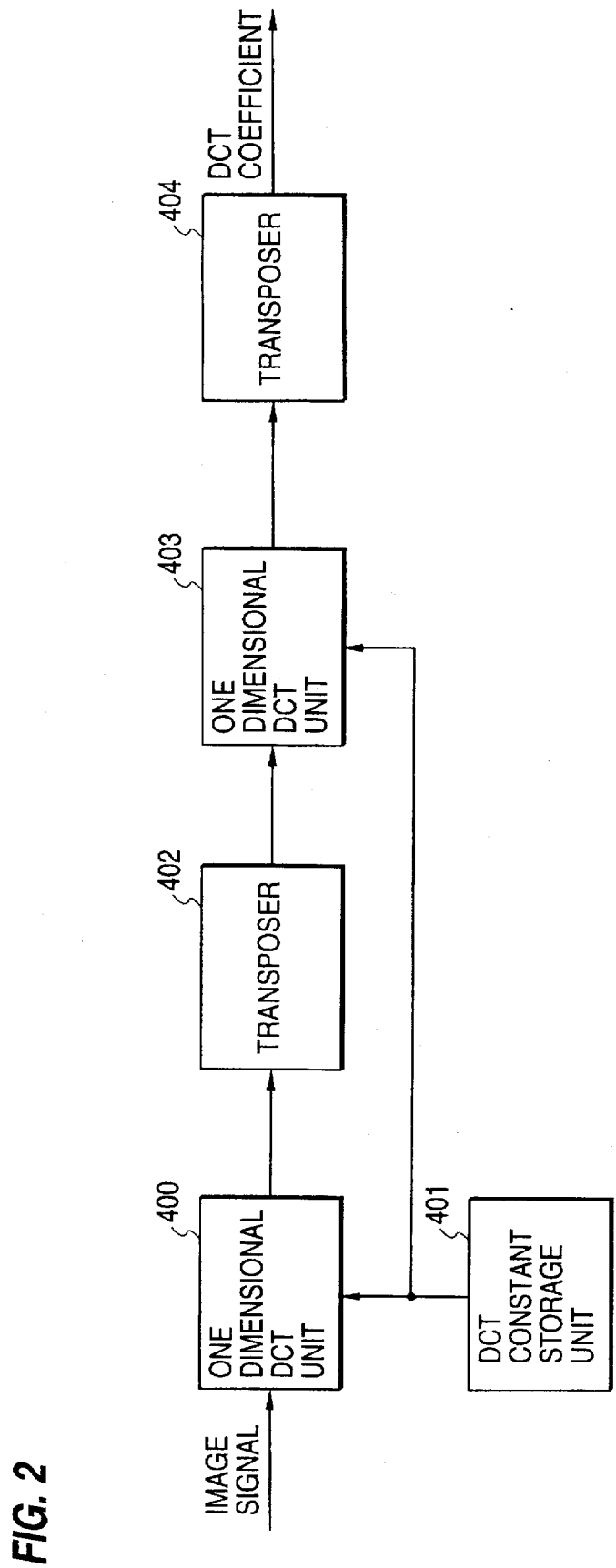
FIG. 2 is a detailed configuration diagram of a two-dimensional DCT unit.

The fourth embodiment of this invention is further discussed below by applying its principle to the one-dimensional DCT unit 400 referred to in FIG. 2. As stated earlier, the one-dimensional DCT unit multiplies image signal matrix X, e.g. of 8*8 picture elements, by DCT constant matrix A, e.g. of 8*8 elements, provided in the DCT constant storage 401, to obtain the product matrix Y(=A*X).

The fourth embodiment of this invention expedites matrix multiplications. More specifically, the 8*8 image signal matrix X is divided into eight (8) 8*1 column matrices. If the column matrix representing the first column of matrix X is processed, the multiplications required to calculate matrix elements $Y_{11}$ through $Y_{81}$ in the first column of product matrix Y are performed.

Figure 27A:
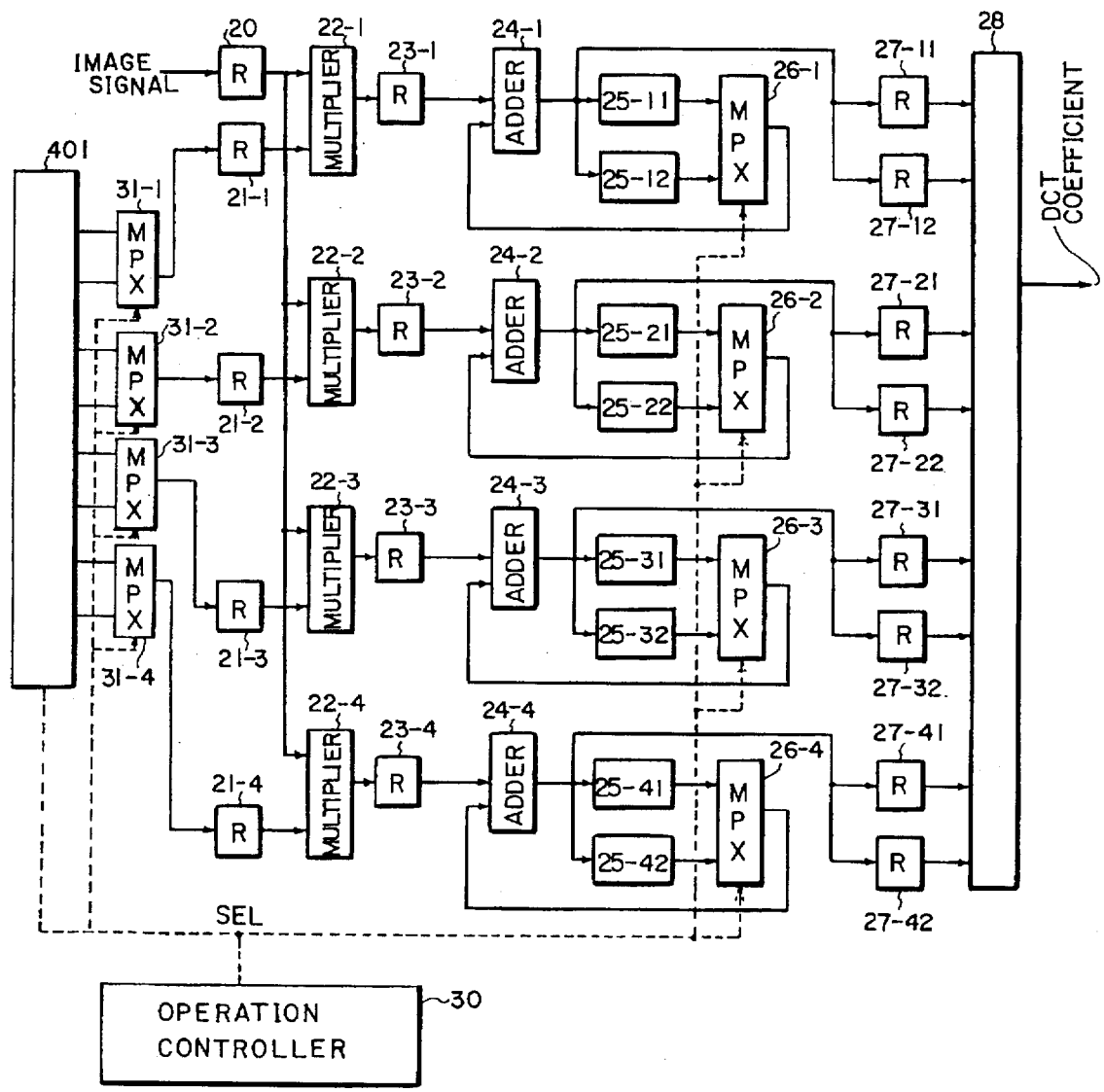
FIG. 27A is a configuration diagram of the fourth embodiment.
Figure 27C:
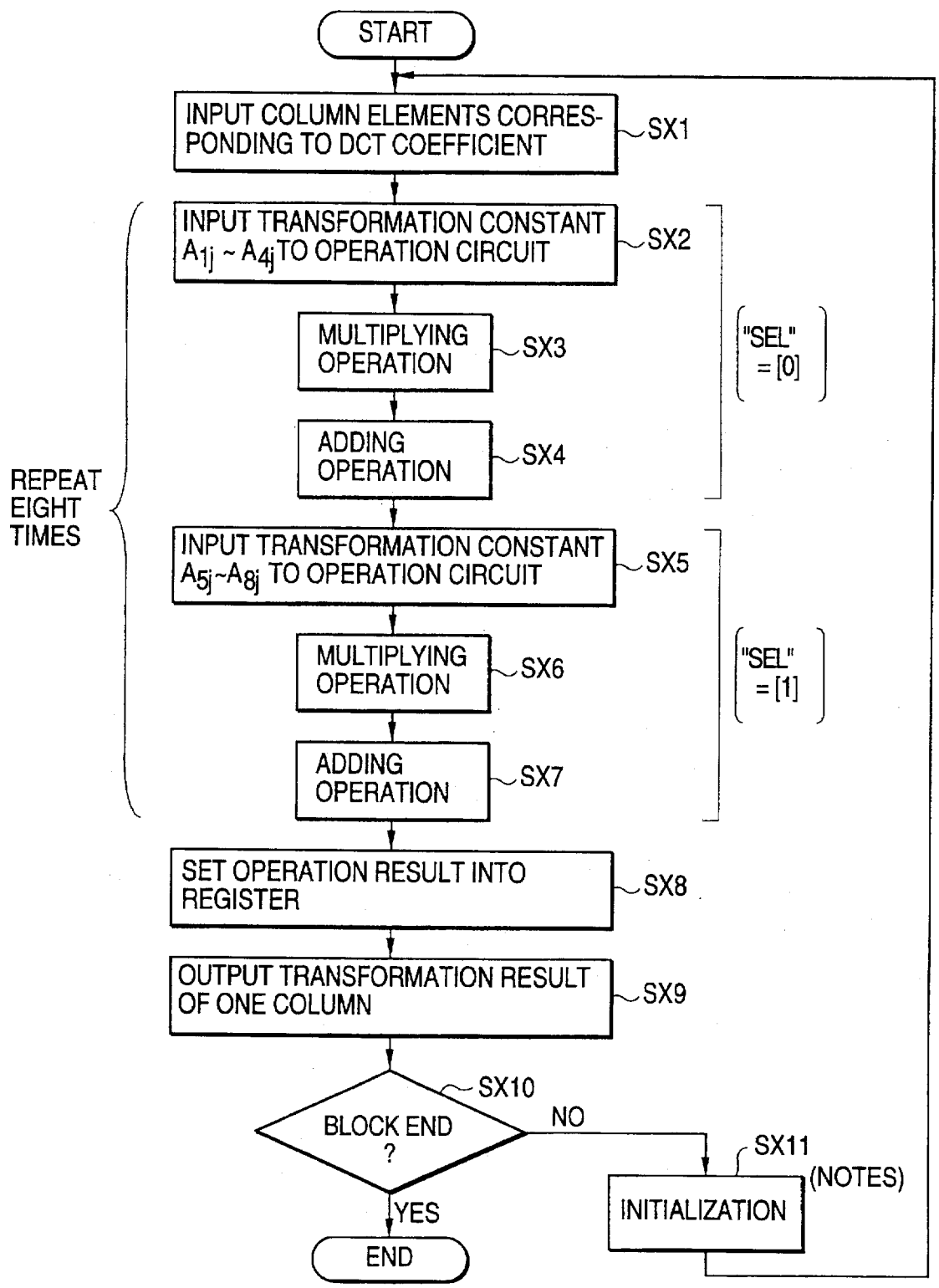
FIG. 27C is an operational flowchart related with FIG. 27B.

FIGS. 27A, 27B and 27C show an application of the fourth embodiment of this invention to the one-dimensional DCT unit 400.

The example shown in FIGS. 27A, 28B and 28C assumes that the DCT constants in the original 8*8 matrix are divided into a 4*8 first group representing the elements in the upper half of the original 8*8 matrix and another 4*8 second group representing the elements in the lower half.

As already discussed in the explanation for FIG. 3, the DCT constant storage 401 stores the DCT constants. First multiplexers 31-1 through 31-4 multiplex eight (8) elements in four (4) respective rows.

A first latch 20, second latches 21-1 through 21-4, multipliers 22-1 through 22-4, adders 24-1 through 24-4, fourth latches 25-11 through 25-42 and second multiplexers 26-1 through 26-4 shown in FIG. 27A respectively correspond to the first latch 210, the second latches 211-1 through 211-4, the multipliers 212-1 through 212-4, the adders 213-1 through 213-4, the third latches 214-11 through 214-42 and the selector 215-1 through 215-4 shown in FIG. 26. Third latches 23-1 through 23-4 latch the products outputted from the multipliers 22-1 through 22-4. Fifth latches 27-11 through 27-42 respectively latch the products of the matrix multiplications latched by the fourth latches 25-11 through 25-42. An output multiplexer 28 selectively outputs the matrix multiplication products latched by the fifth latches 27-11 through 27-42. An operation controller 30 controls the respective circuits shown in FIG. 27A.

As already discussed, the 8*8 matrix of DCT constants is divided into two (2) 4*8 matrices. The numbers of the first multiplexers 31-1 through 31-4, the second latches 21-1 through 21-4, the multipliers 22-1 through 22-4, the third latches 23-1 through 23-4, the adders 24-1 through 24-4 and the second multiplexers 26-1 through 26-4, which are four (4), correspond to the four (4) sets of eight (8) matrix elements outputted from the 4*8 matrices of the first and second groups. The number of the paired fourth latches in each of the four pairs (25-11 and 25-12) through (25-41 and 25-42), which is two, corresponds to the number of the divisions from the original 8*8 matrix.

FIG. 27C is a flowchart for explaining the operations of the one-dimensional DCT unit 400.

When the image data in the first column of an 8*8 image signal are inputted sequentially, the operation controller 30 first stores the head end image signal element $X_{11}$ in the first column by transmitting a latch instruction signal to the first latch 20. (Refer to FIG. 27B for the input of SP1.) The first multiplexers 31-1 through 31-4 select four DCT constants $A_{11}$ through $A_{41}$ belonging to the first group of the matrix division from among the eight (8) DCT constants $A_{11}$ through $A_{81}$ outputted from the DCT constant storage 401 in synchronization with the storage of $X_{11}$ in the first latch 20 according to a selection control signal (SEL), and set the four (4) selected DCT constants $A_{11}$ through $A_{41}$ in the second latches 21-1 through 21-4, by transmitting latch instruction signals to the second latches 21-1 through 21-4. (Refer to FIG. 27B for the constants of SP1.)

When the second latches 21-1 through 21-4 latch four DCT constants $A_{11}$ through $A_{41}$, the respective multipliers 22-1 through 22-4 multiply the DCT constants $A_{11}$ through $A_{41}$ by the head end image signal element $X_{11}$. That is, first, the operation controller 30 transmits latch signals to the third latches 23-1 through 23-4. (Refer to FIG. 27B for SP2.) Then, the third latches 23-1 through 23-4 latch the multiplication results $F_{11}$ through $F_{41}$.

Thus, the products $F_{11}$ through $F_{41}$ are calculated in parallel, and represent the first terms of the sum-of-product operations for obtaining the matrix elements.

The operation controller 30 performs a control to input to the adders 24-1 through 24-4 the outputs from the fourth latches 25-11 through 25-41 provided in correspondence with the DCT constants $A_{11}$ through $A_{41}$ in the first group, by controlling the second multiplexers 26-1 through 26-4 according to the selection control signal (SEL), and set the four (4) selected DCT constants $A_{11}$ through $A_{41}$ in the second latches 21-1 through 21-4, by transmitting latch instruction signals to the second latches 21-1 through 21-4. (Refer to FIG. 27B for the constants of SP1.)

When the second latches 21-1 through 21-4 latch four DCT constants $A_{11}$ through $A_{41}$, the respective multipliers 22-1 through 22-4 multiply the DCT constants $A_{11}$ through $A_{41}$ by the head end image signal element $X_{11}$. That is, first, the operation controller 30 transmits latch signals to the third latches 23-1 through 23-4. (Refer to FIG. 27B for SP2.) Then, the third latches 23-1 through 23-4 latch the multiplication results $F_{11}$ through $F_{41}$.

Thus, the products $F_{11}$ through $F_{41}$ are calculated in parallel, representing the first terms of the sum-of-product operations for obtaining the matrix elements.

The operation controller 30 performs a control to input to the adders 24-1 through 24-4 the outputs from the fourth latches 25-11 through 25-41 provided in correspondence with the DCT constants $A_{11}$ through $A_{41}$ in the first group, by controlling the second multiplexers 26-1 through 26-4 according to the selection control (SEL) signal. The fourth latches 25-11 through 25-42 are cleared to zero according to instructions from the operation controller 30, when the operations begin for the column matrix of the head end image signal element $X_{11}$.

Upon receiving the zero values from the fourth latches 25-11 through 25-41 and the products $F_{11}$ through $F_{41}$ from the latches 23-1 through 23-4, the adders 24-1 through 24-4 add them together to produce the accumulated values, $F_{11}$ through $F_{41}$ in this case. By transmitting latch instruction signals to the fourth latches 25-11 through 25-41, the operation controller 30 sets the accumulated values $F_{11}$ through $F_{41}$. Then, the processings for the DCT constants $A_{11}$ through $A_{41}$ in the first group are terminated. (Refer to FIG. 27B for SP3.)

Contemporaneous with the conclusion of the above processings, while the operation controller 30 keeps the head end image signal element $X_{11}$ latched in the first latch 20 according to the selection control (SEL) signal, the first multiplexers 31-1 through 31-4 select the four DCT constants $A_{51}$ through $A_{81}$ belonging to the second group from the eight DCT constants $A_{11}$ through $A_{81}$, and set the selected DCT constants $A_{51}$ through $A_{81}$ to the first latches 21-1 through 21-4. (Refer to FIG. 27B for SP2.) According to the latching operations, the multipliers 22-1 through 22-4 multiply the head end image signal element $X_{11}$ latched in the first latch 20 by the corresponding DCT constants $A_{51}$ through $A_{81}$. The operation controller 30 sets the products $F_{51}$ through $F_{81}$ to the third latches 23-1 through 23-4. (Refer to FIG. 27B for SP3.) Thus, the first terms $F_{51}$ through $F_{81}$ are calculated in parallel.

By controlling the second multiplexers 26-1 through 26-4, the operation controller 30 performs a control to input to the adders 24-1 through 24-4 the outputs from the fourth latches 25-12 through 25-42 (initialized to zero) provided in correspondence with the DCT constants $A_{51}$ through $A_{81}$ classified as belonging to the second group. The adders 24-1 through 24-4 add the initial zero value stored in the fourth latches 25-12 through 25-42 to the products $F_{51}$ through $F_{81}$ and sets the sums in the latches 25-12 through 25-42. (Refer to FIG. 27B for SP4.) Thus, the processings for the DCT constants $A_{51}$ through $A_{81}$ belonging to the second group are terminated to conclude the first step processes.

After the first step processes are concluded, the operation controller 30 sets to latch 20 the second image signal element from the head end in the first column $X_{21}$. The first multiplexers 31-1 through 31-4 select the four DCT constants $A_{12}$ through $A_{42}$ in the first group from among the eight DCT constants $A_{12}$ through $A_{82}$. The operation controller 30 also sets the four (4) selected DCT constants $A_{12}$ through $A_{42}$ in latches 21-1 through 21-4. (Refer to FIG. 27B for the constants of SP3.) According to the latching processings, the multipliers 22-1 through 22-4 multiply the DCT constants $A_{12}$ through $A_{42}$ by the second image signal element $X_{21}$. The operation controller 30 sets the products $F_{12}$ through $F_{42}$ in the third latches 23-1 through 23-4. (Refer to SP4 in FIG. 27B.) Hence, the second terms $F_{12}$ through $F_{42}$ of the sum-of-product operations for obtaining the element values in the product matrix are calculated sequentially.

By controlling the second multiplexers 26-1 through 26-4, the operation controller 30 inputs to the adders 24-1 through 24-4 the hitherto accumulated sum-of-product values $F_{11}$ through $F_{41}$ outputted from the fourth latches 25-11 through 25-41 provided in correspondence with the DCT constants $A_{12}$ through $A_{42}$ belonging to the first group.

The operation controller resets the fourth latches 25-11 through 25-41 with the updated accumulated sum-of-product values $F_{11}+F_{12}$ through $F_{41}+F_{42}$. (Refer to FIG. 27B for SP5.) Thus, the processes for the first step are concluded. After the above processes, the operation controller 30 has the first multiplexers 31-1 through 31-4 select the four (4) DCT constants $A_{52}$ through $A_{82}$ from among the eight (8) DCT constants $A_{12}$ through $A_{82}$ stored in the DCT constant storage unit 401 according to the selection control (SEL) signal and sets them in the second latches 21-1 through 21-4, while keeping the second image signal element $X_{21}$ latched in the latch 20. (Refer to FIG. 27B for SP4 constants.) According to the latching actions, the multipliers 22-1 through 22-4 multiply the DCT constants $A_{52}$ through $A_{82}$ by the second image signal element $X_{21}$. The operation controller 30 sets the products $F_{52}$ through $F_{82}$ in the third latches. (Refer to FIG. 27B for SP5.) Thus, the second terms $F_{52}$ through $F_{82}$ in the sum-of-product operations for obtaining the element values of the product matrix are calculated in parallel.

By controlling the second multiplexers 26-1 through 26-4, the operation controller 30 inputs to the adders 24-1 through 24-4 the hitherto accumulated sum-of-product values $F_{51}$ through $F_{81}$ outputted from the fourth latches 25-11 through 25-41 provided in correspondence with the DCT constants $A_{52}$ through $A_{82}$ belonging to the second group. The newly accumulated sum-of-product values $F_{51}+F_{52}$ through $F_{81}+F_{82}$ are thus obtained. These values are reset in the fourth latches 25-12 through 25-42.

This concludes the operations for the DCT constants $A_{52}$ through $A_{82}$ in the second group in the second step.

The third to the eighth image signal elements $X_{31}$ to $X_{81}$ are calculated by the respective DCT constants belonging to the first group and those belonging to the second group.

As a result, the fourth latches 25-11 through 25-41 set the final element values of the product matrix calculated according to the matrices representing the DCT constants belonging to the first group and the corresponding image signal elements. The fourth latches 25-12 through 25-42 set the final element values of the product matrix calculated according to the matrices representing the DCT constants belonging to the second group and the corresponding image signal elements.

When the fourth latches 25-11 through 25-41 latch the element values of the upper half of the product matrix, the operation controller 30 sets these element values in the fifth latches 27-11 through 27-41 by transmitting the latch instruction signals to the fifth latches 27-11 through 27-41. (Refer to FIG. 27B for SP17.)

When the fourth latches 25-12 through 25-42 latch the element values of the lower half of the product matrix, the operation controller 30 sets these element values in the fifth latches 27-12 through 27-42 by transmitting the latch instruction signals to the fifth latches 27-12 through 27-42. (Refer to FIG. 27B for SP18.)

Here, the element values of the product matrix are set in the fifth latches 27-12 through 27-42. The output multiplexer 28 completes the calculation in the first column of the product matrix between the DCT constants and the image signal elements.

By repeating the above processes for all the eight (8) columns of matrix X representing image signals in a block, the operation controller 30 completes the matrix calculation between matrix A representing DCT constants and matrix X. By performing similar processes of matrix calculation for product matrix AX and matrix $A^r$ representing the transposition of the DCT constants, the DCT coefficients are obtained for the image data of the block.

As shown in FIG. 27B, a total of sixty-four (64) results are outputted by the 137 process timings.

Thus, according to this invention, a small number of multipliers 22-1 through 22-4 multiply matrices required in the orthogonal transformations of image data.

Although drawings are referred to in explaining various embodiments of this invention, this invention is no way limited to such embodiments. For instance, this invention is explained per ADCT, the application of the fourth embodiment of this invention is not limited to such transformation, but is applicable to all sorts of orthogonal transformations. The configuration of the image data and a block, the number of circuit elements and the latching sequences described in this fourth embodiment are simply examples. The fourth embodiment of this invention is not limited to these examples.

Figure 28:
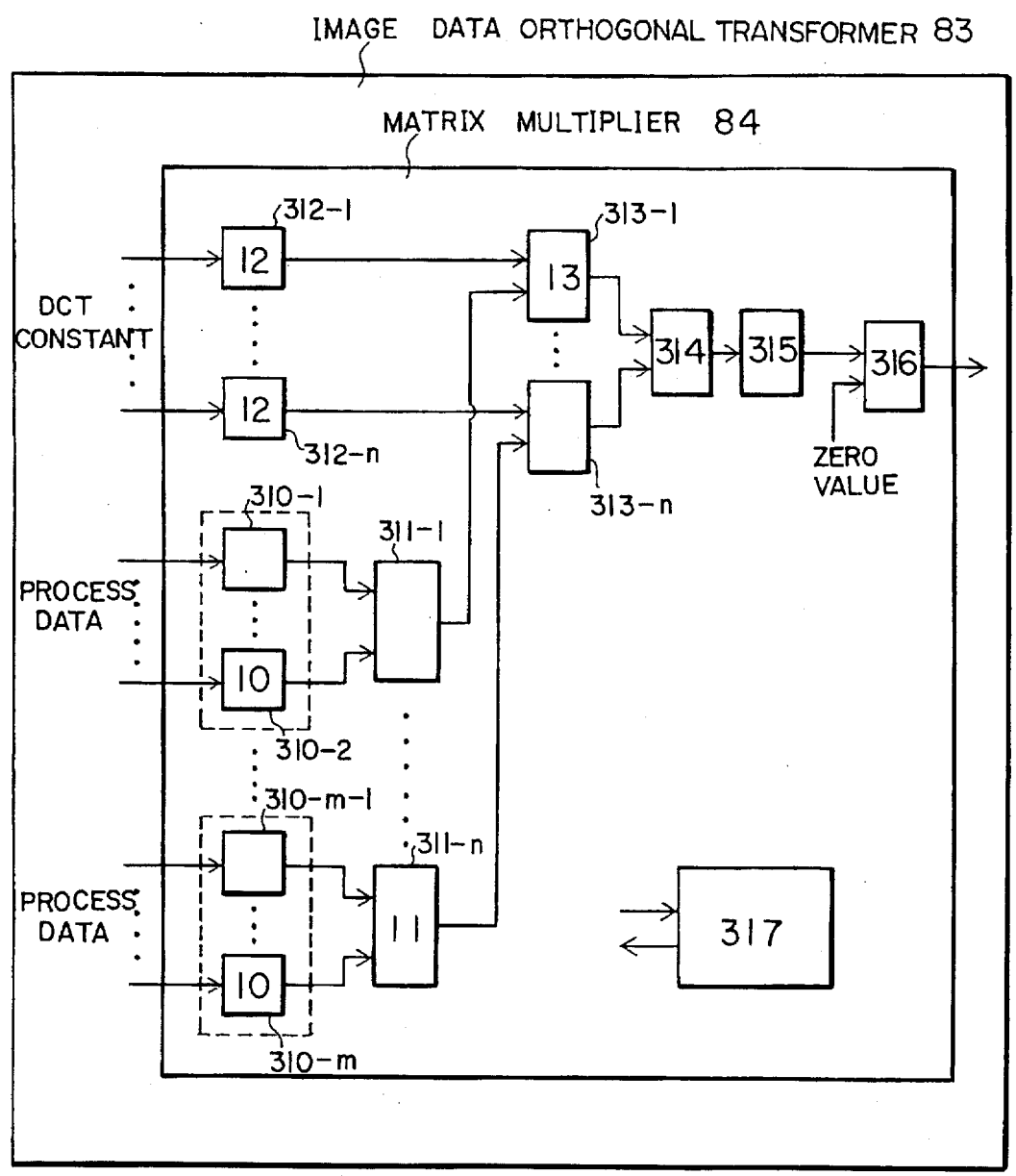
FIG. 28 is a configuration diagram of the fifth embodiment.

FIG. 28 is a block for diagram explaining the fifth embodiment of this invention.

In FIG. 28, an image data orthogonal transformer 83 orthogonally transforms image data or inversely normalizes coded image data. A matrix multiplier 84 multiplies a 1*N matrix by an N*1 matrix, as requested by the image data normalizer 83.

The matrix multiplier 84 comprises first latches 310-1 through 310-N, selectors 311-1 through 311-n, multipliers 313-1 through 313-n, an adder 314, an accumulator 315, an output selector 316, and an operation controller 317, where N coincides with the number of elements in a column of the matrix representing the data to be processed and n represents the number of divisions containing an equal number of elements.

Figure 10:
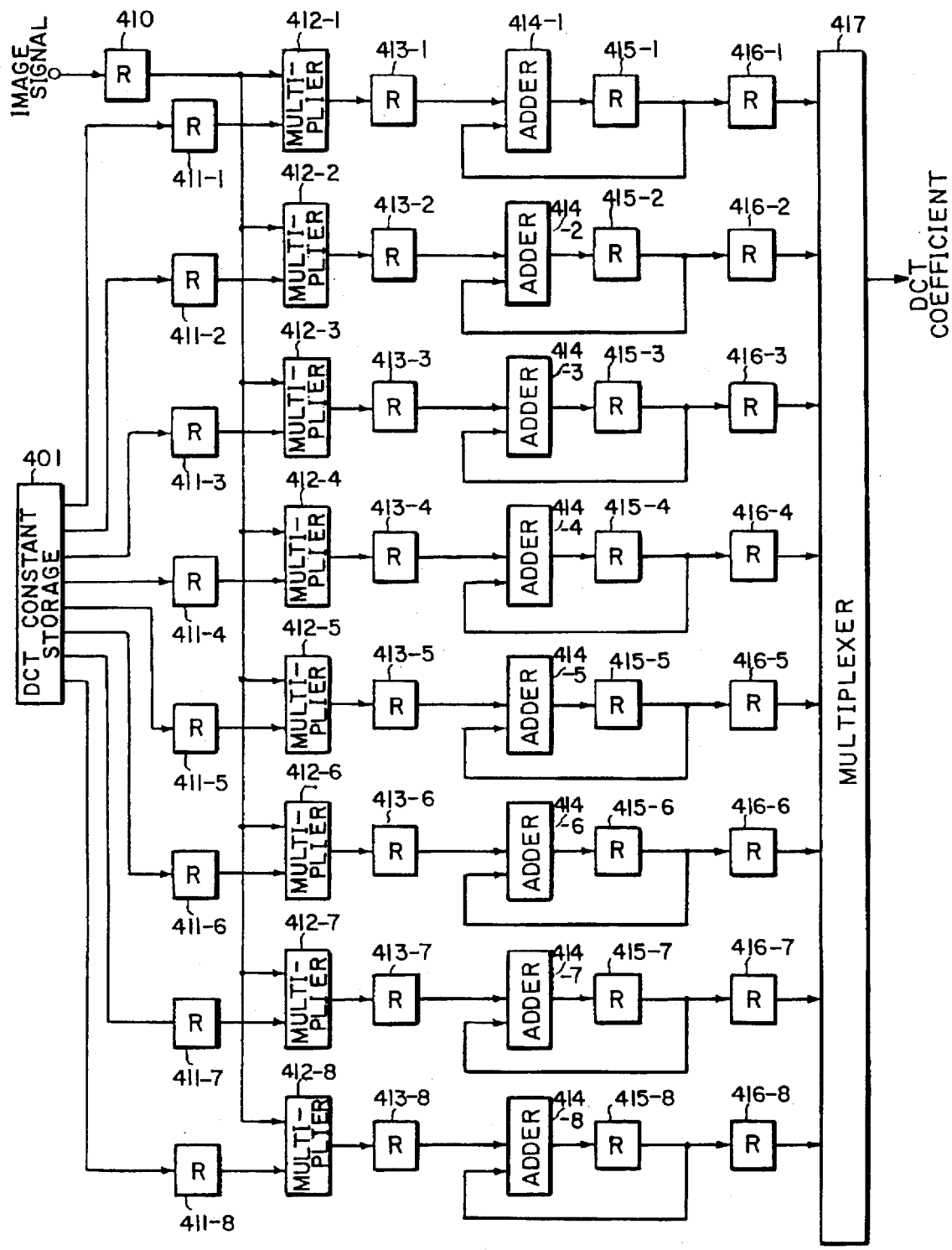
FIG. 10 is an explanatory diagram of one-dimensional DCT unit process and one-dimensional DCT unit process of prior art technology.
Figure 11:
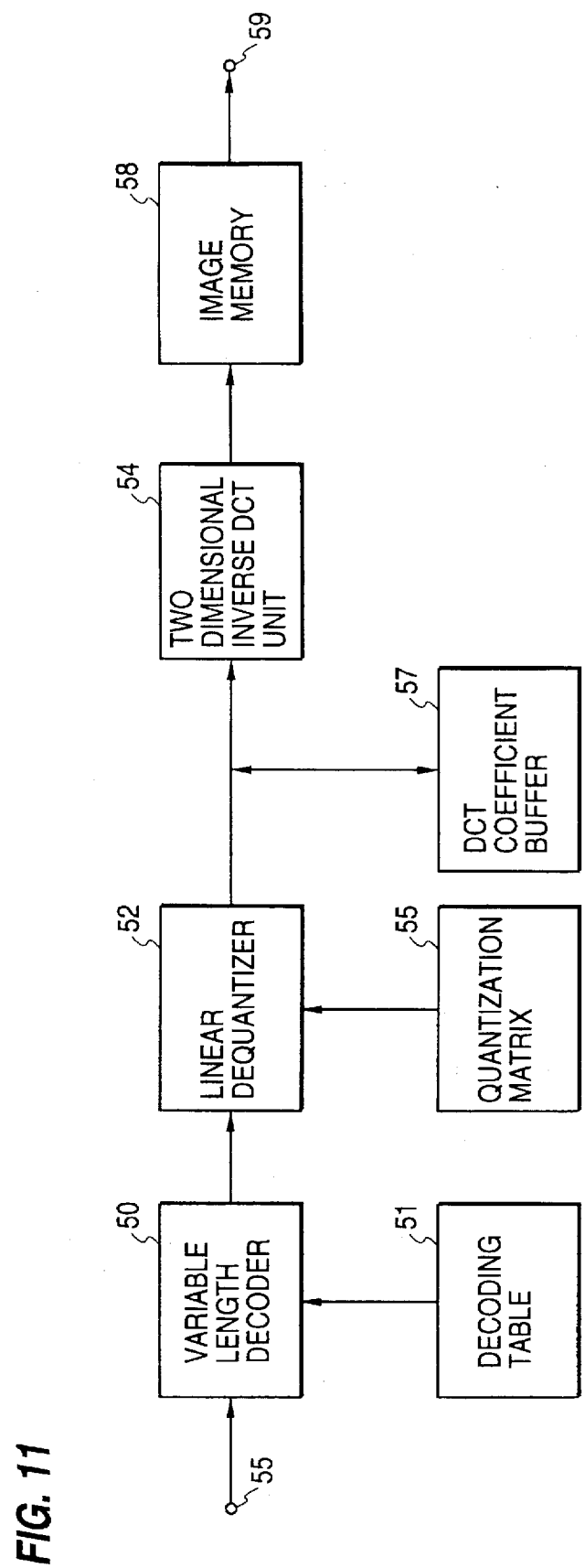
FIG. 11 is a block diagram of an ADCT progressive restoring section of prior art technology.
Figure 12:
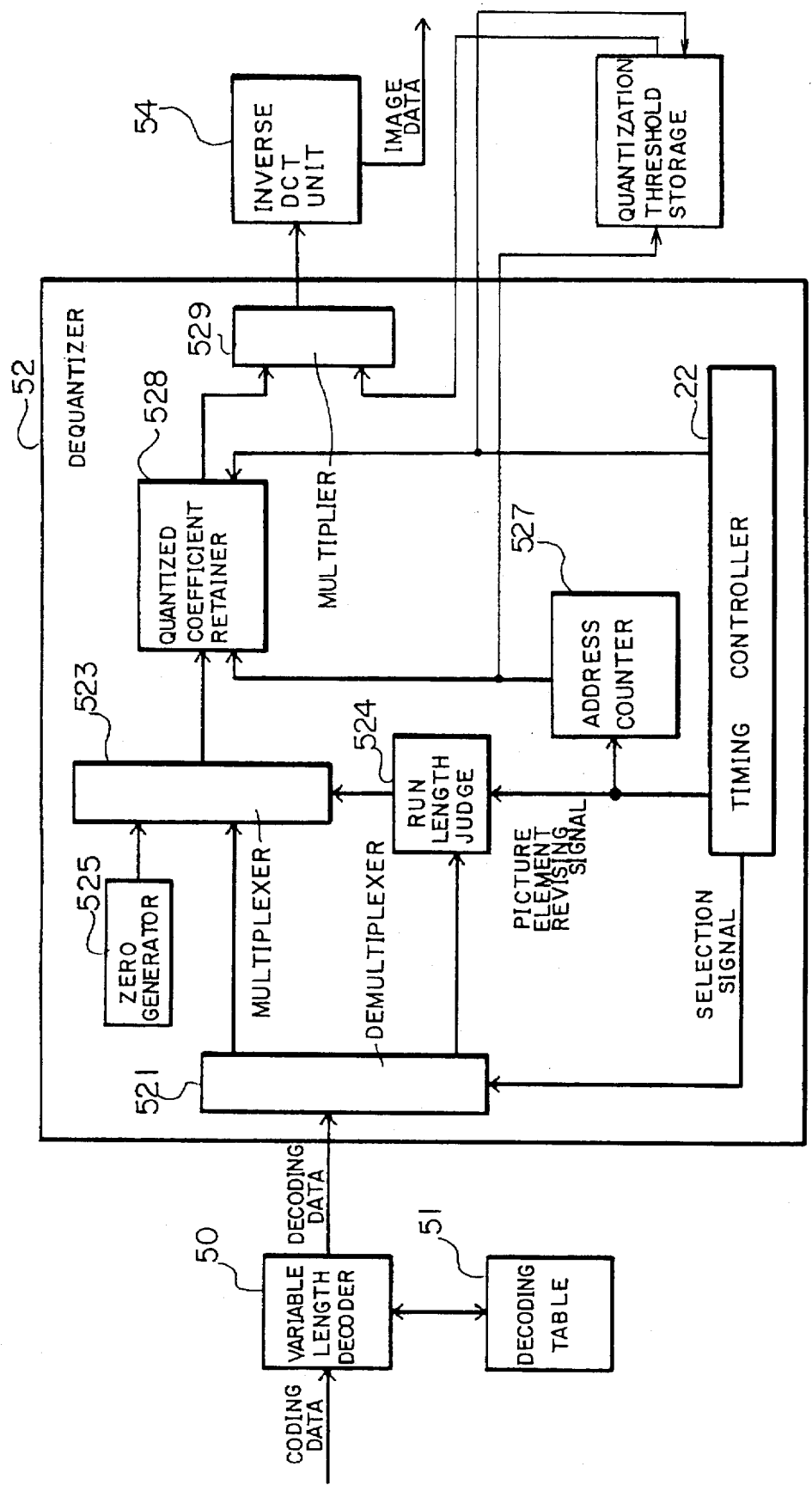
FIG. 12 is a configuration diagram of a restoring unit of prior art technology.

Assume, for instance, that column matrices of an 8*8 matrix representing the data to be processed are divided into two (2) divisions each having four (4) elements. In this case, there are eight (8) first latches 310-1 through 310-8, two (2) selectors 311-1 and 311-2, and two (2) multipliers 311-1 through 311-2. Thus, since there are far fewer multipliers than in the configuration shown in FIG. 10, the circuit size is reduced greatly.

The first latches 310-1 through 310-N latch the elements in a column matrix of the matrix representing selected data to be processed. The selectors 311-1 through 311-n sequentially select and output an element of the data to be processed, latched in the first latches 310-1 through 310-N. The second latches 312-1 through 312-n sequentially latch the transformation constants corresponding to the element outputted from the selectors 311-1 through 311-n. The multipliers 313-1 through 313-n multiply the transformation constants latched by the second latches 312-1 through 312-n by the data to be processed outputted from the selectors 311-1 through 311-n. The adder 314 sums the products outputted from the multipliers 313-1 through 313-n. The accumulator 315 accumulate the sum-of-product values outputted from the adder 314. The output selector 316 outputs zero (0) in lieu of the outputs from the accumulator 315. The operation controller 317 detects whether or not the elements of the matrix representing the data to be processed latched in the first latches 310-1 through 310-N are zero (0), and controls the selectors 311-1 through 311-n and the output selector 316 according to the detection results.

By controlling the first latches 310-1 through 310-N, the operation controller 317 has the first latches 310-1 through 310-N latch the column matrix [$X_{11}$, $X_{21}$, $X_{31}$, $X_{41}$, $X_{51}$, $X_{61}$, $X_{71}$, $X_{81}$] of the selected data to be processed. By controlling the selectors 311-1 through 311-n, the operation controller 317 has the selectors 311-1 through 311-n sequentially select a latched element of the data to be processed and output the selected data to the corresponding multipliers 313-1 through 313-n.

In correspondence with the above processings, the operation controller 317 selects a row matrix representing DCT constants and has the second latches 312-1 through 312-n latch the DCT constants corresponding to the data to be processed outputted from the selectors 311-1 through 311-n within the selected row matrix.

For example, when the row matrix representing the first row of the matrix representing DCT constants is selected to calculate element $Y_{11}$ of product matrix Y (=A*X), if the selectors 311-1 through 311-n output element $X_{11}$ from among matrix X representing the (image signal) data to be processed, the second latches 312-1 through 312-n corresponding to the selector 311-1 through 311-n outputting $X_{11}$ latch DCT constant element $A_{11}$. When the selectors 311-1 through 311-n output image signal element $X_{21}$, the second latches 312-1 through 312-n latch the corresponding DCT constant element $A_{12}$.

Upon receipt of the image signal data outputted from the selectors 311-1 through 311-n and the DCT constants latched by the second latches 312-1 through 312-n, the multiplier 313 multiplies them. The adder 314 adds the products outputted from the multipliers 313-1 through 313-n. The accumulator 315 accumulates the sum of the products outputted from the adder 314.

Through these processes, the first two terms ($A_{11}X_{11}$+$A_{12}X_{21}$) in element $Y_{11}$ of product matrix Y are calculated, for example. According to the control by the operation controller 317, the selectors 311-1 through 311-n sequentially output the image signal data elements to be processed, until finally the accumulator 315 latches the matrix element $Y_{11}$ (=$A_{11}X_{11}$+$A_{12}X_{21}$+$A_{13}X_{31}$+$A_{14}X_{41}$+$A_{15}X_{51}$+$A_{16}X_{61}$+$A_{17}X_{71}$+$A_{18}X_{81}$).

The operation controller 317 executes these processes by sequentially selecting the row matrices of the DCT constants to calculate the matrix elements $Y_{11}$ through $Y_{81}$.

When all of the image signal data latched by the first latches 310-1 through 310-N are zero (0) in the matrix multiplication, since no operation is required to calculate the corresponding element value, the operation controller 317 has the output selector 316 output zero (0).

When some of the image signal data latched by the first latches 310-1 through 310-N are not zero (0) in the matrix multiplication, it is judged whether or not the image signal data inputted to and outputted from the selectors 311-1 through 311-n are zero (0). If it is judged that they are in fact all zero (0), since no operations by the multipliers 313-1 through 313-n are required to calculate the corresponding products, the selectors 311-1 through 311-n skip outputting the image signal data. Thus, the number of operations is reduced.

Thus, in the fifth embodiment of this invention, the matrix multipliers used in an image data orthogonal transformer have smaller circuits and operate faster.

Discussed below in detail is the application of the principle of the fifth embodiment of this invention to the one-dimensional inverse DCT unit 540 shown in FIG. 4.

As already explained in the description of FIG. 28, this embodiment aims at reducing the number of operations by skipping those for the elements known to be zero (0) in matrix multiplication.

As shown in FIGS. 8A and 8B, since the matrix representing the coded quantized coefficients contain many zero (0) values, the DCT coefficients inputted into the one-dimensional inverse DCT unit 540 and restored by the quantized coefficients also have many zero (0) values. Thus, it is especially effective to apply the principle of the fifth embodiment of this invention to the one-dimensional inverse DCT unit 540.

The one-dimensional inverse DCT unit 540 calculates elements in product matrix Z ($=A^{-1}*B$), where 8*8 matrices $A^{-1}$ and B respectively represent inverse DCT constants and DCT coefficients, as stated earlier.

More specifically, the 8*8 matrix multiplication is configured by multiplying 1*8 matrices by 8*1 matrices to obtain matrix Z. The row matrices sequentially selected from the inverse DCT constant matrix $A^{-1}$ are multiplied by the column matrices sequentially selected from the DCT coefficient matrix B.

Assume initially that the selected column matrix represents the first column of the DCT coefficient matrix B.

First, element $Z_{11}$ is obtained by multiplying the row matrix representing the first row of the inverse DCT constant matrix A $[A_{11}, A_{12}, A_{13}, A_{14}, A_{15}, A_{16}, A_{17}, A_{18}]^t$ by the selected column matrix.

Second, element $Z_{21}$ is obtained by multiplying the row matrix representing the second row of the inverse DCT constant matrix A $[A_{21}, A_{22}, A_{23}, A_{24}, A_{25}, A_{26}, A_{27}, A_{28}]^t$ by the selected column matrix.

Third, element $Z_{31}$ is obtained by multiplying the row matrix representing the third row of the inverse DCT constant matrix A $[A_{31}, A_{32}, A_{33}, A_{34}, A_{35}, A_{36}, A_{37}, A_{38}]^t$ by the selected column matrix.

By performing similar multiplications, elements $Z_{11}, Z_{21}, Z_{31}, Z_{41}, Z_{51}, Z_{61}, Z_{71}, Z_{81}$ in the first column of the product matrix Z are obtained.

Figure 29A:
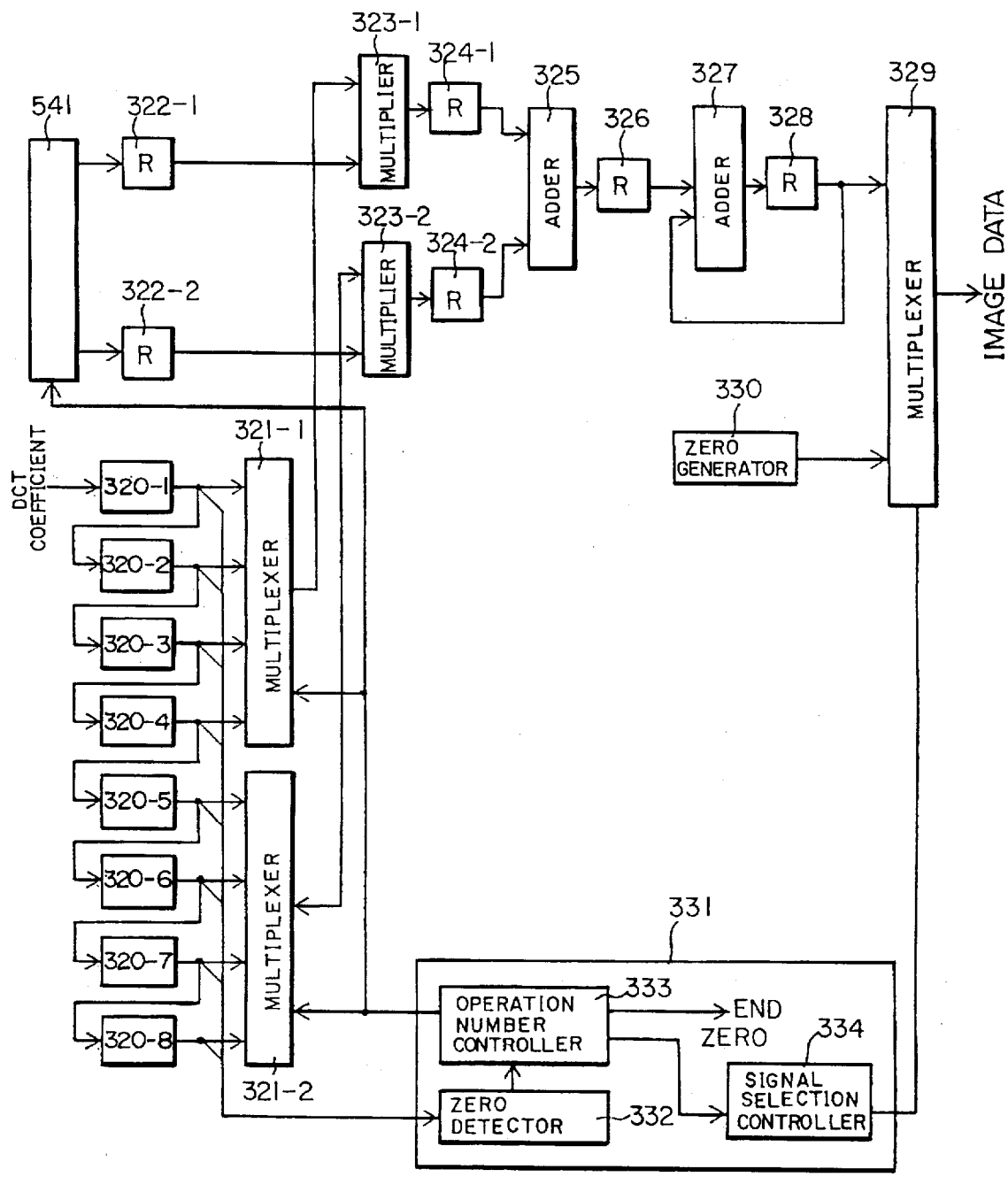
FIG. 29A is a configuration diagram of the fifth embodiment.

FIG. 29A shows the one-dimensional inverse DCT unit 540 to which the principle of the fifth embodiment of this invention is supplied.

Figure 4:
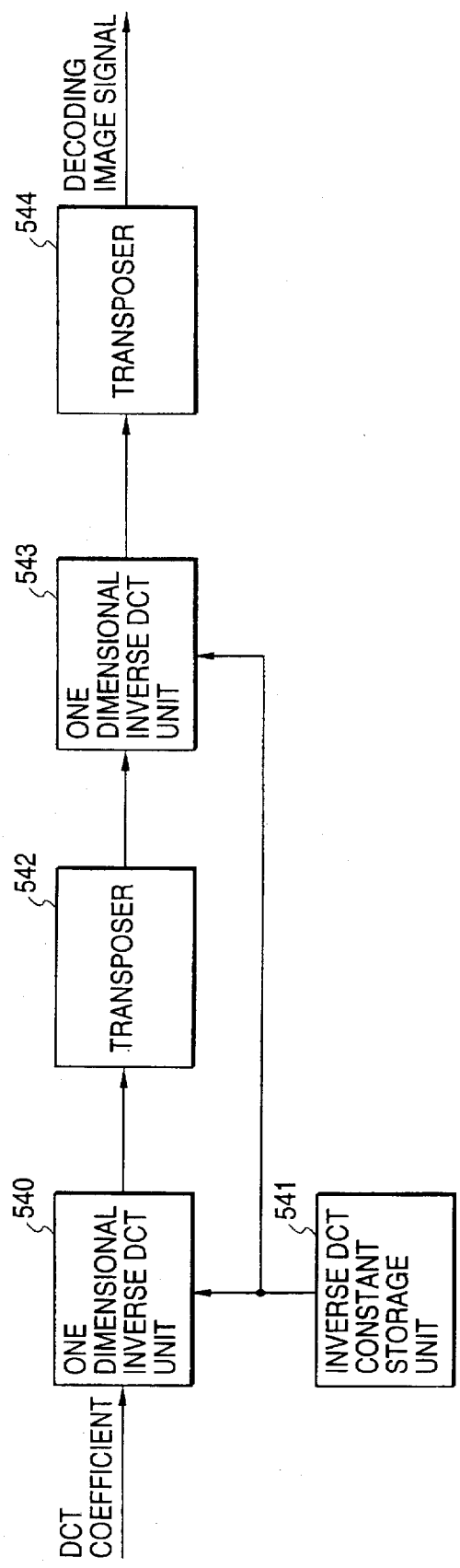
FIG. 4 is a detailed configuration diagram of a two-dimensional inverse DCT unit.

In FIG. 29A, the inverse DCT constant storage 541 stores the inverse DCT constants, as already explained in the description of FIGS. 3 and 4. inverse DCT constant storage units 320-1 through 320-8 comprise latches for storing DCT coefficients and correspond to the first latches 310-1 through 310-N shown in FIG. 28.

Multiplexers 321-1 and 321-2 correspond to the selectors 311-1 through 311-n shown in FIG. 28.

Latches 322-1 and 322-2 correspond to the second latches 312-1 through 312-n shown in FIG. 28.

Multipliers 323-1 and 323-2 correspond to the multipliers 313-1 through 313-n shown in FIG. 28.

Latches 324-1 and 324-2 latch the products calculated by the multipliers 323-1 and 323-2.

An adder 325 corresponds to the adder 314 shown in FIG. 28.

A latch 326 latches the sum calculated by the adder 325.

An adder 327 is a part of the accumulator 315 shown in FIG. 28 and adds the previously accumulated sums of the products to the newly obtained sum of the products.

A latch 328 is a part of the accumulator 315 shown in FIG. 28 and latches the sum calculated by the adder 327.

A multiplexer 329 corresponds to the output selector 316 shown in FIG. 28.

A zero generator 320 outputs zero (0) to the multiplier 329.

An operation controller 331 corresponds to the operation controller 317 shown in FIG. 28.

The operation controller 331 comprises a zero detector 332 for detecting whether or not the DCT coefficients latched by the latches 320-1 through 320-8 are zero (0), an operation number controller 333 for transmitting a control signal for controlling matrix multiplications according to the result detected by the zero detector 332, and a signal selection controller 334 for switching the multiplexer 329 according to the control signal of the operation number controller 333.

As already explained in the description of FIG. 28, the fifth embodiment of this invention divides the selected column matrix of the DCT coefficients into divisions having equal numbers of column elements. The multiplexers 321-1 and 321-2, the latches 322-1 and 322-2, the multipliers 323-1 and 323-2 are provided in correspondence with the two (2) divisions of the columns in the DCT coefficient matrix B according to a fifth embodiment of this invention shown in FIG. 29A.

The outputs from the four (4) latches 320-1 through 320-4 positioned in the upper half are inputted to the upper multiplexer 321-1 whose selection output is inputted to the upper multiplier 323-1, which also receives the outputs from the upper latch 322-1.

The outputs from the four (4) latches 320-5 through 320-8 positioned in the lower half are inputted to the lower multiplexer 321-2 whose selection output is inputted to the lower multiplier 323-2, which also receives the outputs from the lower latch 322-2.

Figure 30:
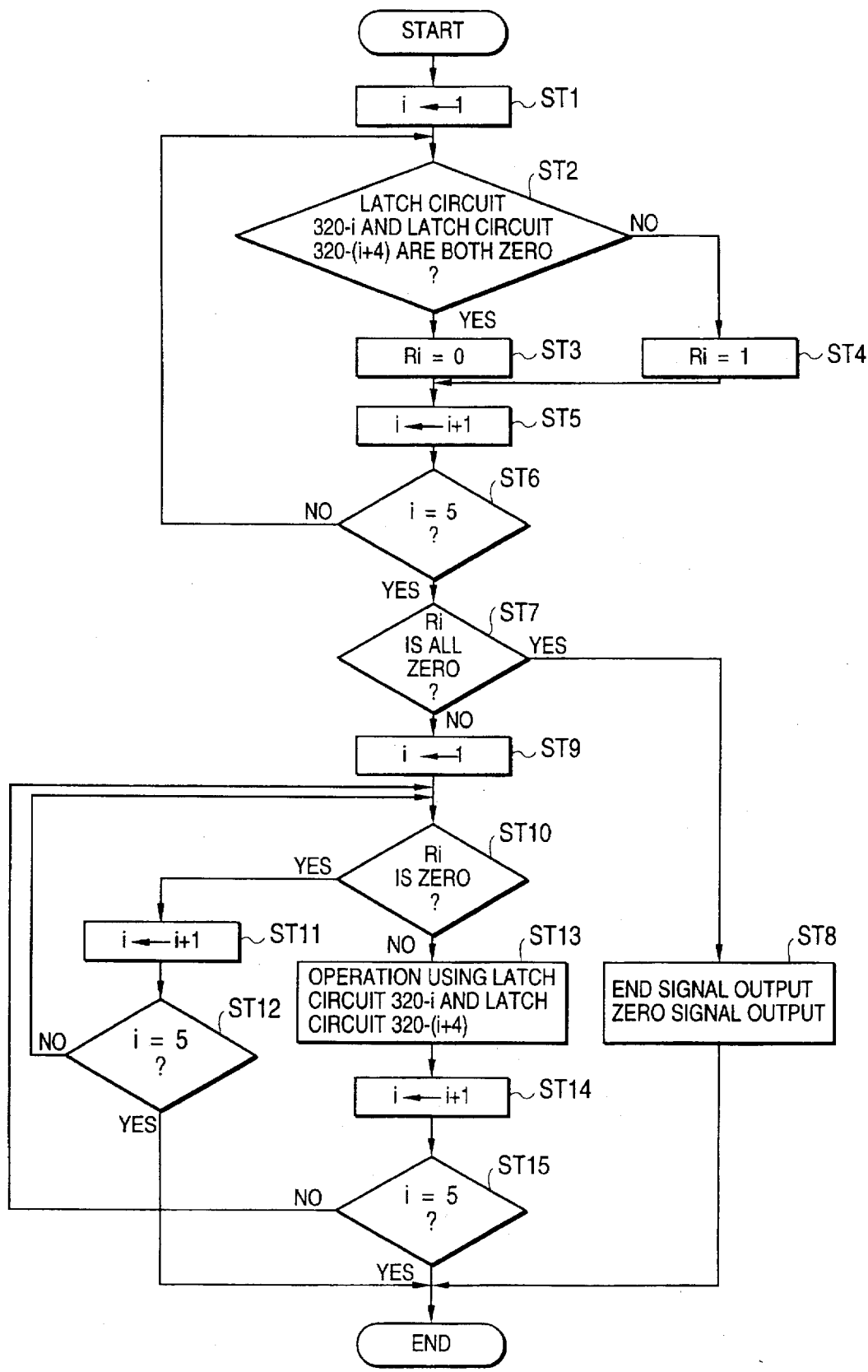
FIG. 30 is a flowchart of an operation controller.

FIG. 30 is a flowchart illustrating the actions of the operation controller 331.

By referring to FIG. 30, the actions of the one-dimensional inverse DCT unit 540 thus configured, being a fifth embodiment of this invention, are explained in detail.

The latch 320-1 receives in a predetermined order receives at its input terminal the elements in the first column of the DCT coefficient matrix B transmitted from the dequantizer 52 shown in FIG. 3. The inputted DCT coefficients are respectively latched by the latches 320-1 through 320-8 connected for data transmission e.g. in a shift register form.

Thus, for instance, the four (4) upper latches 320-1 through 320-4 respectively latch the first column elements in the odd rows of the DCT coefficient matrix B, i.e. $B_{11}, B_{31}, B_{51},$ and $B_{71}$, and the four (4) lower latches 320-5 through 320-8 respectively latch the first column elements in the even rows of the DCT coefficient matrix B, i.e. $B_{21}, B_{41}, B_{61},$ and $B_{81}$.

STEP1 through STEP6 in the flowchart of FIG. 30 show the processings during the latching actions.

First, the zero detector 332 of the operation controller 331 judges whether or not the data latched in the latches 320-1 and 320-5 are both zero (0). If they are, the zero detector 332 notifies the operation number controller 333 of "R1=0"; otherwise, "R1=1".

Second, the zero detector 332 of the operation controller 331 judges whether or not the data latched in the latches 320-2 and 320-6 are both zero (0). If they are, the zero detector 332 notifies the operation number controller 333 of "R2=0"; otherwise, "R2=1".

Third, the zero detector 332 of the operation controller 331 judges whether or not the data latched in the latches 320-3 and 320-7 are both zero (0). If they are, the zero detector 332 notifies the operation number controller 333 of "R3=0"; otherwise, "R3=1".

Fourth, the zero detector 332 of the operation controller 331 judges whether or not the data latched in the latches 320-4 and 320-8 are both zero (0). If they are, the zero detector 332 notifies the operation number controller 333 of "R4=0"; otherwise, "R4=1".

On receiving the data regarding R1 through R4 from the zero detector 332, the operation number controller 333 judges whether or not all the four (4) received data R1 through R4 are zero (0). This is shown as STEP7 in the flowchart of FIG. 30.

If the judgment of STEP7 indicates that data R1 through R4 are all zero (0), it is obvious without carrying out the actual calculations that the elements $Z_{11}$ through $Z_{81}$ in the first column of product matrix Z are zero (0). Thus, the operation number controller 333 ends the operations for the first column in the DCT coefficient matrix B latched by the latches 320-1 through 320-8, by transmitting an operation-end (END) signal. The operation number controller 333 simultaneously causes the multiplexer 329 to output zero (0) as the values of elements $Z_{11}$ through $Z_{81}$. These zero (0) values are generated by the zero generator 330, by transmitting a zero signal to the signal selection controller 334. The operation number controller 333 then terminates its processings.

If the judgment of STEP7 indicates that not all data R1 through R4 are zero (0), i.e. at least one of data R1 through R4 is one (1), the operation number controller 333 specifies a datum being one (1) among R1 through R4, shown as STEP9 through STEP12 in the flowchart of FIG. 30. Subsequently in STEP13, the operation number controller 333 executes operations by using the DCT coefficients latched by the two (2) paired latches 320-$i$ and 320-($i$+4), where $i$ satisfies "Ri=1", and is an integer from 1 to 4.

Specifically, the operations begin first with inputting the DCT coefficients latched by the two (2) paired latches 320-$i$ and 320-($i$+4), satisfying "Ri=1", to the corresponding multipliers 323-1 and 323-2.

Second, the inverse DCT constant read from the inverse DCT constant storage unit 541 and corresponding to the initially selected DCT coefficient in the first row of the matrix representing the inverse DCT constants are set in the corresponding latches 322-1 and 322-2.

For example, when at least either DCT coefficient $B_{11}$ latched in the latch 320-1 or DCT coefficient $B_{51}$ latched in the latch 320-5 is not zero (0), i.e. is one (1) (R1=1), elements $A_{11}$ and $A_{15}$ read from the inverse DCT constant storage 541 are set in the multipliers 323-1 and 323-2, according to the processes from STEP9 to STEP12.

The multiplier 323-1 and 323-2 multiply the respective inputted values to obtain their products. These products are then latched by the latch circuits 324-1 and 324-2 according to a latch instruction signal. Since the adder 325 adds the products obtained by the two multipliers 323-1 and 323-2 according to the latching processes, the latch 326 latches the sum, and the adder 327 adds the hitherto accumulated total of the sums to the newly obtained sum calculated by the adder 325. Hence, the latch 328 latches the newly obtained accumulated sums, according to a latch instruction signal.

When either DCT coefficient $B_{11}$ latched in the latch 320-1 or DCT coefficient $B_{21}$ latched in the latch 320-2 is not zero (0), if the hitherto accumulated total of the sums latched by the latch 328 is zero (0), the latch 328 latches as a new accumulated total ($A_{11}B_{11}+A_{12}B_{21}$) according to the processes in STEP13.

After thoperations in STEP13 are completed, the operation number controller 333 judges whether or not all processes for "Ri=1" through STEP14 and STEP15 shown in the flowchart of FIG. 30 are terminated. If the operation number controller 333 judges that the processes have not yet been completed, the operation number controller 333 specifies the DCT coefficient satisfying "Ri=1" or terminates its processings, unless there is no such DCT coefficient. Subsequently, in STEP13, DCT coefficients latched by the two (2) paired latches 320-$i$ and 320-($i$+4) satisfying "Ri=1" are used for the matrix multiplication.

Hence, when the latches 320-1 through 320-8 latch the first column of the DCT coefficient matrix B, the first and fifth terms, the second and sixth terms, the third and seventh terms, and the fourth and eighth terms are paired and used as units in calculating the element of the product matrix Z ($=A^{-1}*B$). Concurrently, if the two DCT coefficients $B_{11}$ and $B_{(i+4)1}$ included in the calculation units are both zero, the operations for their terms are omitted. After the operations to obtain the product matrix element $Z_{11}$ are over, the second row of the inverse DCT constants latched in the latches 320-1 and 320-2 is similarly multiplied by the first column of the DCT coefficients to obtain $Z_{21}$.

By similarly performing the processes, elements in the first column $Z_{11}$ through $Z_{81}$ are efficiently calculated.

Then, the latches 320-1 and 320-2 latch the second column of the DCT coefficients outputted from the dequantizer 52 in FIG. 3, and the above processes are repeated.

Further, by repeating these procedures up to the eighth column of the DCT coefficient matrix B, the product matrix Z ($=A^{-1}*B$) is calculated.

FIGS. 29B and 29C show the operation timing from process ST9 to ST15 in FIG. 30. The target of the operation in FIG. 29B and 29C is shown in the block diagram of FIG. 13, where non-zero data are contained in lines 1 through 4 while all data following line 4 are zero. In line 1, four inputted data X11 through X41 are not zero, and the processes ST10 through ST15 are performed with the timing shown in FIG. 29B. In line 2, as inputted data X42 are zero and X32 not zero, the determination of R2 at ST10 is 1, thereby requiring two variations of process timing for obtaining one element. In line 3, two inputted data X through $X_{21}$ are not zero and the process timing shown in FIG. 29C is adopted. In line 4, as inputted data X24 are zero and X14 not zero R1 is determined to be 1, thereby requiring one process timing for obtaining one element. In lines 5 through 8, processes AT9 through ST15 are not performed, but process ST8 performed resulting in the output of zero.

Accordingly, in the fifth embodiment of this invention, the matrix multiplication is expedited by skipping the operations for the terms known to be zero (0). Thus, the number of operations is greatly reduced.

The fifth embodiment of this invention has been described by referring to the attached drawings. However, thies invention is not limited to the only such embodiment. For instance, the fifth embodiment of this invention has been explained according to ADCT, but the principle of this embodiment is applicable to all sorts of normalizations. The configuration of a block of image data and the number of the circuit elements and the latching sequences illustrated heretofore are only examples. The application of the fifth embodiment of this invention is no way limited to these examples.

Figure 31:
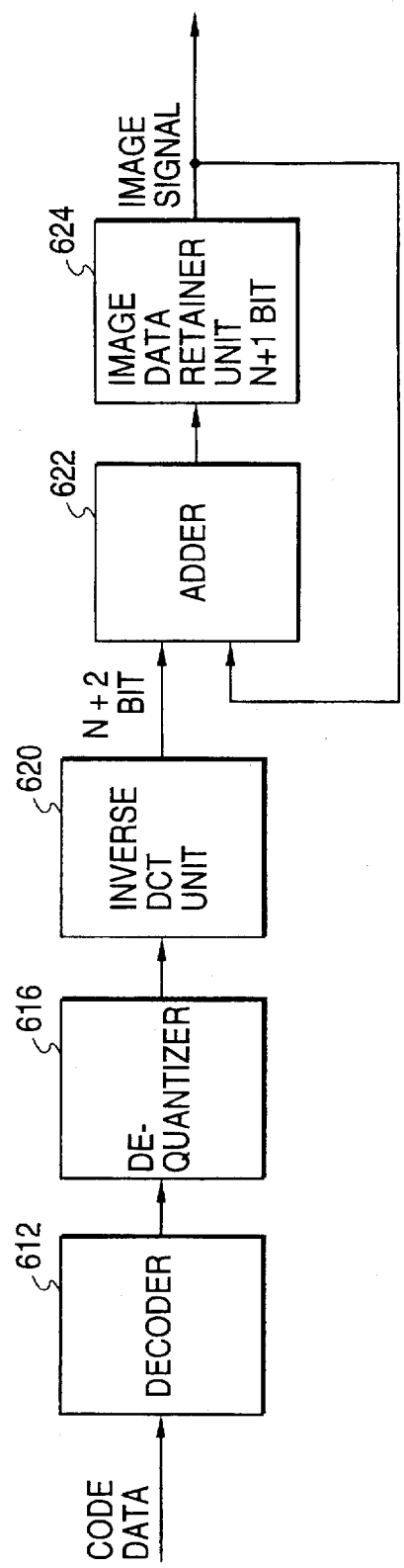
FIG. 31 is a block diagram of the principle of the sixth embodiment.
Figure 32:
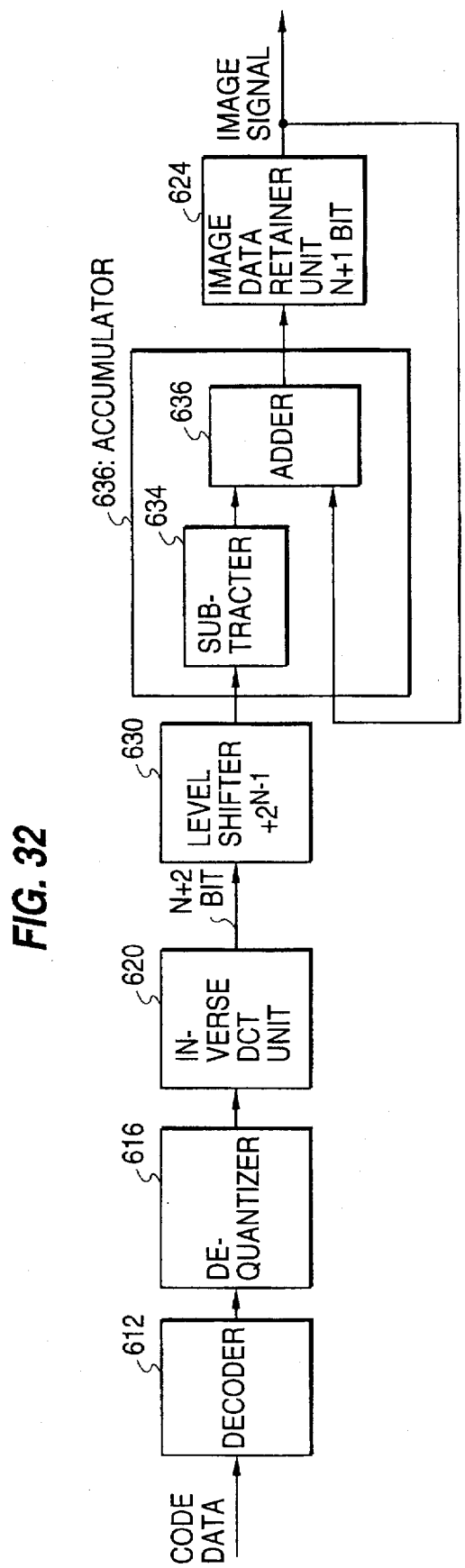
FIG. 32 is a block diagram of the principle of the seventh embodiment.

FIGS. 31 and 32 are block diagrams for explaining the sixth and seventh principles of this invention. Per these principles, an original image is split into a plurality of blocks comprising a plurality of picture elements having N bit gradation values. DCT coefficients are quantized, which are obtained by performing two-dimensional discrete cosine transformations for the gradation values of a plurality of picture elements in each block and the original image is progressively restored from data obtained by encoding the quantized DCT coefficient.

An object of the sixth principle of this invention is to realize the above mentioned image data restoration by a device comprising a decoder 612 for decoding split encoded data (split from one block) into DCT coefficients, a dequantizer 616 for obtaining a DCT coefficient by dequantizing a quantized DCT coefficient decoded by decoder 612, an inverse DCT unit 620 for obtaining image data by performing inverse DCT operation through matrix operation on a DCT coefficient inputted from dequantizer 616, an image data storage 624 having image memory of at least N+1 bits in the depth direction for storing image data provided by inverse DCT unit 620, and an adding means 622 for reading image data already stored in image data storage 624 and adding them to image data provided by inverse DCT unit 620 where image data are inputted from inverse DCT unit 620 to image data storage 624, thereby obtaining an image data restoring device for progressively restoring and storing an original image by accumulating split image data sequentially restored from split encoded data.

Per the seventh principle of this invention illustrated in FIG. 32, an image data restoring device comprises a decoder 612 for decoding split encoded data (split from one block) into a DCT coefficient, a dequantizer 616 for obtaining a DCT coefficient by dequantizing a quantized DCT coefficient decoded by the decoder 612, an inverse DCT unit 620 for obtaining image data by performing an inverse DCT operation through a matrix operation on a DCT coefficient inputted from the dequantizer 616, a level shifting means 630 for preventing underflowing by adding 2 N−1 to image data obtained by the inverse DCT unit 620, an image data storage unit 624 having an image memory of N+1 bits in the depth direction for storing image data provided by the level shifting means 630, an accumulating means 632 for adding image data provided by the level shifting means 630 to hitherto accumulated image data read from the image data storage unit 624, and re-storing the new accumulated image data in the image data storage unit 624; thereby obtaining an image data restoring device for progressively restoring an original image by accumulating and re-storing split image data sequentially restored from split encoded data.

An image data restoring device having the above mentioned configuration according to the 6th and 7th embodiments of this invention provides the following effects:

The sixth and seventh principles of this invention utilize the linearity of a DCT and an inverse DCT. For example, when one block is split into two, the sum of the image data obtained by performing inverse DCTs for respective DCT coefficients is equal to the image data obtained by performing the inverse DCTs for the DCT coefficients without splitting the block.

Accordingly, per the sixth and seventh principles of this invention, image data are sequentially restored and stored in a memory after being decoded from split code data, dequantized, and inverse DCTed. When the restored image data are stored in a memory, image data already stored in the image memory are read and summed, thereby skipping an intermediate image memory that temporarily stores DCT coefficients and realizing a smaller circuit.

For 8-bit image data, for example, a dynamic range of image data decoded when a split DCT coefficient is individually restored into encoded data may be extended by one bit and yield a 9-bit image memory. However, a circuit having a memory configuration of less than a half of a conventional circuit can be obtained, while a conventional circuit requires an 11-bit image memory for storing intermediate data and 8 bit image memory for storing restored images.

Figure 33:
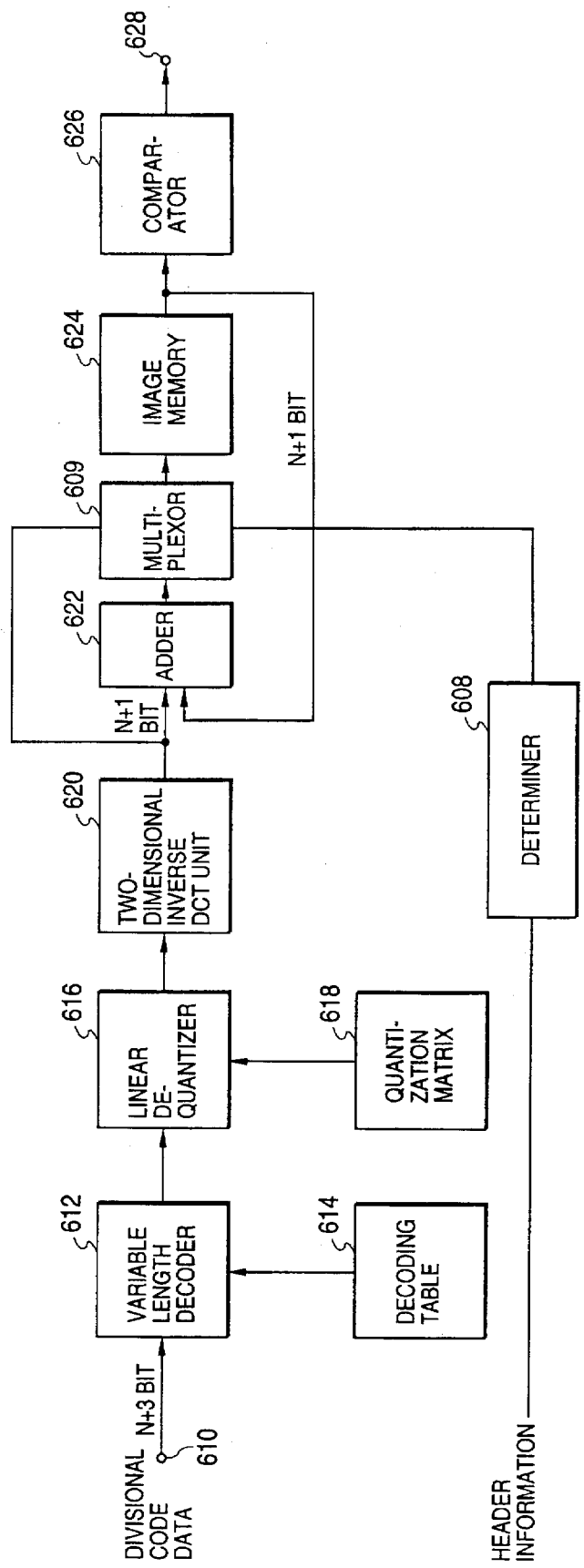
FIG. 33 is a configuration diagram of the sixth embodiment.

FIG. 33 shows the configuration of a further embodiment of this invention.

In FIG. 33, the variable length data decoder 612, the decoding table 614, the linear dequantizer 616, the quantization matrix 618, and the two-dimensional inverse DCT unit 620 are the same as the conventional devices shown in FIG. 3. In the 6th and 7th embodiments of this invention, however, a two-dimensional inverse DCT unit 620, an adding means 622 and an image memory 624 as an image data storing means having at least N+1 bits in the depth direction for performing progressive image buildup are provided. When the adding means 622 stores image data restored from split encoded data, it reads image data already stored in the image memory 624, and sums them.

The gradation value of picture elements of an original image is represented in N=8 bits, while image memory 624 has an N+1=9-bit configuration. That is, the memory can store the gradation value from 0 to 384 which is the sum of the gradation values from 0 to 256 of an N=8-bit configuration and the gradation value 128 for a 1-bit extension.

The comparing section 626 adds bit restriction to image data read from the image memory 624 and outputs the result from the terminal 628 to a display, etc. As the image memory 624 has an N+=9-bit configuration (1 bit extension), an overflow having a gradation value of image data exceeding 255 is fixed to 255, and an underflow having a negative gradation value of image data is fixed to 0.

Next, a progressive image buildup operation is described as shown in FIG. 33.

Encoded data D1 (X01, X02, . . . Xn1, n1<64) of the first stage are inputted from terminal 610. The encoded data D1 of the first stage are decoded by the variable length data decoder 612 using the decoding table 614 and provided to the linear dequantizer 610. The linear dequantizer 616 restores a DCT coefficient by multiplying an inputted DCT coefficient by the quantization threshold obtained in the quantization matrix 618 (dequantizing operation). The DCT coefficient restored in the linear dequantizer 616 is provided to the two-dimensional inverse DCT unit 620 and restored into image data.

When header information is provided to the determiner 608 of the first stage, it determines from this information whether or not the present stage is the first stage. If it is, the multiplexer 609 selects the output of the two-dimensional inverse DCT unit 620, and the determiner 608 of the first stage is controlled to store the output in the image memory 624. On the other hand, split image data of the first stage which are restored in the two-dimensional inverse DCT unit 620 are provided to the adding means 622, and added to the image data already stored and read from the image memory 624. In the second stage, the determiner 608 of the first stage is controlled so that the multiplexer 609 may select the output of the adding means 622 and the image memory 624 may store the output. The image memory 624 stores split image data obtained by a cumulative addition, and outputs the data from terminal 628 after adjusting overflow and underflow in the comparing section 626.

Thus, progressive image buildup of one screen is completed by performing the procedure up to the last image data X64 of the last stage.

For 2-stage progressive image buildup where image data are encoded by ADCT as shown in FIG. 34, a DCT coefficient is restored without splitting as shown in FIG. 35, while in a two-stage progressive image buildup, a split DCT coefficient is restored as shown in FIGS. 36 and 37. The splitting operation is not performed for a DCT coefficient, but is obtained by splitting encoded data at terminal 610.

A split DCT coefficient of the first stage as shown in FIG. 36 has the first 3 levels from X01 to X03, while a split DCT coefficient of the second stage as shown in FIG. 37 has the following levels from X04 to X64.

A split DCT coefficient of the first stage, as shown in FIG. 36, is restored to split image data shown in FIG. 38 by an inverse DCT operation and stored in the image memory 624.

Then a split DCT coefficient of the second stage, as shown in FIG. 37, is transformed by inverse DCT, and split image data shown in FIG. 39 are provided to the adding section 622. The adding section 622 sums split image data shown in FIG. 38 and split image data shown in FIG. 39, and outputs the result to image memory 624.

In FIGS. 38 and 39, dotted portions of split image data indicate underflow portions having negative values which extend the image memory 624 by 1 bit to an N+1=9-bit configuration, thereby enabling the image data to be stored. Underflow portions in the image memory 624 before the last split stage are all fixed to the gradation value of 0 and displayed by the comparing section 626.

One of the embodiments shown in FIG. 33 uses the image memory 624 having an N+1=9-bit configuration (1 bit extension), but the other uses image memory 624 having an N+2=10 bit configuration (2 bit extension). In this case the extended 2 bits can be used for underflow or overflow information. Using an extended 1-bit for overflow information yields the gradation value from 0 to 256 of an 8-bit configuration to the value from 0 to 384 increased by 128. Assigning another extended 1-bit to the process of an underflow enables the the gradation value from 0 to −128 to be represented. Thus, a wide range of gradation values from −128 to 384 are stored.

Figure 40:
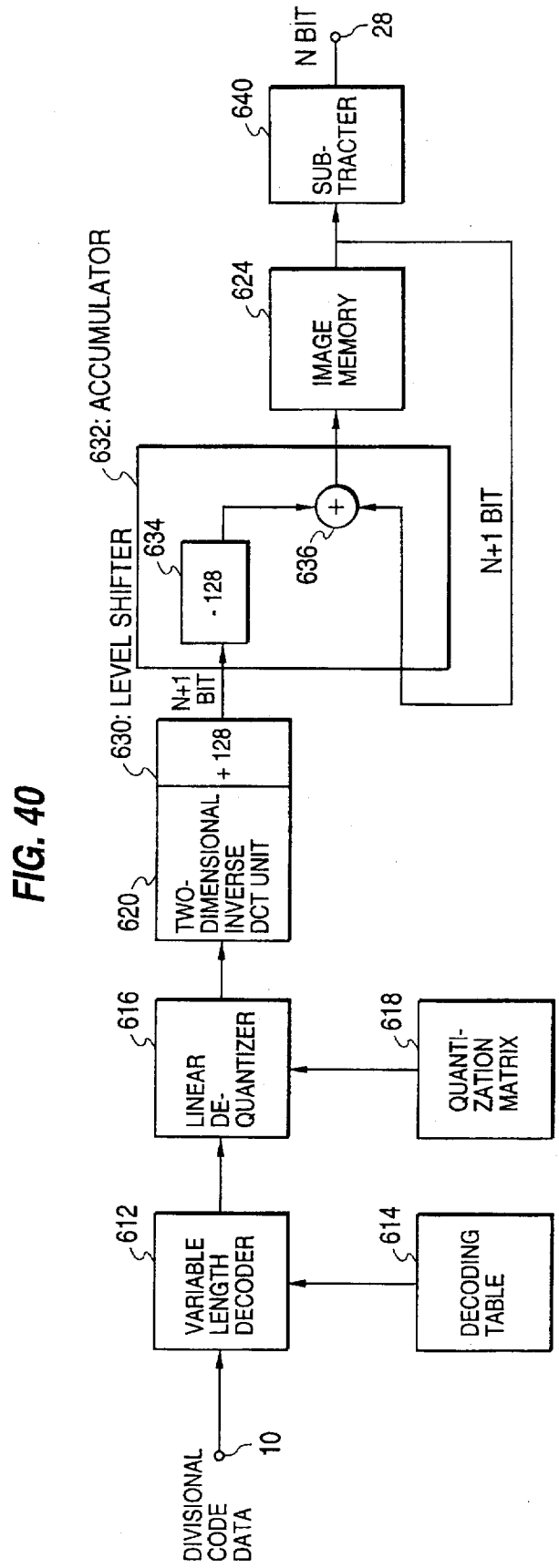
FIG. 40 is a configuration diagram of the seventh embodiment.

FIG. 40 shows the configuration of the 7th embodiment of this invention, where the image memory 624 has an N+1=9-bit configuration with one bit extended, and image data without any underflow are cumulatively added.

The configuration from the variable length decoder 612 to the two-dimensional inverse DCT unit 620 shown in FIG. 40 is the same as that in FIG. 33. Following the two-dimensional inverse DCT unit 620, the level shifting section 630 is provided to prevent overflow by adding 2 N−1=128 to the image data obtained from the two-dimensional inverse DCT unit 620.

Image data level-shifted by level shifting section 630 is provided to the cumulating section 632, and added to the image data already stored in the image memory 624 by the cumulating section 632. The cumulating section 632 comprises a subtracting section 634 and an adding section 636. Image data processed by cumulating in the cumulating section 632 are stored in the image memory 624, which has an N+1=9-bit configuration with a 1-bit extension. Following the image memory 624, the subtracting section 640 is provided for subtracting 2 N−1=128 from the level-shifted amount in the level shifting section 630, thereby outputting an N=8-bit configuration to terminal 28.

Figure 41:
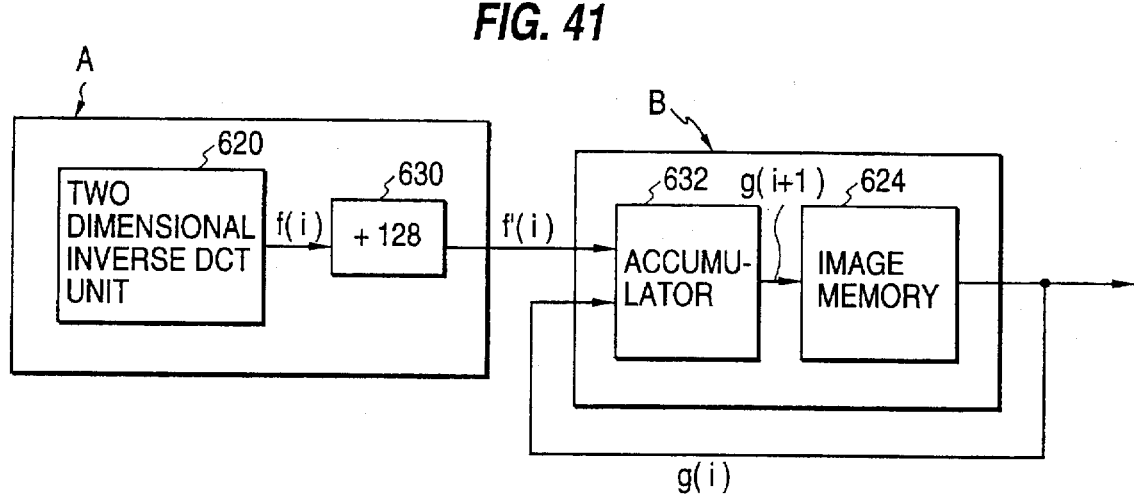
FIG. 41 is a model diagram of FIG. 40.

FIG. 41 is a model view for explaining the principle of operation of the cumulating section 632 where the image memory 624 comprises an N+1=9-bit configuration.

In FIG. 41, block A comprises a two-dimensional inverse DCT unit 620 and a level shifting section 630, and block B comprises a cumulating section 632 and an image memory 624. Image data f(i), f'(i), and g(i) are defined as follows:

f(i): result of the ith inverse DCT $(-128 \leq f(i) < 383)$ f'(i): data transformed to positive $(0 \leq f'(i) < 511)$ g(i): contents of image memory after the ith updating $(0 \leq g(i) < 511)$ The two-dimensional inverse DCT unit 620 has an N+2= 10-bit configuration because it contains overflowing and underflowing data, while all other sections have an N+1=9-bit configuration.

If the two-dimensional inverse DCT unit 620 yields image data f(i) at the i-th stage, level shifting section 630 adjusts the underflowing data by level shifting, and level shifting section 30 outputs the following image data:

$$f'(i)=f(i)+128 \quad (9)$$

Figure 42:
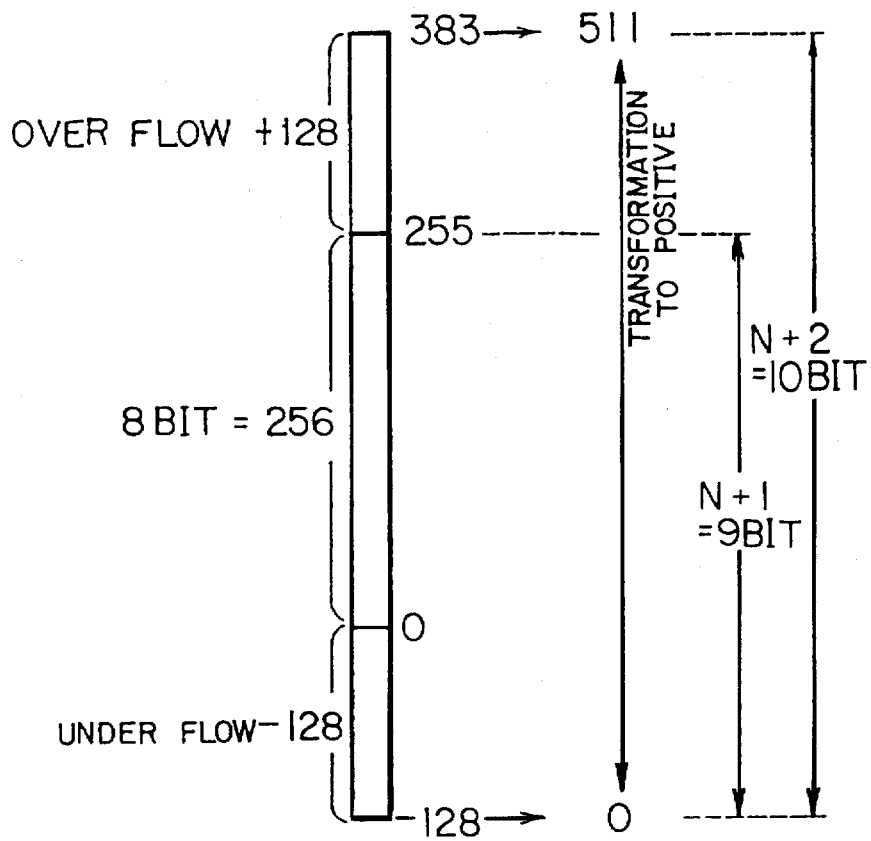
FIG. 42 is an explanatory diagram of the gradation level of the big configuration of the seventh embodiment.

The level shifting is shown in FIG. 42.

As shown in FIG. 42 an N=8-bit configuration has the gradation value from 0 to 255, and the two-dimensional inverse DCT unit 620 outputs 10-bit image data including 1 bit each for underflowing and overflowing. The gradation value can be transformed to be positive within the range from 0 to 511 as shown in the right part of FIG. 42 by adding 2 N−1=128 with the level shifting section 630 to the above value which includes additional bits for overflowing and underflowing. As the level shifting section 630 outputs data of an N+1=9-bit configuration, the gradation value can be transformed to be positive within the range from 0 to 511.

Data g(0) which are read from the image memory 624 at the ith=0 stage show the following equation:

$$g(0)=0$$

If the two-dimensional inverse DCT unit 620 outputs image data f(i)=f(1) at the ith=1st stage at the above initial state, the data is transformed to f'(i)=f'(1) by the level shifting section 630 and provided to the accumulating section 632. At the same time, as the image data g(i)=g(0) are read from the image memory 632, the output g(i+1)=g(1) from the accumulating section 632 is represented as follows:

$$g(1)=g(0)+f'(1)=g(0)+f(1)+128=f(1)+128 \quad (10)$$

Similarly, the image data g(i+1) outputted from the accumulating section at the ith stage are represented as follows:

$$g(i+1)=g(i)+f'(i+1)+128 \quad (11)$$

where:

$$f'(i+1)=f(i+1)+128$$

$$f(i+1)=f'(i+1)-128 \quad (12)$$

Substituting f(i+1) of (12) in the preceding equation (11), the image data g(i+1) outputted from the accumulating section 632 are obtained as follows:

$$g(i+1)=g(i)+f(i+1)-128 \quad (13)$$

Figure 43A:
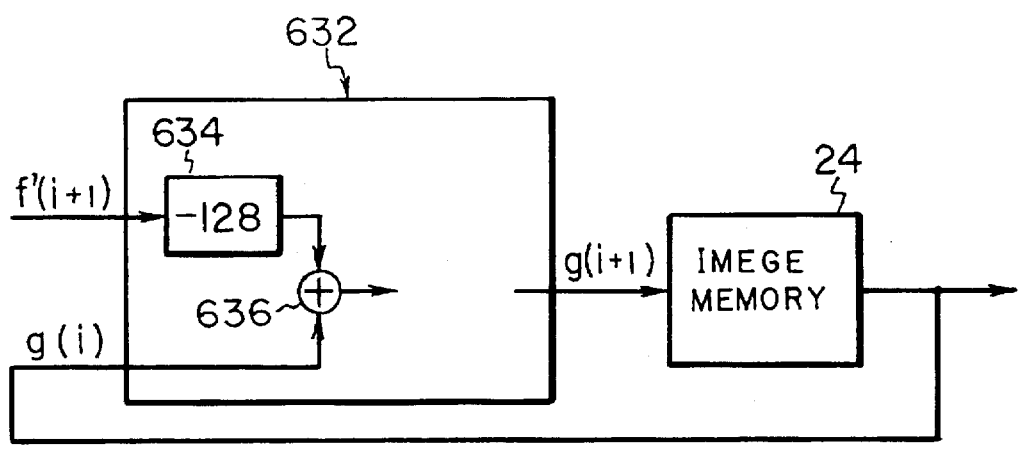
FIGS. 43A, 43B, and 43C are configuration diagrams of an embodiment of accumulation based on FIG. 41.
Figure 43B:
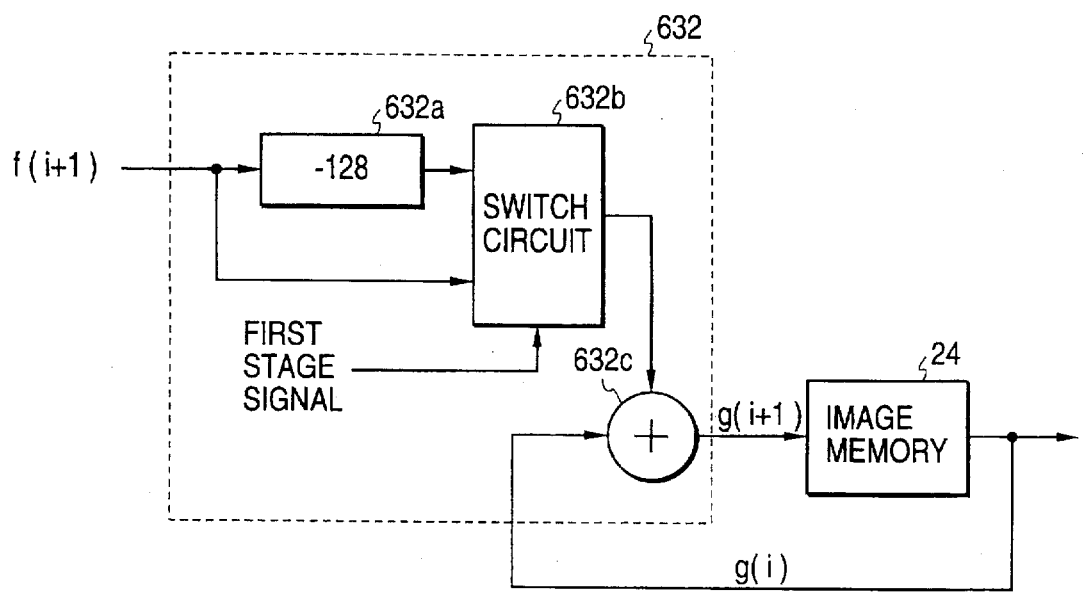
Figure 43C:
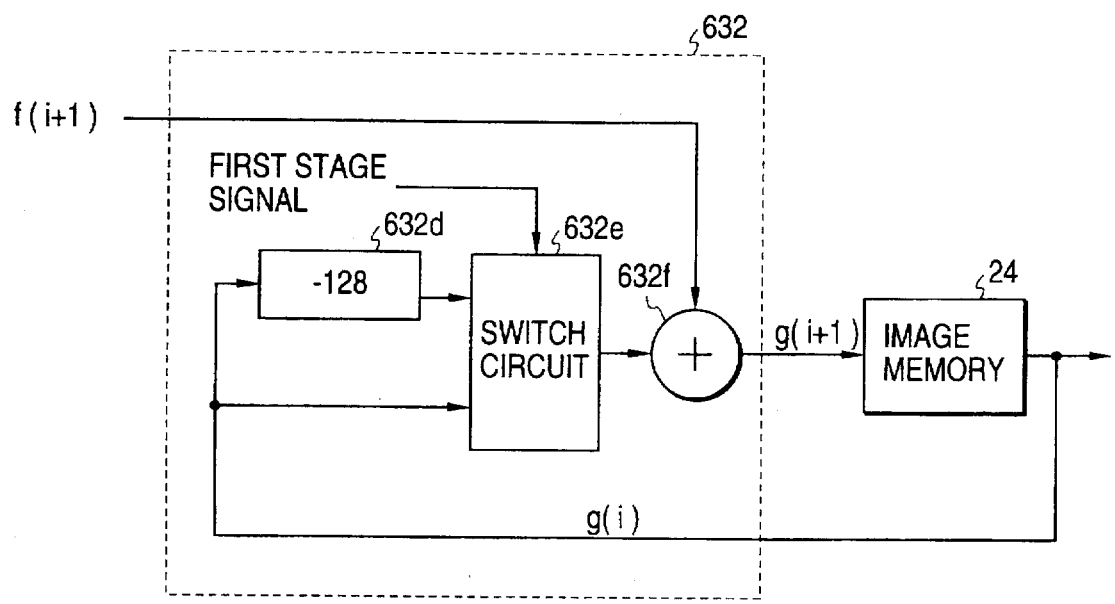

Equation (13) indicates the result of the accumulating operation of the accumulating section 632 at any stage. Accordingly, the accumulating section 632 comprises the subtracting section 634 and adding section 636. When the adding operation is performed separately for the first stage and second stage, the accumulating section 632 is configured as shown in FIGS. 43B and 43C. In FIG. 43B, a switch circuit 632b selects image data f(i+1) and outputs the result to an adding section 632c when it receives a signal of the first stage. As the image memory 24 is cleared at the initializing process prior to the first stage, the adding section 632c outputs the image data f(i+1) to the image memory 24. At the second stage, the switch circuit 632b selects the output of a subtracting section 632a and outputs the result to the adding section 632c. The adding section 632c adds the value stored in the image memory 24 at the first stage to the selected image data, and then stores the result in the image memory 24.

In FIG. 43C, a switch circuit 632e selects the output of the image memory 24 when it receives a signal of the first stage, and outputs it to an adding section 632f. As the image memory 24 is cleared at the initializing process as described above, the adding section 632f outputs the image data f(i+1) to the image memory 24. At the second stage, the switch circuit 632e selects the output of the subtracting section 632d and outputs it to the adding section 632f. The adding section 632f adds the value obtained by subtracting 128 from the image data stored in the image memory 24 at the first stage to the image data inputted at the second stage, and then stores the result in the image memory 24.

The image data stored in the image memory 24 at the first and second stages are consequently identical.

In FIG. 40, when original image data have an N=8 (gradation value of 256) bit configuration, the level shifting section 630 adds 2 N−1=128 to the split image data which are processed by the inverse DCT operation by the two-dimensional inverse DCT unit 620. According to this level shifting operation, original image data are transformed to be positive, eliminating overflowing data as shown in FIG. 42.

FIGS. 44 and 45 show split image data where split image data shown in FIGS. 38 and 39 are added to the gradation value 128 by the level shifting section 630. The addition of the gradation value 128 eliminates all underflowing data indicated by the dotted portion in FIGS. 38 and 39, while only overflowing data indicated by the dotted portion of the higher level part in FIG. 44 remain.

Thus, the split image data with underflowing data eliminated as shown in FIG. 44 are stored in the image memory 624 in the first stage, and in the second stage are added to the split image data shown in FIG. 45 by the accumulating operation by the accumulating section 632, and are then stored in the image memory.

Image data read from the image memory 624 are outputted from the terminal 28 after the subtraction 2 N−1=128 by the subtracting section 640 to return to an 8-bit data configuration.

Figure 46:
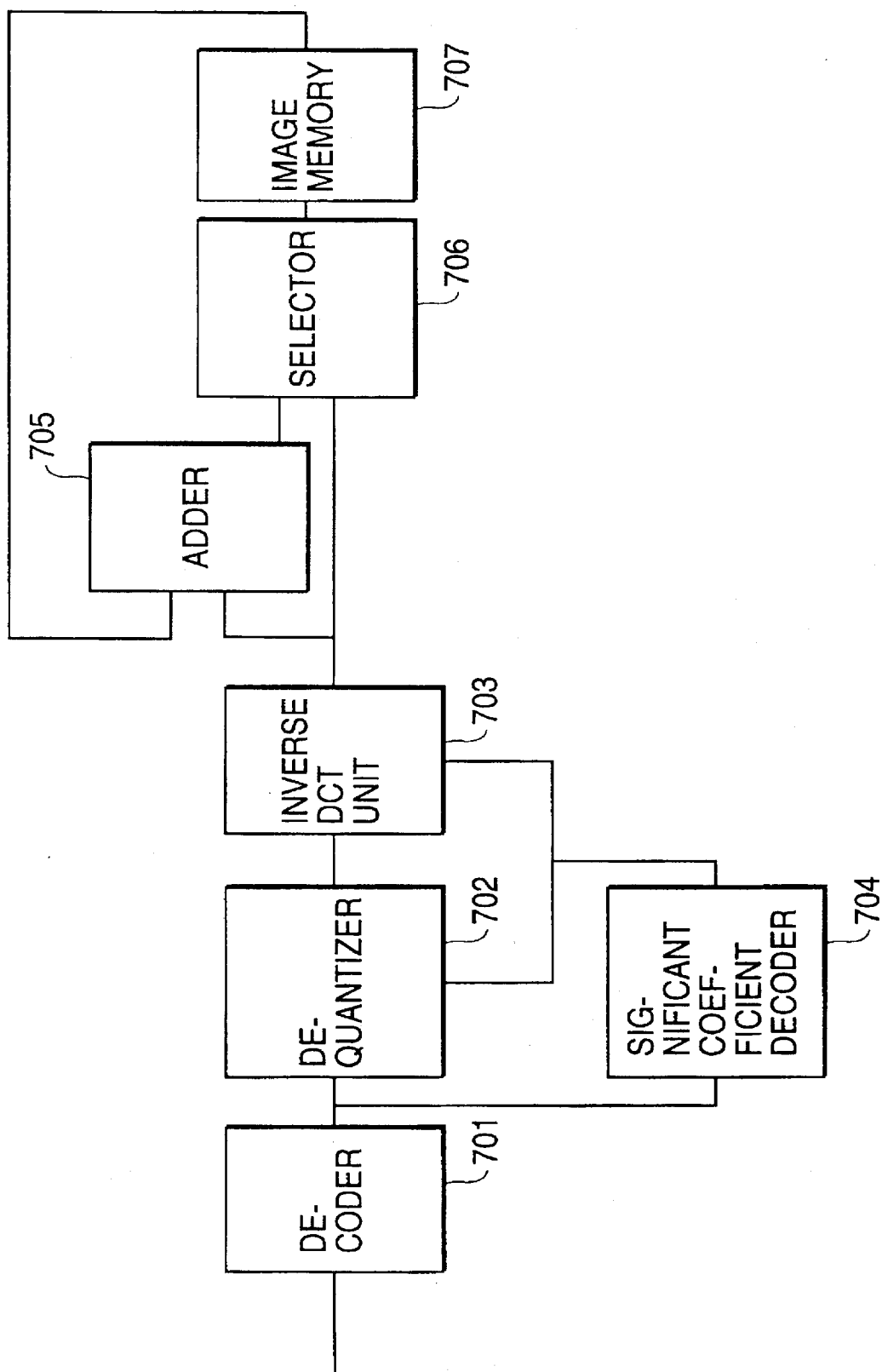
FIG. 46 is a block diagram of the principle of the eighth embodiment.

FIG. 46 is a block diagram illustrating the principle of the 8th embodiment of this invention.

In this embodiment, an original image is split into blocks comprising a plurality of N*N images. Then a transformation coefficient obtained from a two-dimensional discrete cosine transformation on the gradation value of a plurality of N*N images in each block is quantized. Thus, the original image is restored through data obtained by encoding the resultant quantized coefficient.

A decoding means 701 decodes encoded data.

A dequantizing means 702 provides a DCT coefficient by dequantizing the quantized coefficient decoded by the decoding means 701.

An inverse DCT means 703 performs inverse DCT operation on the DCT coefficient dequantized by the dequantizing means 702.

When no significant coefficient exists in the quantized coefficient in a block decoded by decoding means 701, a significant coefficient detecting means 704 controls the output of restored image data for the dequantization performed by the dequantizing means 702 and the inverse DCT performed by the inverse DCT means 703.

An image memory 707 stores image data.

An adding means 705 adds the output of the image memory 707 and the output of the inverse DCT means 703. The adding operation is not performed in the first stage, but is started in the second stage.

A selecting means 706 obtains the output of the adding means 705 and the inverse DCT means 703, selects the output of the inverse DCT means 703 in the first stage, selects the output of the adding means 705 started in the second stage, and provides the image memory 707 with these outputs.

Encoded data are decoded by the decoding means 701, thereby providing a quantized coefficient. When no significant coefficient exists in the decoded quantized coefficient in a block, 0 is outputted as restored data. When a significant coefficient exists, the dequantizing means 702 and the inverse DCT means 703 are operated to restore the original image.

Further, in the first stage the restored image data is selected by the selecting means 706 and stored in the image memory 707. In the following stages, image data stored in the image memory 707 and image data restored by inverse DCT means 703 are summed, the output is selected by the selecting means 706, and the resultant data are stored in the image memory 707.

When no significant coefficient exists in a quantized coefficient in a block, proceed to the next block address without performing an addition or any other operation, thereby eliminating operations such as additions of dequantization and inverse DCT.

Figure 47A:
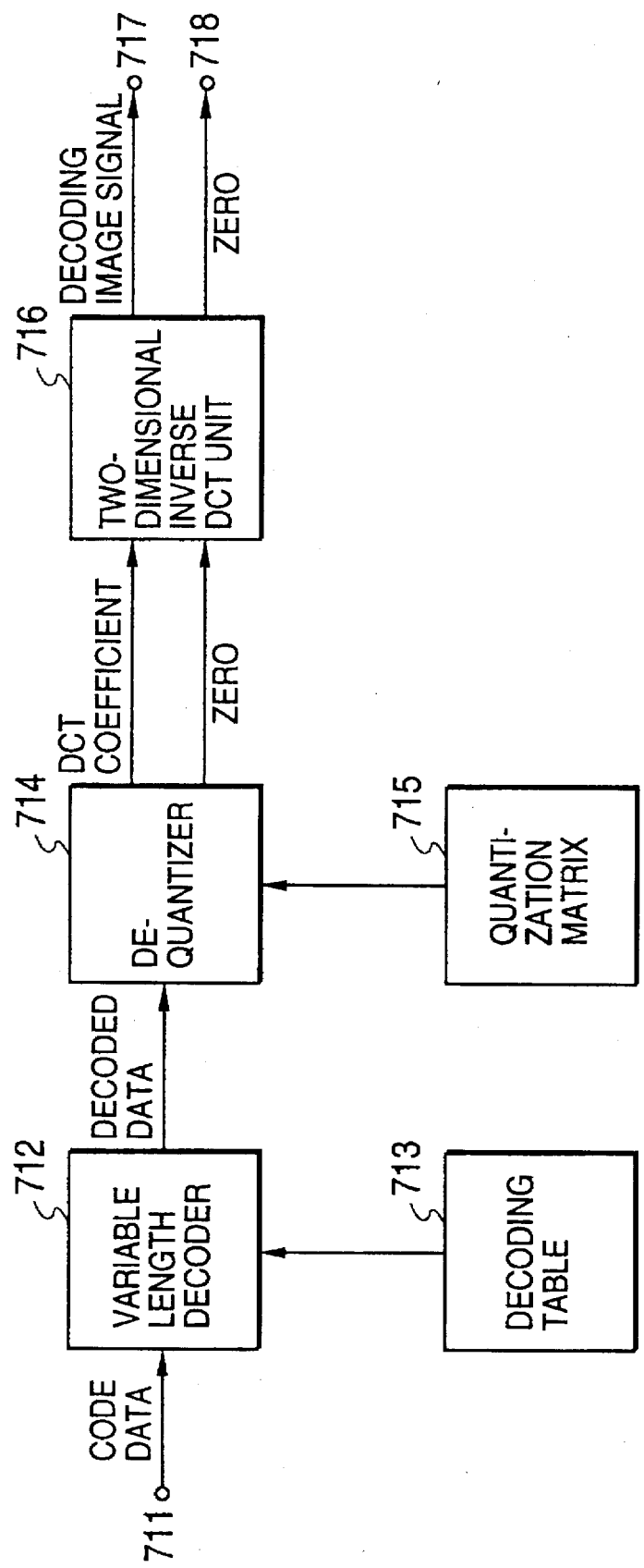
FIG. 47A is a configuration diagram of the eighth embodiment.

FIG. 47A shows the configuration of the eighth principle of this invention.

Code data inputted from a terminal 711 is entered in a variable-length data decoder 712. The variable-length data decoder 712 decodes the inputted code data into fixed-length data comprising an index and run data according to a decoding table 713 comprising a Huffman table and an inverse-table, and then outputs the result to dequantizer 714. The dequantizer 714 determines the number of significant coefficients in a block, and outputs an insignificant block signal zero to a two-dimensional inverse DCT unit 716 if none significant exists. If one or more significant coefficients exist in a block, the dequantizer 714 restores a DCT coefficient by multiplying the inputted quantized coefficients by corresponding values provided by a quantization matrix 715, and outputs the result to the two-dimensional inverse DCT unit 716. If an insignificant block signal zero is entered, the two-dimensional inverse DCT unit 716 outputs an insignificant block signal zero to terminal 718 without performing two-dimensional inverse DCT. Unless an insignificant block signal zero is entered, inputted DCT coefficients are orthogonally transformed by the inverse DCT means 703, a coefficient of the space frequency distribution is transformed by an image signal, and the result is outputted to terminal 717.

The procedure described above is repeated to complete image restoring operations for one screen.

Figure 47B:
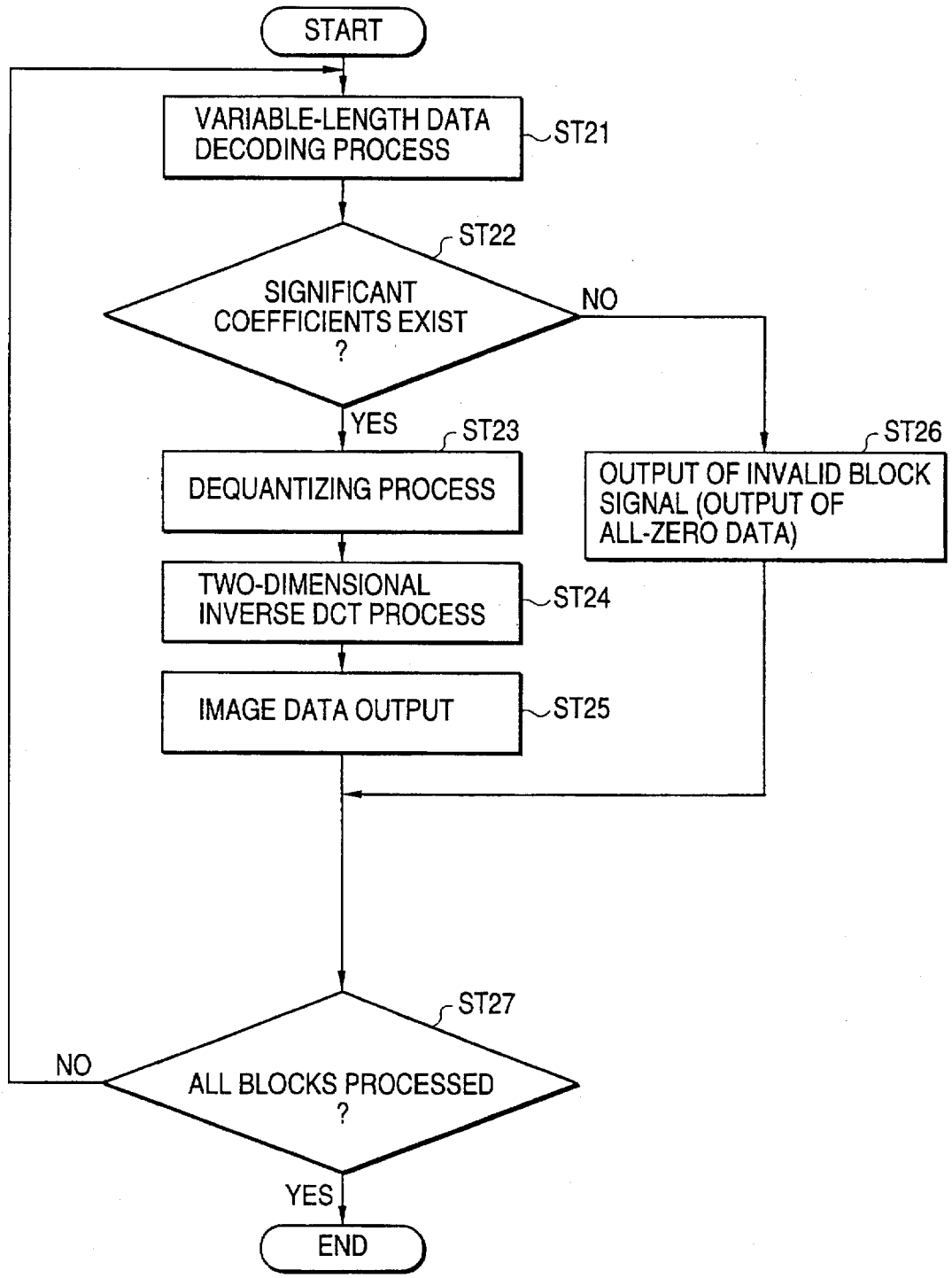
FIG. 47B is an operational flowchart of the eighth embodiment.

FIG. 47B is an operational flowchart of the 8th embodiment of this invention. The operation is started by entering decoded data. Decoded data, including quantized coefficients, is provided by executing variable length data decoding process ST21. Then determination ST22 is made to determine the presence or absence of a significant coefficient. If determination ST22 indicates that a significant coefficient exists (YES), dequantizing process ST23 dequantizes a quantized coefficient to obtain a DCT coefficient. The DCT coefficient is then processed by two-dimensional inverse DCT ST24 to output a restoration signal ST25.

If determination ST22 indicates that a significant coefficient does not exist (NO), an insignificant block signal zero is outputted (ST26). That is, all-zero data are outputted. After processes ST25 and ST26 have been executed, determination ST27 is made to determine whether all blocks have been checked. If all blocks not been checked (NO), the procedure is repeated, starting with variable length data decoding process ST21. If all blocks have been checked (YES), the procedure is terminated.

As described above, as all-zero data are outputted when no significant coefficient exists. Thus, dequantizing process ST23 and two-dimensional inverse DCT process ST24 are not required, so higher speed performance is realized.

Figure 48:
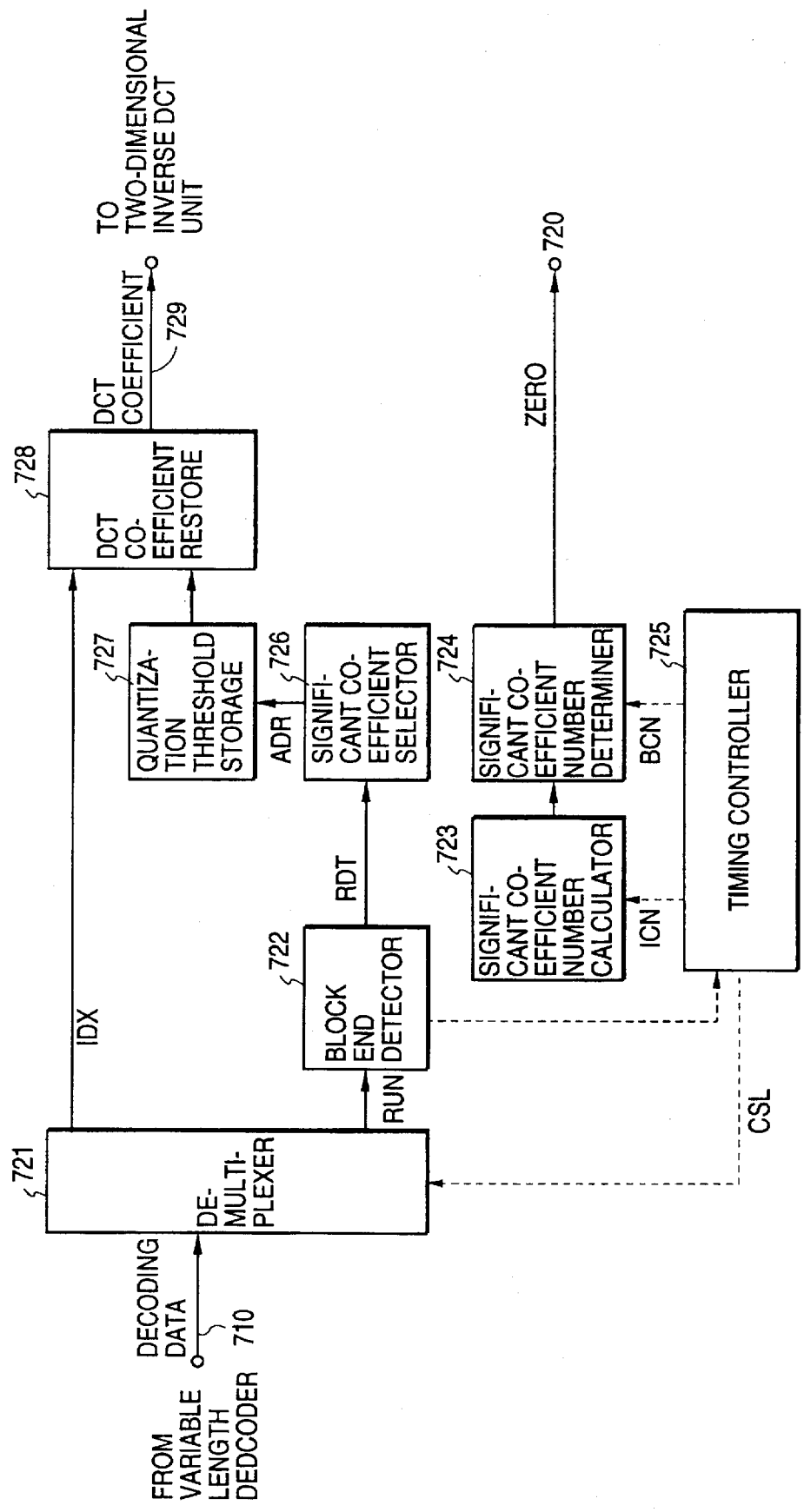
FIG. 48 is a block diagram of an insignificant block signal generating circuit of the eighth embodiment.

FIG. 48 is a block diagram of a circuit for generating an insignificant block signal in the dequantizer 714 of an embodiment of this invention. FIG. 49 illustrates rows of decoded data.

Hereinafter, a method of calculating the number of significant coefficients contained in a block is described according to a block diagram of a circuit for generating an insignificant block signal of this invention, as shown in FIG. 48.

Decoded data comprising an index and run data decoded from encoded data by the variable length data decoder 712 are inputted from terminal 710 to the demultiplexer 721. The demultiplexer 721 selects an index and run data alternately from decoded input data according to a selection signal (CSL) provided from the timing controller 725, and then inputs an index (IDX) to the DCT coefficient restoring section 728 and run data (RUN) to the end-of-block detecting section 722.

In the case of a DC-component-only block (as shown in FIG. 49(A)), decoded data (DI) of the first DC component are selected by the demultiplexer 721 and outputted to the DCT coefficient restoring section 728. Then the number of significant coefficients of value 1 in a target block is counted by the significant coefficient calculator 723 according to a count signal (ICN) provided from the timing controller 725. The significant coefficient selecting section 726 stores addresses (ADR=0) of decoded data (D1). Then the demultiplexer 721 selects run data ($R_{eob}$) and outputs the data to the end-of-block detecting section 722. The end-of-block detecting section 722 recognizes that, as the value of the inputted run data (RUN) "($R_{eob}$)", the remaining coefficients of picture elements in the block are all insignificant coefficients, determines that the end of coefficients in the block is reached, and outputs to the timing controller 725 a signal (BEN) indicating the end of coefficients in the block. Then the timing controller 725 instructs (BCN) the significant coefficient determiner 724 to determine the number of significant coefficients in the block. As the number of significant coefficients in the block is "1", the significant coefficient determiner 724 determines the presence of a significant coefficient in the target block, and outputs an insignificant block signal zero as "0" from terminal 720.

The DCT coefficient restoring section 728 multiplies decoded data stored therein by a quantization threshold stored in the address (ADR=0) of DC components in the quantization threshold storage 727, and outputs the result from terminal 729. Then the two-dimensional inverse DCT unit 716 transforms the output to image signals, thereby restoring all picture elements in a block into image signals.

In the case of a block where coefficients of DC components and AC components are mixed (as shown in FIG. 49(C)), the demultiplexer 721 selects decoded data (D2) of the first DC component and outputs them to the DCT coefficient restoring section 728. Then the significant coefficient calculator 723 counts the number of significant coefficients in a target block as "1" according to a count signal (ICN) provided by the timing controller 725. The significant coefficient selecting section 726 stores addresses (ADR=0) of decoded data (D2). Then the demultiplexer 721 selects run data (R0) and outputs them to the end-of-block detecting section 722. As the value of inputted run data (RUN) is R0, the end-of-block detecting section 722 determines that the end of the coefficients in the block has not been reached. Significant coefficient selecting section 726 calculates and stores an address (ADR) of the next significant coefficient according to a value of inputted run data (RUN). On the other hand, as the demultiplexer 721 selects an index (I1) this time, an inputted index (I1) is stored in the DCT coefficient restoring section 728. Then the number of significant coefficients in a target block of "+1" is added to the significant coefficient calculator 723 according to a count signal (ICN) provided by the timing controller 725, thereby producing a total of "2". Next, the demultiplexer 721 selects run data (R0) and outputs them to the end-of-block detecting section 722. As the value of inputted run data (RUN) is R0, the end-of-block detecting section 722 determines that the end of significant coefficients in the block has not been reached. Then the significant coefficient selecting section 726 calculates and stores an address (ADR) of the next significant coefficient according to the value of inputted run data (RUN).

The demultiplexer 721 selects an index (I2) this time, and the inputted index (I2) is stored in the DCT coefficient restoring section 728. According to a count signal (ICN) provided by the timing controller 725, the number "+1" of the significant coefficient in a target block is added to the significant coefficient calculator 723, thereby producing a total of "3". Then the demultiplexer 721 selects run data ($R_{eob}$) and outputs them to the end-of-block detecting section 722. As the inputted signal indicates run data ($R_{eob}$), the end-of-block detecting section 722 determines that the remaining coefficients of picture elements in the block are all insignificant coefficients and the end of the coefficients in the block has been reached, and then outputs to the timing controller 725 a signal (BEN) indicating that the end of the significant coefficients in the block has been reached. The timing controller 725 instructs (BCN) the significant coefficient determiner 724 to determine the number of significant coefficients in the block. As this number is 3, the significant coefficient determiner 724 determines the presence of significant coefficients, and outputs an insignificant block signal zero as "0" from terminal 720. The DCT coefficient restoring section 728 multiplies decoded data (D1, I1, I2) stored therein by the quantization threshold stored in the corresponding address (ADR) of the quantization threshold storage unit 727, and outputs the result from terminal 729. The two-dimensional inverse DCT unit 716 transforms the result into image signals, thereby restoring all picture elements in a block into image signals.

Following the second stage of the progressive image buildup, the demultiplexer 721 first selects run data. If no significant coefficient exists (as shown in FIG. 49(B)), the selected run datum ($R_{eob}$) is outputted to the end-of-block detecting section 722. As the value of the inputted run data (RUN) is $R_{eob}$, the end-of-block detecting section 722 determines that the remaining coefficients of picture elements in the block are all insignificant coefficients and the end of significant coefficients in the block is reached. It then outputs to the timing controller 725 a signal (BEN) indicating the end of significant coefficients in the block. The timing controller 725 instructs (BCN) the significant coefficient determiner 724 to determine the number of significant coefficients in the block. The significant coefficient determiner 724 determines that the number of significant coefficients in the block is 0, that is, no significant coefficient exists in the target block, and outputs an insignificant block signal zero as "1" from terminal 720, thereby terminating all processes in the block.

Figure 50:
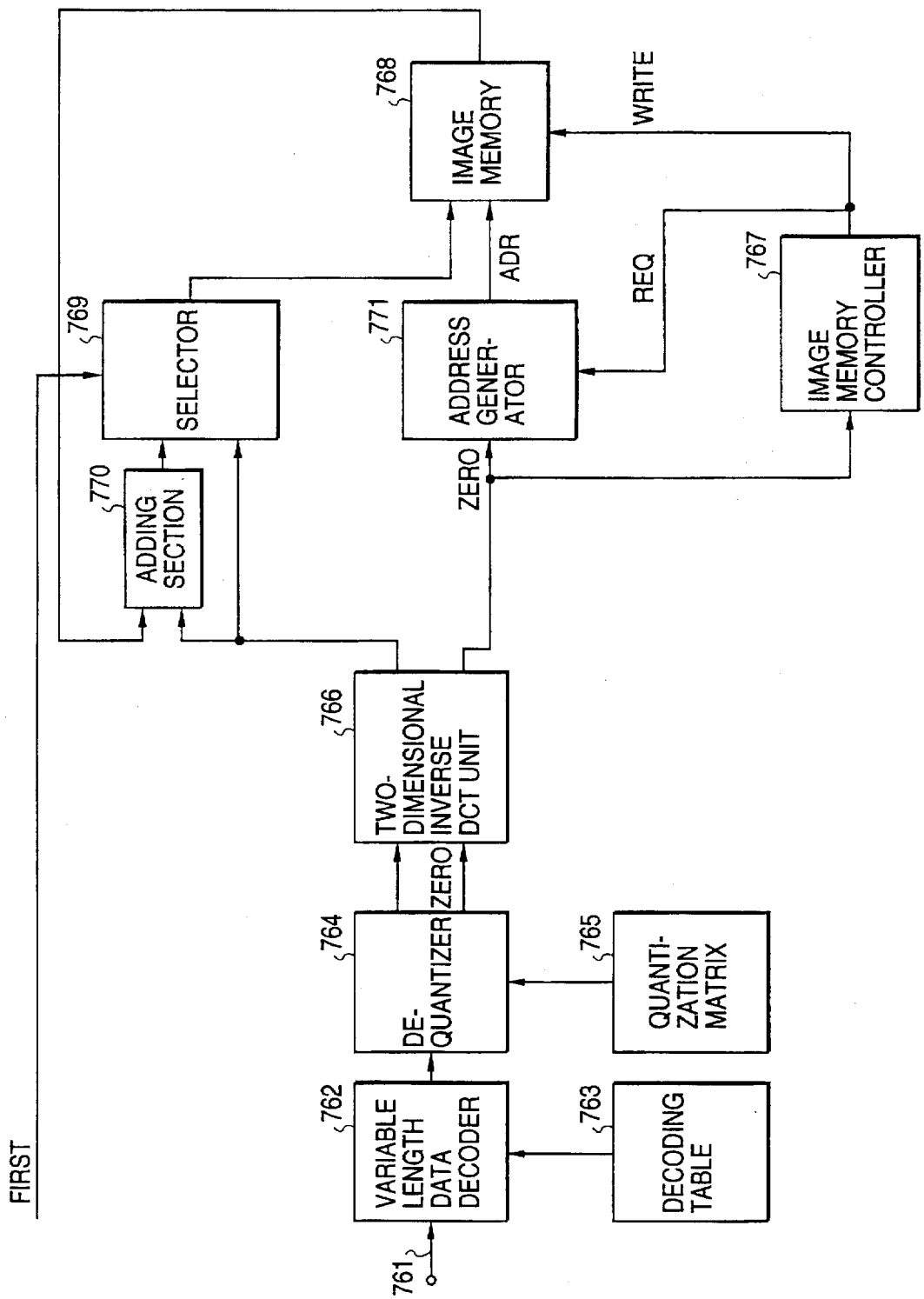
FIG. 50 is a general block diagram of an embodiment.

FIG. 50 is a block diagram showing image updating of the second embodiment of the 8th embodiment of this invention. Encoded data D1 (X01 from a terminal 761 are decoded by a variable-length-data decoder 762 according to a decoding table 763, and inputted to a dequantizer 764. As DC components are included at the first stage, an insignificant block signal indicates "0", and the dequantizer 764 performs an orthogonally dequantizing operation using a quantization matrix 765. After the dequantizing operation, the DCT coefficient is outputted to a two-dimensional inverse DCT unit 766, which restores it to image data. A signal FIRST indicating the first stage instructs selector 769 to select the restored split image data. According to a writing signal WRITE outputted by an image memory controller 767, an image memory 768 stores the output of the two-dimensional inverse DCT unit 766 which is selected by the selector 769. A storage address is given as an address MADR which is outputted from an address generator 771. The first stage of the image restoring operation for one screen is completed by repeating the above procedure for all blocks.

Figure 51:
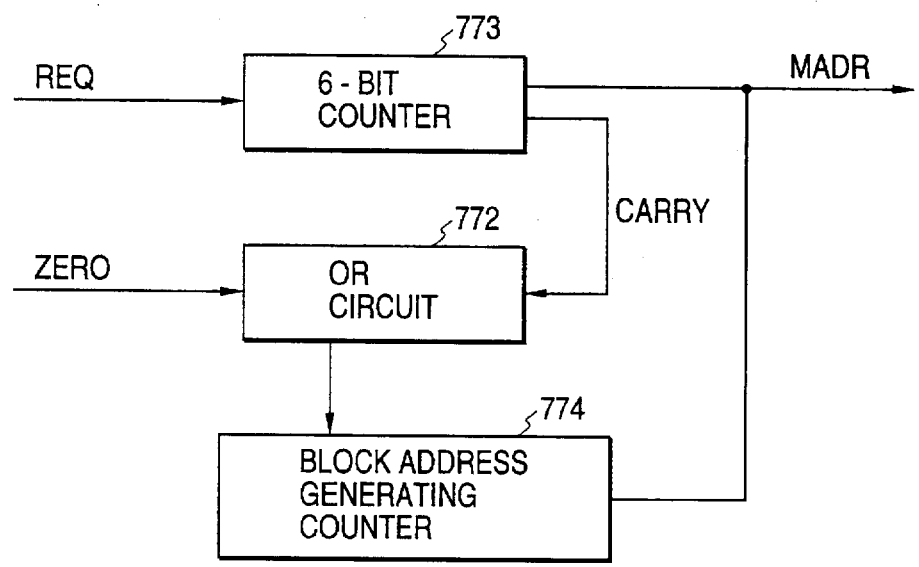
FIG. 51 is a block diagram of an address generating circuit.

Next, code data D2 (Xn1+1 ... Xn2:n1<n2<64) of the second stage are decoded to image data by the procedure described above. Where no significant coefficient exists as shown in FIG. 49(B), however, an insignificant block signal ZERO is outputted as "1" as described above. In this case, the image memory controller 767 does not have access to an image memory, but terminates the operation on the present block after increasing the value of a block address generating counter 774 by one through an OR circuit 772 as shown in FIG. 51. If one or more significant coefficients exist in a block, normally restored image data are added by an adding section 770 to image data of the preceding stage. The selector 769 selects the result of the addition, writes the result in the image memory 768 according to a write signal WRITE provided by the image memory controller 767, increases by one the value of a 6-bit counter 773 which generates addresses in a block according to request address update signal REQ, and updates write address MADR for writing in image memory. After all picture elements in a block have been updated, a carry signal CARRY is outputted by the 6-bit counter 773, the value of the block address generating counter 774 is increased by one through the OR circuit 772, and the process of the present block terminates. The second stage of the image restoring operation for one screen is completed by repeating the above procedure for all blocks.

Progressive restoring of one screen is completed by performing the same procedure as the second stage up to the process of encoded data Di (Xni+1 ... X64:ni<64) of the ith stage.

Figure 52:
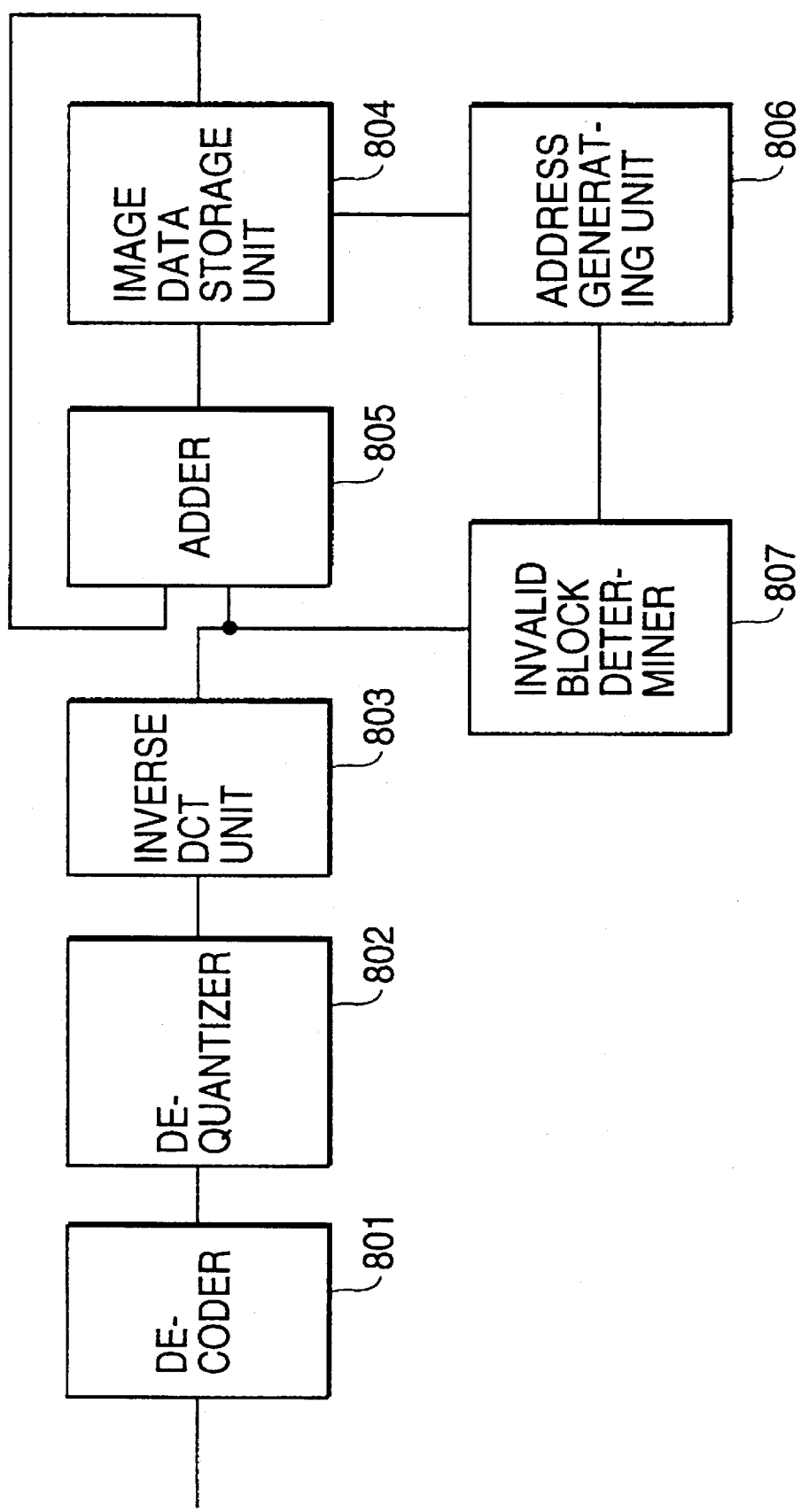
FIG. 52 is a block diagram of the ninth embodiment.

FIG. 52 is a block diagram of the 9th embodiment of this invention. In this embodiment, an original image is split into blocks comprising a plurality of N*N picture elements. Then a transformation coefficient obtained by performing two-dimensional discrete cosine transformation on the gradation value of a plurality of N*N picture elements of each block, is quantized. Thus, restoring the original image from encoded data of the resultant quantized coefficient is restored.

A decoding means 801 decodes the encoded input data into a quantized coefficient. The decoding operation is performed using a decoding table.

A dequantizing means 802 dequantizes a quantized coefficient which is decoded by the decoding means 801. The dequantization is performed using a dequantization matrix.

An inverse DCT unit 803 performs inverse DCT on a DCT coefficient.

An image data storage unit 804 stores data such as image data.

An adding means 805 selects and outputs data provided by the inverse DCT unit 803 in the first stage, and in the second stage sums and outputs image data stored in the image data storage unit 804 and image data obtained by inverse DCT in the inverse DCT unit 803.

An address generating means 806 generates an address for storing the image data obtained in the adding means 805 in the image data storage unit 804.

When all image data in the block which are processed by DCT are determined as 0, an insignificant block determiner 807 replaces an address generated by the generating means 806 with the next block address without storing the output provided by the adding section 805 in the image data storage unit 804. For example, if a counter is provided for counting the number of zero-value image data in a block and the counter indicates 0 as the number of data inputted during the conter is counting operation, the block address is replaced with the next block address.

When code data are entered, the decoding means 801 decodes encoded data using a decoding table, thereby obtaining a quantized coefficient. The quantized coefficient is dequantized by the dequantizer 802 using a dequantization matrix, thereby providing a DCT coefficient. The inverse DCT unit 803 performs inverse DCT on the DCT coefficient and provides image data. In the first stage, the image data are stored in the address which the address generating means 806 notifies to the image data storage unit 804. In the second stage, image data stored in the image data storage unit 804 and image data processed by the inverse DCT operation in the inverse DCT unit 803 are summed and stored. The insignificant block determiner 807 determines whether or not the outputs of the inverse DCT unit 803 or image data are all zero, and if they are, proceeds to the next block address without operating adding means 805.

The above description is summarized as follows:

Encoded input data is decoded into a quantized coefficient and the quantized coefficient is dequantized into a DCT coefficient.

If one or more image data in a block, which are obtained by inverse DCT of the DCT coefficient, are other than 0, the stored data are added to the image data in the block and the result is stored in the storage.

If all image data in the block, which are obtained by inverse DCT of the DCT coefficient, are zero, the stored image data remain unchanged and image data of the next block are decoded.

Figure 53:
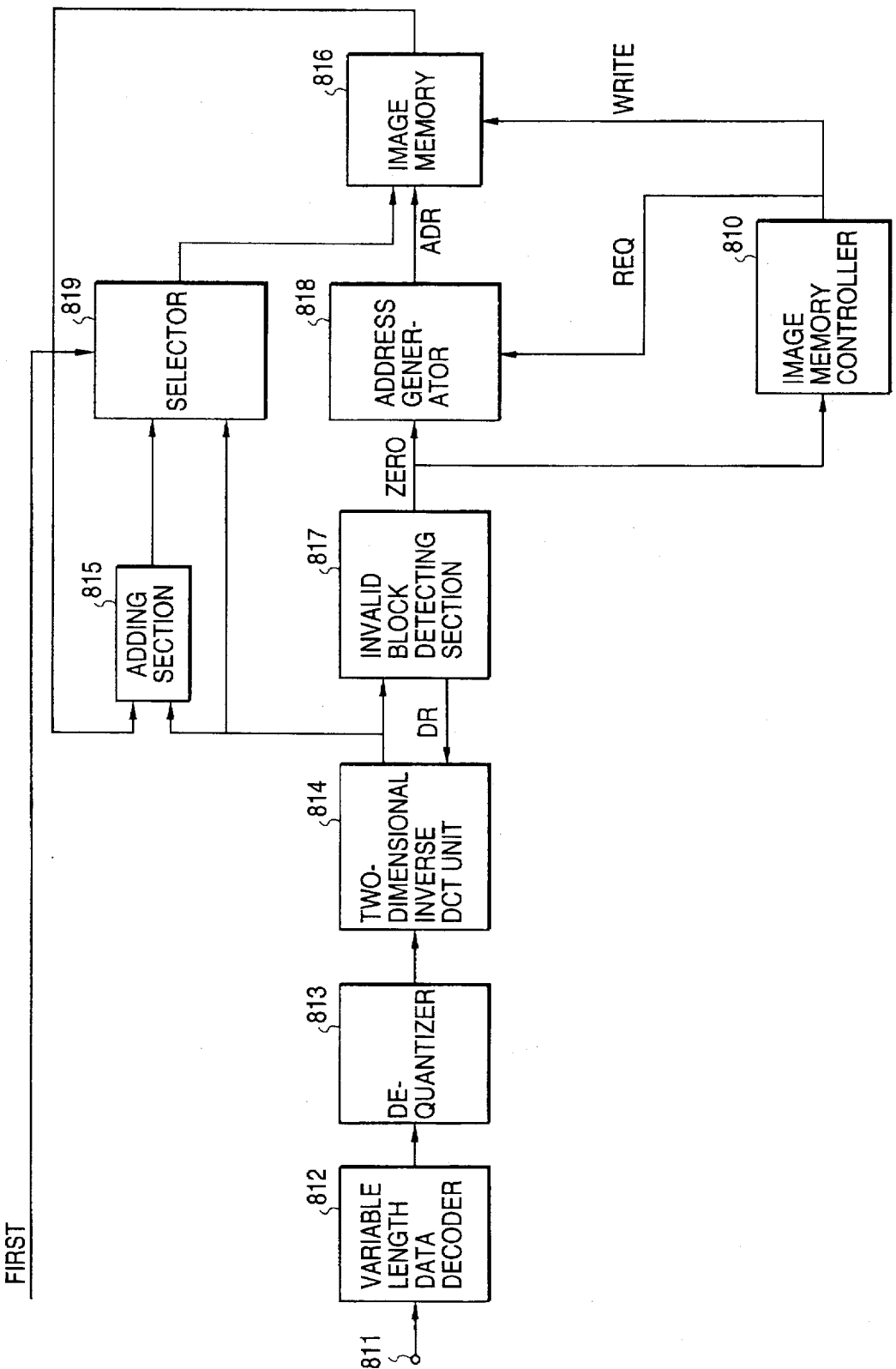
FIG. 53 is a general block diagram of the ninth embodiment.

FIG. 53 is a general block diagram of ADCT restoration. Encoded data D1 (X01 ... Xn1:n1<64) of the first stage, which are split by terminal 811, are decoded in the variable length data decoder 812, and dequantized in the dequantizer 813. Both the decoding operation in the variable length data decoder 812 and the dequantizing operation in the dequantizer 813 are performed in the conventional manner. A DCT coefficient dequantized in the dequantizer 813 is provided to the two-dimensional inverse DCT unit 814, processed by an inverse DCT operation, and restored to image data. When the first restored image data are stored in the image memory 816 at the first stage, split image data restored by selector 819 are selected according to a signal FIRST indicating the first stage, and written into the image memory 816 according to a write signal WRITE provided by the image memory controller 810. The first stage of image restoring operation for one screen is completed by repeating the above procedure for all blocks.

Next, encoded data D2(Xn1+1 ... Xn2:n1<n2<64) of the second stage are restored to image data in the procedure described above. Restored split image data are provided to the insignificant block detecting section 817.

Figure 54:
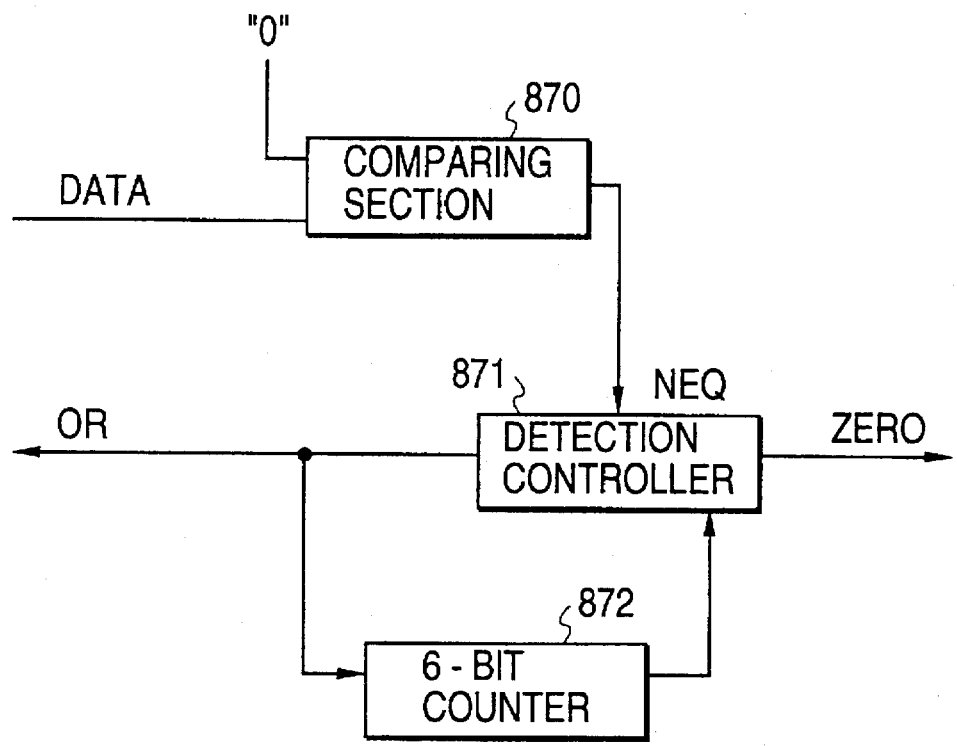
FIG. 54 is a block diagram of an insignificant block detecting section.

FIG. 54 is a block diagram of the insignificant block detecting section 817. 64 picture-elements in a block generated by a 6-bit counter 872 are read from the two-dimensional DCT unit 814 according to a read signal DR. Image data (DATA) outputted from the two-dimensional inverse DCT unit 814 are checked by a comparing section 870 to determine whether or not they are assigned "0". The comparing section 870 is provided with "0" in addition to the above mentioned image data DATA as basic input data, and a check is made to detect whether or not "0" and image data (DATA) are equivalent. If they are not, the comparing section 870 outputs a non-zero signal NEQ. A detection controller 871 obtains the status of one block and outputs a detection signal ZERO to the address generator 818 and the image memory controller 810 if one block comprising 64 picture-elements totally indicates zero. When zero is detected, the image memory controller 810 proceeds to the next block address without accessing the image memory 816.

Figure 55:
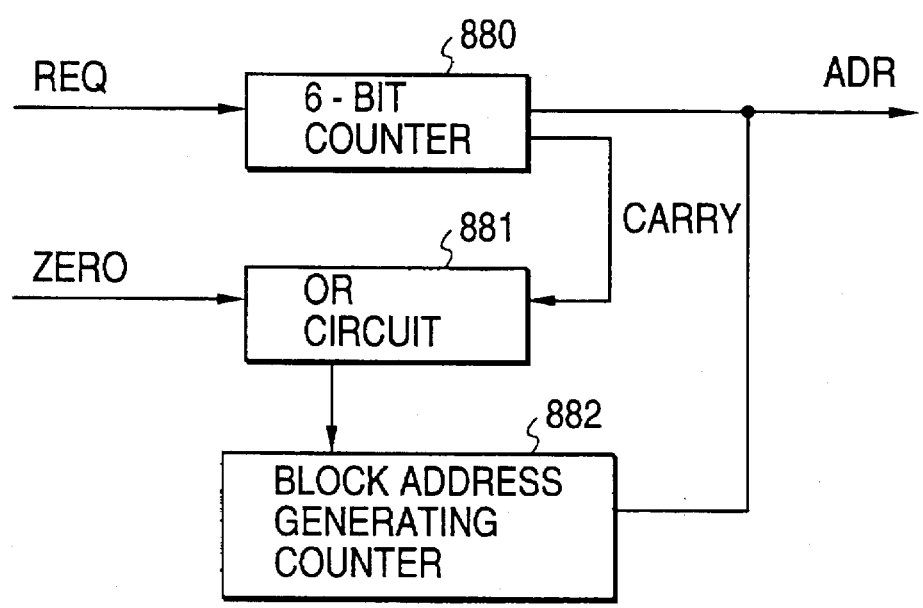
FIG. 55 is a block diagram of an address generating circuit.

FIG. 55 is a block diagram of the address generating circuit 818. When a detection signal ZERO is issued to a block address generation counter 882 through an OR circuit 881, the value of the block address generation counter 882 is increased by one address, and the process of the present block is terminated.

When a detection signal ZERO is not issued, restored split image data are added to the preceding image data by an adding section 815, and the result is selected by a selector 819.

The address generating circuit 818 generates an address where the image memory 816 is accessed and the address is provided to the image memory 816 wherein the access is made by the 6-bit counter 880 and the block address generation counter 882. According to a write signal WRITE provided by the image memory controller 810, the result of the addition selected by the selector 819 is stored at the address where the image data are read. At this time the value of the 6-bit counter 880 generating an address in a block is increased by one according to a request address update signal REQ provided by the image memory controller 810, thereby updating a write address ADR of the image memory 816. When the updating operations are completed for all picture elements in a block, a carry signal CARRY is issued by the 6-bit counter 880, the value of the block address generation counter 882 is increased by one through the OR circuit 881, and the process of the present block is terminated. The second stage of the image restoring operation for one screen is completed by repeating the above procedure for all blocks.

Progressive image buildup for one screen is completed by performing the same procedure as the second stage up to encoded data Di (Xni+1 . . . X64:ni<64) of the ith stage.

In the present embodiment, an insignificant block detecting signal ZERO is issued by the insignificant block detecting section 817 after the operation by the two-dimensional inverse DCT unit 814. However, the signal can be generated by the variable length data decoder 812, the dequantizer 813, or the two-dimensional inverse DCT unit 814.

Figure 56:
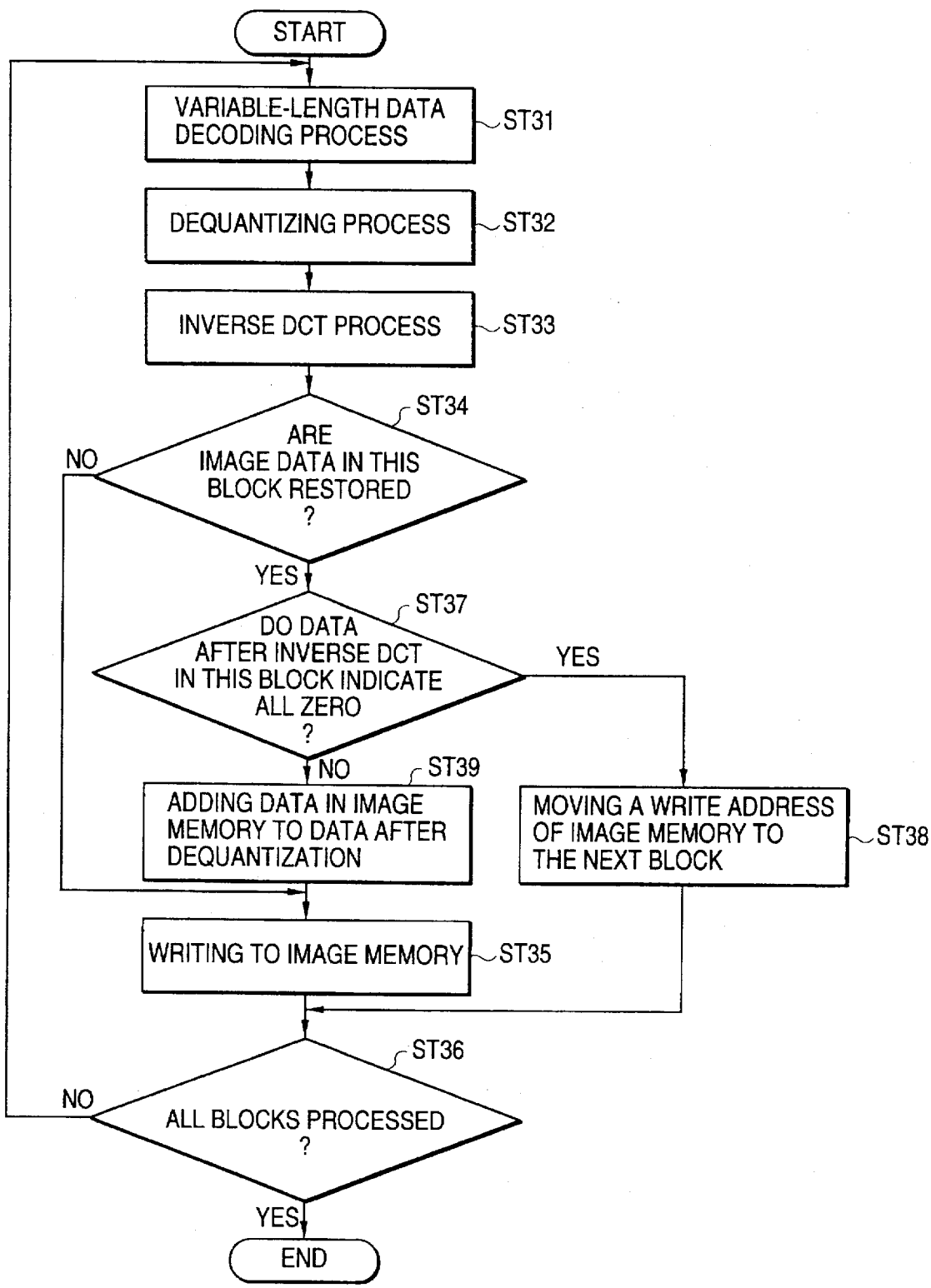
FIG. 56 is an operational flowchart of an embodiment of this invention.

FIG. 56 is an operational flowchart of an embodiment of this invention.

When the operation of an embodiment of the 9th embodiment of this invention is started, variable length data decoding process ST31 is first performed by the variable length data decoder 812 shown in FIG. 53. When variable length data decoding process ST31 is completed, dequantizing process ST32 is performed by the dequantizer 813. Then inverse DCT process ST33 is performed by the two-dimensional DCT unit 814. Next, a check ST34 is made to determine whether image data of the present block have been successfully restored. This check is performed by a signal FIRST issued in the first stage. If the image data are not yet restored (NO), the selector 819 selects data provided by the two-dimensional inverse DCT unit 814 and writes (ST35) them in the image memory 816, wherein the writing operation is performed under the control of the image memory controller 810. Then a check ST36 is made to determine whether the process has been completed for all blocks. If it is not (NO), variable length data decoding process ST31 is repeated again. The check ST36 is performed by the image memory controller 810.

When the check ST34 has determined that image data of the present block have already been restored (YES), a check ST37 is made to determine whether all the data in the present block processed by inverse DCT are "0". The check ST37 is performed by the insignificant block detecting section 817. When the check ST37 determines that all images are "0" (YES), the insignificant block detecting section 817 issues a signal (ZERO) to the address generator 818 and instructs it to proceed to the head of the next block. Then the address generator 818 proceeds to a write address of the image memory 816 for the head of the next block (ST38). When the check ST37 has determined that all the data are not "0" (NO), or that one or more non-zero values are contained in the data, data in the image memory and data processed by the inverse DCT operation are summed (ST39) by the adding section 815. The selector 819 selects the output provided by the adding section 815; image data provided by the two-dimensional inverse DCT unit 814 and image data stored in the image memory 816 are summed; and the result is provided to the image memory 816. That is, the adding section 815 performs the adding operation (ST39), and the resultant data are written (ST35) in the image memory 816 through the selector 819. After the writing operation, a check ST36 is made and the whole procedure is completed after covering all the blocks (YES).

According to the first embodiment of this invention, it is possible to selectively dequantize significant components of a quantized coefficient. That is, by not dequantizing insignificant components of a quantized coefficient, the time taken for the multiplying operation is minimized. Thus, the dequantizing process is executed at much higher speed. According to the second embodiment of this invention, restoring orthogonally transformed images by inverse orthogonal transformations can be executed efficiently with much faster arithmetic operations than those per the conventional methods, thereby expediting progressive image build-ups.

According to the third embodiment of this invention, based on a quantized coefficient or a transformation coefficient, a block detecting means detects blocks having no significant AC component. For the detected blocks, two-dimensional discrete cosine transformation of the orthogonal transformation method is replaced with the multiplying operation of the DC component of a transformation coefficient of a DC transformation method by a specified constant, thereby restoring image data at a much higher speed than in the conventional methods.

According to the 4th embodiment of this invention, a configuration is realized that comprises a matrix operation circuit with least possible adding units which is used in an image data orthogonal transforming unit that either DC-transforms image data or inverse-orthogonally transforms encoded data. Therefore, the size of the matrix operation circuit can be minimized.

According to the the 5th embodiment of this invention, a configuration is realized that comprises a small-scale and yet high-speed matrix operation circuit which is used in an image data orthogonal transforming unit that either DC-transforms image data or inverse-orthogonal transforms encoded data.

According to the 6th and 7th embodiments of this invention, an accumulating addition is made to image data stored in an image memory every time image data are restored sequentially from split encoded data. Therefore, it is not necessary to store data during image restoration, and progressive image buildup can be performed by using an image memory extended by at least 1 bit, thereby reducing memory requirements and performing an efficient progressive image buildup with a smaller circuit.

According to the 8th embodiment of this invention, where no significant coefficient exists in a block, operation such as dequantizing, inverse DCT, and image memory updating are not required. Accordingly, image restoration can be performed at a much higher speed than in conventional methods.

According to the 9th embodiment of this invention, updating of picture-elements in a block can only be completed only by updating a block address if no non-zero data exists in a block when a split DCT coefficient is individually decoded into image data and progressive image buildup is performed based on an accumulating addition thereof. Thus, efficient progressive image buildup can be executed.

What is claimed is:

1. A dequantizer in an image data processor using an image data restoration method for generating image data by normalizing transformation coefficients generated by said dequantizer which dequantizes quantized coefficients obtained by decoding inputted code data generated by coding the quantized coefficients generated through quantization of the transformation coefficients obtained by normalizing image data in a block of a plurality of picture elements divided from an image, said dequantizer comprising:

selecting means for selecting non-zero significant elements from quantized coefficients obtained by decoding the inputted code data represented by an index indicating a non-zero quantized coefficient and a run indicating the number of zeros, if any, preceded by the non-zero quantized coefficient;

a memory, coupled to said selecting means, storing quantization thresholds corresponding to respective elements of the quantized coefficients and for outputting selected quantization thresholds corresponding to the non-zero significant elements selected by said selecting means; and multiplying means for multiplying the non-zero significant elements selected by said selecting means by the selected quantization thresholds corresponding to the non-zero significant elements and for outputting resultant products as elements of transformation coefficients corresponding to the non-zero significant elements.

2. An image decoder in an image data processor, said image decoder comprising:

decoding means for restoring coded quantized coefficients in block units;

dequantization means for restoring transformation coefficients by multiplying only non-zero quantized coefficients times corresponding quantization thresholds and for specifying address information for the transformation coefficients; and inverse normalization means for storing a matrix of inverse normalization constants, for selecting a column matrix of the inverse normalization constants corresponding to the transformation coefficients according to the address information from said dequantization means, and for restoring image data by calculating a product matrix by multiplying the transformation coefficients by the column matrix.

3. A dequantizer in an image data processor using an image data restoration method for restoring image data from code data generated by coding quantized coefficients generated by quantizing, using corresponding quantization thresholds, transformation coefficients obtained by performing two-dimensional discrete cosine transformations to the image data in a plurality of blocks each comprising a plurality of picture elements forming an image, said dequantizer comprising:

decoding means for outputting quantized coefficients by decoding received code data represented by an index indicating a non-zero quantized coefficient and a run indicating the number of zeros, if any, preceded by the non-zero quantized coefficient;

dequantization means for restoring the transformation coefficients through dequantization executed by multiplying elements of the quantized coefficients outputted from said decoding means by the corresponding quantization thresholds;

memory means for storing direct current transformation coefficients and inverse normalization coefficients;

direct current transformation means for generating image data based on a resultant product obtained by multiplying a direct current element of the transformation coefficients by the direct current transformation constants;

block detecting means for detecting a direct current block without significant alternating current elements, based on one of the transformation coefficients corresponding to the blocks of the image data and the quantized coefficients, corresponding to the blocks of the image data, from said dequantization means;

inverse normalization means for reproducing blocks of the image data by multiplying the transformation coefficients corresponding thereto times the inverse normalization constants; and selecting means for outputting the image data output from said inverse normalization means when said block detecting means detects a block having no significant direct current components and for outputting the image data output from said direct current transformation means when said block detecting means detects a block having significant direct current components.

4. An image data processor including a matrix operating circuit for multiplying a matrix representing data to be processed by a matrix representing transformation constants in an image data normalizer for normalizing one of image data and inverse normalizing coded image data, said image data processor comprising:

a first set of latches for sequentially latching all data to be processed in a selected column of the matrix representing data to be processed;

a second set of latches for sequentially latching the transformation constants in a row matrix corresponding to the data to be processed latched by said first set of latches;

multiplying means, provided in correspondence with said second set of latches, for multiplying the transformation constants latched by said second set of latches by the data to be processed latched by said first latching means, to produce products;

adding means, provided in correspondence with said multiplying means, for accumulating the products produced by said multiplying means as a sum; and a third set of latches, provided in correspondence with said adding means, for latching the sum accumulated by said adding means said second latching means in said third latching means supplies, for supplying the sum previously accumulated to said adding means and for receiving an updated accumulated sum from said adding means.

5. An image data processor including a matrix operating circuit for multiplying a matrix representing data to be processed by a matrix representing transformation constants in a discrete cosine transform unit for normalizing one of image data and inverse normalizing coded image data, said image data processor comprising:

first latching means for sequentially latching all data to be processed in a selected column of the matrix representing data;

selecting means for selecting one of a plurality of equal data divisions in the data latched in said first latching means, to output sequentially selected latched data to be processed according to the equal data divisions;

second latching means for sequentially latching the transformation constants in a row matrix corresponding to the data latched by said first latching means;

multiplying means, provided in correspondence with said second latching means, for multiplying the transformation constants latched by said second latching means by the sequentially selected latched data outputted from said selecting means, to produce products;

adding means for calculating a sum of the products obtained by said multiplying means; and control means for controlling the sum outputted from said adding means, except when all the data latched by said first latching means are zero.

6. An image data processor, including an image data restorer for restoring an image from code data generated by coding quantization DCT coefficients obtained by quantizing DCT coefficients obtained by performing a two-dimensional discrete cosine transformation on gradations of picture elements in respective blocks divided from an original image formed by a plurality of picture elements with N-bit gradations, said image data processor comprising:

decoding means for decoding divided code data divided from a block into quantized DCT coefficients;

dequantization means for obtaining DCT coefficients by dequantizing the quantized DCT coefficients decoded by said decoding means;

inverse DCT means for obtaining image data through an inverse two-dimensional discrete cosine transformation by multiplying a matrix representing the DCT coefficients inputted from said dequantization means;

image data retaining means, having a memory of exactly N+1 bits in depth, for retaining the image data from said inverse DCT means; and adding means for adding the image data from said inverse DCT means to the image data retained by said image data retaining means and for retaining resulting image data obtained by addition to progressively build-up an image by accumulation of divided image data sequentially restored from the divided code data.

7. An image data processor including an image data restorer for restoring an image from code data generated by coding quantization DCT coefficients obtained by quantizing DCT coefficients obtained by performing a two-dimensional discrete cosine transformation on gradations of picture elements in respective blocks divided from an original image formed by a plurality of picture elements with N-bit gradations, said image data processor comprising:

decoding means for decoding divided code data divided from a block into quantized DCT coefficients;

dequantization means for obtaining DCT coefficients by dequantizing the quantized DCT coefficients decoded by said decoding means;

inverse DCT means for obtaining image data through an inverse two-dimensional discrete cosine transformation by multiplying a matrix representing the DCT coefficients inputted from said dequantization means;

image data retaining means, having a memory at least (N+2) bits in depth to provide an extra two bits, for retaining the image data from said inverse DCT means and for storing information on an underflow and an overflow of the image data in the extra two bits; and adding means for adding the image data from said inverse DCT means to the image data retained by said image data retaining means and for retaining resulting image data obtained by addition to progressively build-up an image by accumulation of divided image data sequentially restored from the divided code data.

8. An image data processor including an image data restorer for restoring an image from code data generated by coding quantization DCT coefficients obtained by quantizing DCT coefficients obtained by performing a two-dimensional discrete cosine transformation to gradations of picture elements in respective blocks divided from an original image having a plurality of picture elements with N-bit gradations said image data processor comprising:

decoding means for decoding divided code data divided from a block into quantized DCT coefficients;

dequantization means for obtaining DCT coefficients by dequantizing the quantized DCT coefficients decoded by said decoding means;

inverse DCT means for obtaining image data through an inverse two-dimensional discrete cosine transformation by multiplying a matrix representing the DCT coefficients inputted from said dequantization means;

level shifting means for eliminating an underflow by adding $2^{N-1}$ to the image data obtained by said inverse DCT means;

image data retaining means, having a memory of (N+1) bits in depth, for retaining image data from said inverse DCT means; and accumulating means for accumulating the image data from said level shifting means and said image data retaining means and for storing accumulated image data in said image data retaining means, when image data from said level shifting means are outputted, to progressively build-up an image by retaining the accumulated image data obtained from the divided image data sequentially restored from the divided code data.

9. The image data processor according to claim 8, wherein said accumulating means comprises:

subtracting means for subtracting $2^{N-1}$ from the image data output from said level shifting means;

first adding means for adding the image data from said subtracting means to the image data read from said image data retaining means;

second adding means for adding the image data from said first adding means to $2^{N-1}$ and for storing the added image data in said image data retaining means.

10. An image data processor including an image data restorer for restoring an image from code data generated by coding quantization DCT coefficients obtained by quantizing DCT coefficients obtained by performing a two-dimensional discrete cosine transformation to gradations of N*N picture elements in respective blocks divided from an original image, said image data processor comprising:

decoding means for decoding a block of inputted code data to obtain quantized DCT coefficients;

dequantization means for obtaining DCT coefficients by dequantizing the quantized DCT coefficients decoded by said decoding means;

inverse DCT means for performing an inverse two-dimensional discrete cosine transformation for the DCT coefficients dequantized by said dequantization means; and significant coefficient detecting means for controlling output of zero as restored image data without performing inverse two-dimensional discrete cosine transformation by said inverse DCT means and without performing dequantization by said dequantization means, when there is no significant coefficient among the quantized DCT coefficients, decoded by said decoding means, in the block of inputted code data.

11. An image data processor including an image data restorer for restoring an image from code data generated by coding quantization DCT coefficients obtained by quantizing DCT coefficients obtained by performing a two-dimensional discrete cosine transformation to gradations of N*N picture elements in respective blocks divided from an original image, said image data processor comprising:

decoding means for decoding a block of inputted code data to obtain quantized DCT coefficients;

dequantization means for obtaining DCT coefficients by dequantizing the quantized DCT coefficients decoded by said decoding means;

inverse DCT means for producing restored image data by performing an inverse two-dimensional discrete cosine transformation for the DCT coefficients dequantized by said dequantization means;

image memorizing means for storing accumulated image data;

adding means for adding the accumulated image data output from said image memorizing means to the restored image data output from said inverse DCT means to produce combined image data;

selecting means, supplied with the combined image data output from said adding means and the restored image data output from said inverse DCT means, for initially selecting the restored image data output from said inverse DCT means and thereafter selecting the combined image data output from said adding means, and for storing in said image memorizing means the one of the restored and combined image data selected; and significant coefficient detecting means for controlling output of zero to said adding means and said selecting means as the restored image data without performing inverse two-dimensional discrete cosine transformation by said inverse DCT means and without performing dequantization by said dequantization means, when there is no significant coefficient among the quantized DCT coefficients, decoded by said decoding means, in the block of inputted code data.

12. The image data processor according to claim 11, wherein said image memorizing means comprises address generating means for generating block addresses and intra-block addresses, and for incrementing the block addresses when there is no significant coefficient among the quantized coefficients, decoded by said decoding means, in the block of inputted code data.

13. An image data processor including an image data restorer for restoring an image from code data generated by coding quantization DCT coefficients obtained by quantizing DCT coefficients obtained by performing a two-dimensional discrete cosine transformation to gradations of the N*N picture element sin respective blocks divided from an original image; said image data processor comprising:

decoding means for decoding inputted code data;

block-end detecting means for detecting the end of the coefficients in said blocks from a signal decoded by said decoding means;

significant coefficient number counting means for counting the numbers of significant coefficients in said blocks until said block-end detecting means detects the end of the coefficients in said blocks; and significant efficient number judging means for judging the numbers of the significant coefficients in said blocks counted by said significant coefficient number counting means:

significant coefficient number judging means for judging the numbers of the significant coefficients in the blocks counted by said significant coefficient number counting means and for outputting an insignificant block signal, if no significant coefficient is judged to be in any of the blocks.

14. An image data processing method used in an image data restorer for restoring an image from code data generated by coding quantization DCT coefficients obtained by quantizing DCT coefficients obtained by performing a two-dimensional discrete cosine transformation to gradations of N*N picture elements in respective blocks divided from an original image, comprising the steps of:

(a) decoding blocks of inputted code data to obtain quantized coefficients;

(b) detecting existence of a significant coefficient in each of the blocks from the quantized coefficients;

(c) outputting zero data as an insignificant-block signal, when no significant coefficient is detected in step (b);

(d) dequantized the quantized coefficients to obtain DCT coefficients when a significant coefficient is detected; and (e) processing the DCT coefficients through inverse two-dimensional discrete cosine transformations to obtain image signals.

15. An image data processor including an image data restorer for restoring an image from code data generated by coding quantization DCT coefficients obtained by quantizing DCT coefficients obtained by performing a two-dimensional discrete cosine transformation to gradations of N*N picture elements in respective blocks divided from an original image, said image data processor comprising:

decoding means for decoding inputted code data to obtain quantized DCT coefficients;

inverse quantization means for obtaining DCT coefficients by dequantizing the quantized DCT coefficients decoded by said decoding means;

inverse DCT means for producing restored image data by performing inverse two-dimensional discrete cosine transformations for DCT coefficients;

image data retaining means for retaining previously generated image data;

adding means for adding the previously generated image data retained by said image retaining means to the restored image data produced by said inverse DCT means to obtain accumulated image data;

address generating means for generating an address used for storing the accumulated image data obtained by said adding means; and insignificant-block judging means for revising the address generated by said address generating means to a next block address, without storing the accumulated image data output from said adding means in said image data retaining means, when the restored image data are all zero.

16. An image data processor according to claim 15, wherein said adding means comprises:

an adder for adding the restored image data output from said inverse DCT means to the previously generated image data output from said image data retaining means; and selecting means for initially selecting the restored image data output from said inverse DCT means and thereafter selecting the accumulated image data output from said adder.

17. An image data processor according to claim 15, wherein said insignificant-block judging means comprises:

a counter for counting numbers of image data in the blocks; and means for revising the address to the next block address if all data inputted while said counter counts the numbers of the image data in one of the blocks are zero.

18. An image data processing method utilizing an image restoring device for splitting an original image into blocks comprising a plurality of N*N picture elements and quantizing a variable coefficient obtained by performing two-dimensional discrete cosine transformation on each gradation value of the N*N picture elements of each block, comprising the steps of:

(a) decoding encoded input data into a quantized coefficient;

(b) dequantizing the quantized coefficient into a DCT coefficient;

(c) obtaining image data from the DCT coefficient by performing inverse two-dimensional discrete cosine transformation;

(d) adding previously stored image data to the image data obtained in step (c) when one or more datum of the image data in the block is not zero;

(e) storing the image data obtained in step (c) unless all image data in the block are zero; and (f) decoding image data of a next block if all image data in the block are zero.

19. An image data processing method utilizing an image restoring device for splitting an original image into blocks comprising a plurality of N*N picture elements and for quantizing a variable coefficient obtained by performing two-dimensional discrete cosine transformation on each gradation value of the N*N picture elements of each block, comprising the steps of:

(a) decoding encoded input data into a quantized coefficient;

(b) dequantizing the quantized coefficient into a DCT coefficient;

(c) obtaining image data by performing inverse two-dimensional discrete cosine transformation operations on the DCT coefficient;

(d) storing the image data obtained in step (c) unless all image data in the block are zero; and (e) decoding image data of a next block if all image data in the block are zero.

20. An image data restoring device, comprising:

insignificant block determining means for determining significance of inputted image data inputted separately via at least a first stage and a second stage;

data storing means for storing restored image data;

adding means for adding the inputted image data to the restored image data stored in said image data storing means to produce accumulated image data for storage by said data storing means; and address generating means for generating an address corresponding to next inputted image data without storing the accumulated image data output by said adding means if said insignificant block determining means determines that the inputted image data are insignificant.

21. An image data restoring device according to claim 20, wherein the inputted image data inputted separately at said first stage and said second stage are pre-split into blocks comprising a plurality of N*N picture elements; and wherein said address generating means generates the address of a present block when said insignificant block determining means detects that the present block of inputted image data is insignificant.

* * * * *

UNITED STATES PATENT AND TRADEMARK OFFICE
CERTIFICATE OF CORRECTION

PATENT NO. : 5,689,346
DATED : November 18, 1997
INVENTOR(S) : Tsugio NODA, et al.

It is certified that error appears in the above-identified patent and that said Letters Patent is hereby corrected as shown below:

Col. 15, line 28, change "12" to --$I_2$--
Col. 21, lines 32-33, delete "i.e. $[A_{14}, A_{24}, A_{34}, A_{44}, A_{54}, A_{64}, A_{74}, A_{84}]^t$,"
Col. 24, line 34, change "$D_{CT}$" to --DCT--
Col. 26, line 23, after "adders" insert --213-1--
Col. 27, line 32, after "unit" insert --400--.
Col. 51, lines 11-12, delete "said second latching means in said third latching means supplies"

Signed and Sealed this

Thirty-first Day of March, 1998

Attest:

BRUCE LEHMAN

Attesting Officer

Commissioner of Patents and Trademarks